(12) United States Patent
Morita et al.

(10) Patent No.: US 8,728,674 B2
(45) Date of Patent: May 20, 2014

(54) FUEL CELL SYSTEM WITH CONTROLLED STOP PROCESS FOR A SHUT-DOWN OPERATION

(75) Inventors: Junji Morita, Kyoto (JP); Yasushi Sugawara, Osaka (JP); Takahiro Umeda, Nara (JP); Eiichi Yasumoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 654 days.

(21) Appl. No.: 12/598,880

(22) PCT Filed: Mar. 11, 2009

(86) PCT No.: PCT/JP2009/001093
§ 371 (c)(1),
(2), (4) Date: Nov. 4, 2009

(87) PCT Pub. No.: WO2009/113304
PCT Pub. Date: Sep. 17, 2009

(65) Prior Publication Data
US 2010/0136445 A1    Jun. 3, 2010

(30) Foreign Application Priority Data

Mar. 12, 2008 (JP) ................. 2008-063228
Mar. 12, 2008 (JP) ................. 2008-063229

(51) Int. Cl.
*H01M 8/04* (2006.01)

(52) U.S. Cl.
USPC .......................................... 429/429

(58) Field of Classification Search
USPC ............................... 429/428, 429
See application file for complete search history.

(56) References Cited

U.S. PATENT DOCUMENTS

| | | | |
|---|---|---|---|
| 8,071,243 B2 * | 12/2011 | Sugawara et al. ............ | 429/429 |
| 2002/0150809 A1 | 10/2002 | Hammerschmidt et al. | |
| 2006/0115700 A1 | 6/2006 | Kotani et al. | |
| 2007/0003805 A1 * | 1/2007 | Sugawara et al. ............ | 429/22 |
| 2007/0099040 A1 * | 5/2007 | Morita et al. ............ | 429/22 |
| 2008/0160361 A1 * | 7/2008 | Ohara et al. ............ | 429/17 |
| 2009/0047555 A1 * | 2/2009 | Sugawara et al. ............ | 429/19 |

FOREIGN PATENT DOCUMENTS

| | | |
|---|---|---|
| JP | 2000-164229 | 6/2000 |
| JP | 2005-123004 | 5/2005 |

(Continued)

OTHER PUBLICATIONS

European Search Report issued in European Patent Application No. 09718765.2 dated Jun. 27, 2012.

*Primary Examiner* — Patrick Ryan
*Assistant Examiner* — Lucas J O Donnell
(74) *Attorney, Agent, or Firm* — McDermott Will & Emery LLP

(57) ABSTRACT

A fuel cell system of the present invention includes: a fuel cell (1) having an electrolyte membrane (2), an anode (3) and a cathode (4) sandwiching the electrolyte membrane (2), a cathode gas passage (98) through which an oxidizing gas is supplied to and discharged from the cathode (4), and an anode gas passage (97) through which a fuel gas is supplied to and discharged from the anode (3); a fuel gas channel having an anode gas passage (97) and through which the fuel gas is supplied to and discharged from the anode (3); and an oxidizing gas channel having the cathode gas passage (98) and through which the oxidizing gas is supplied to and discharged from the cathode (4). When the fuel cell system stops generating electric power, the fuel gas channel and the oxidizing gas channel are closed, and a gas is supplied from a downstream side of the cathode gas passage (98) to an oxidizing gas filled space (112) which is practically isolated from outside by closing the oxidizing gas channel and includes the cathode gas passage (98).

23 Claims, 20 Drawing Sheets

(56) References Cited

FOREIGN PATENT DOCUMENTS

| JP | 2005-209609 | 8/2005 |
| JP | 2005-222707 | 8/2005 |
| JP | 2005-267910 | 9/2005 |
| JP | 2007-149360 | 6/2007 |
| JP | 2007-194157 | 8/2007 |
| WO | WO 2006088077 A1 * | 8/2006 |
| WO | WO 2007/063826 A1 | 6/2007 |
| WO | WO 2007063826 A1 * | 6/2007 |
| WO | WO-2007142169 A1 | 12/2007 |

* cited by examiner

CALCULATION OF AMOUNT
OF VOULUME REDUCTION

```
┌─────────────────────┐
│ V1= A               │
│ P1= 1Pa = 760mmHg   │
│ T1=70°C             │
│ GAS: AIR AND H2O (g)│
└─────────────────────┘
          │
          ▼
┌─────────────────────┐
│ V1= A               │
│ P1= 1Pa = 760mmHg   │
│ T1=70°C             │
│ GAS: AIR, H2O(g), AND│
│      ADDITIONAL GAS │
│ OTHER: H2O(l)       │
└─────────────────────┘
          │
          ▼
┌─────────────────────┐
│ V1= A               │
│ P2= 760mmHg         │
│ T2=25°C             │
│ GAS: AIR, H2O(g), AND│
│      ADDITIONAL GAS │
│ OTHER: H2O(l)       │
└─────────────────────┘
```

<CONDITIONS>
V1= A (STACK VOLUME)
T1 =70°C (HIGHEST DEW POINT IN STACK (OXIDIZING GAS EXIT))
P1= P(AIR 70°C) + P(H2O(g) 70°C) = 1Pa = 760mmHg (ATMOSPHERIC PRESSURE)
(P(H2O (g) 70°C) = 231.4 mmHg ) SATURATED STEAM PRESSURE

P(AIR 70°C) = 760mmHg - P(H2O(g) 70) = 528.6mmHg

T2=25°C (ROOM TEMPERATURE)
P2= P(AIR 25°C) + P(H2O(g) 25°C) + P(ADDITIONAL GAS) = 760mmHg (ATMOSPHERIC PRESSURE)

(P(H2O (g) 25°C) = 23.8 mmHg ) SATURATED STEAM PRESSURE

P(AIR 25°C) = (273 + 25) / (273 + 70) × P(AIR 70°C) = 459.3mmHg

P(H2O (g) 25°C) = 23.8 mmHg

P(ADDITIONAL GAS) = 760mmHg - P(AIR 25°C) - P(H2O(g) 25°C)
= 276.9mmHg

SINCE PRESSURE RATIO CORRESPONDS TO MOLE FRACTION, I.E., VOLUME, VOLUMES OF RESPECTIVE GASES ARE AS FOLLOWS.

V(AIR 25°C) = 0.62A
V(H2O(g) 25°C) = 0.03A
V(ADDITONAL GAS) = 0.35A

Fig.6

CALCULATION OF AMOUNT
OF VOULUME REDUCTION

```
┌─────────────────────┐
│ V1= A               │
│ P1= 1Pa = 760mmHg   │
│ T1=70°C             │
│ GAS: AIR AND H2O (g)│
└─────────────────────┘
```

<CONDITIONS>
V1= A(STACK VOLUME)
T1=70°C (HIGHEST DEW POINT IN STACK (OXIDIZING GAS EXIT))
P1= P(AIR 70°C) + P(H2O(g) 70°C) = 1Pa =
760mmHg (ATMOSPHERIC PRESSURE)

(P(H2O (g) 70°C) = 231.4 mmHg ) SATURATED
STEAM PRESSURE

P(AIR 70°C) = 760mmHg − P(H2O(g) 70) = 528.6mmHg

```
┌─────────────────────┐
│ V1= A               │
│ P1= 1Pa = 760mmHg   │
│ T1=70°C             │
│ GAS: AIR, H2O(g), AND│
│      ADDITIONAL GAS │
│ OTHER: H2O(l)       │
└─────────────────────┘
```

T2=25°C (ROOM TEMPERATURE)

P2= P(AIR 25°C) + P(H2O(g) 25°C) + P(ADDITIONAL GAS) =
760mmHg (ATMOSPHERIC PRESSURE)

(P(H2O (g) 25°C) = 23.8 mmHg ) SATURATED STEAM PRESSURE

```
┌─────────────────────┐
│ V1= A               │
│ P2= 760mmHg         │
│ T2=25°C             │
│ GAS: AIR, H2O(g), AND│
│      ADDITIONAL GAS │
│ OTHER: H2O(l)       │
└─────────────────────┘
```

P(AIR 25°C) = (273 + 25) / (273 + 70) × P(AIR 70°C) = 459.3mmHg

P(H2O (g) 25°C) = 23.8 mmHg

P(ADDITIONAL GAS) = 760mmHg − P(AIR 25°C) − P(H2O(g) 25°C)
= 276.9mmHg

SINCE PRESSURE RATIO CORRESPONDS TO MOLE FRACTION, I.E.,
VOLUME, VOLUMES OF RESPECTIVE GASES ARE AS FOLLOWS.

V(AIR 25°C) = 0.62A
V(H2O(g) 25°C) = 0.03A
V(ADDITONAL GAS) = 0.35A

FUEL CELL SYSTEM WITH CONTROLLED STOP PROCESS FOR A SHUT-DOWN OPERATION

RELATED APPLICATIONS

This application is the U.S. National Phase under 35 U.S.C. §371 of International Application No. PCT/JP2009/001093, filed on Mar. 11, 2009, which in turn claims the benefit of Japanese Application Nos. 2008-063228, filed Mar. 12, 2008, and 2008-063229, filed on Mar. 12, 2008, the disclosures of which Applications are incorporated by reference herein.

TECHNICAL FIELD

The present invention relates to a fuel cell system. More specifically, the present invention relates to a fuel cell system capable of reducing the amount of hydrogen consumed when the fuel cell system is not generating electric power and capable of preventing a cathode catalyst from deteriorating.

BACKGROUND ART

Required for a domestic fuel cell system are lowering heating and electricity charges and improving an effect of reducing carbon dioxide by a DSS (Daily Start & Stop or Daily Start-up & Shut-down) operation in which the fuel cell system operates during daytime and stops during nighttime. In accordance with the DSS operation, the fuel cell system frequently stops operating. In a case where a conventional fuel cell carries out such operation, an electrode catalyst deteriorates by, for example, a reactant gas remaining in a cell stack or air intruding from outside when the fuel cell is not generating electric power. This causes a problem of deterioration of a cell performance.

As a fuel cell system capable of dealing with such problem, Patent Document 1 proposes a fuel cell system configured such that while the fuel cell system stops generating the electric power, supply and discharge of each of a fuel gas and an oxidizing gas are stopped, and an inactive gas is injected into a fuel gas passage and oxidizing gas passage of the fuel cell. In the foregoing, the fuel gas passage denotes a passage through which the fuel gas is supplied to the fuel cell and a passage through which the fuel gas is discharged from the fuel cell, and the oxidizing gas passage is a passage through which the oxidizing gas is supplied to the fuel cell and a passage through which the oxidizing gas is discharged from the fuel cell.

Patent Document 2 proposes a fuel cell system configured such that: the fuel gas passage and the oxidizing gas passage are closed when the fuel cell system is not generating electric power; the inactive gas is supplied to a fuel gas filled space which is practically isolated from outside by closing the passages and is constituted by the fuel gas passage in the fuel cell and a space communicated with the fuel gas passage; and the air is supplied to an oxidizing gas filled space which is practically isolated from outside by closing the passages and is constituted by the oxidizing gas passage in the fuel cell and a space communicated with the oxidizing gas passage. Generally, each of the pressure in the fuel gas filled space and the pressure in the oxidizing gas filled space decreases by the consumption of the gas due to, for example, cross leakage or by temperature decrease. However, in accordance with the fuel cell system described in Patent Document 2, to prevent the pressure in the fuel gas filled space and the pressure in the oxidizing gas filled space from decreasing, the inactive gas is supplied to the fuel gas filled space, and the air is supplied to the oxidizing gas filled space. In the oxidizing gas filled space, since oxygen is consumed and only nitrogen remains, an electrode potential can be suppressed to a low level. In addition, since the gases are supplied to the inside of the fuel cell to compensate pressure decrease, there is no pressure difference between the inside of the fuel cell and the atmosphere. Therefore, the intrusion of oxygen into the fuel gas filled space is suppressed to an extremely low level, and the increase in the electrode potential is more effectively suppressed.

Patent Document 1: Japanese Laid-Open Patent Application Publication 2005-222707

Patent Document 2: International Publication WO 2007/063826

DISCLOSURE OF THE INVENTION

Problems to be Solved by the Invention

In the fuel cell system described in Patent Document 1, a material gas from which impurities are removed is used as the inactive gas used to prevent an electrode from deteriorating. When starting up the fuel cell system, the unreacted material gas injected into the fuel gas passage and oxidizing gas passage of the fuel cell needs to be combusted and discharged to outside air. The problem is that the system becomes complex since it needs to include pipes, valves, and devices to combust the unreacted inactive gas.

Moreover, in the fuel cell system described in Patent Document 2, the fuel gas passage and the oxidizing gas passage are closed when the fuel cell system is not generating the electric power, and the air is supplied to the oxidizing gas filled space which is practically isolated from outside by closing the passages and is constituted by the oxidizing gas passage in the fuel cell and the space communicated with the oxidizing gas passage. In this case, in the fuel cell, the hydrogen in the fuel gas and the oxygen in the supplied air and in the gas remaining in the oxidizing gas filled space react with each other via a polymer electrolyte membrane to consume the hydrogen and the oxygen. Therefore, in light of the improvement of the energy efficiency by reducing the amount of hydrogen in the fuel gas consumed when the fuel cell system is not generating the electric power, there is still room for improvement. To be specific, it is desirable that the amount of hydrogen consumed when the fuel cell system is not generating the electric power be reduced by further reducing the amount of oxygen in the air supplied to the oxidizing gas filled space. In addition, in light of adequate prevention of the deterioration of the electrode performance by suppressing the deterioration of the cathode catalyst when the system is not generating the electric power, there is still room for improvement.

The present invention was made to solve the above problems, and an object of the present invention is to provide a fuel cell system capable of improving the energy efficiency by reducing the amount of hydrogen consumed when the fuel cell system is not generating the electric power and capable of adequately preventing the performance of the cathode catalyst from deteriorating when the system is not generating the electric power.

Means for Solving the Problems

Process Leading to the Invention

The present inventors have diligently studied a method for reducing the amount of hydrogen in the fuel gas consumed when the fuel cell system is not generating the electric power and a method for preventing the electrode from deteriorating. As a result, the present inventors have obtained the following findings.

By the electric power generation (operation) of the fuel cell system, the oxygen in the oxidizing gas is consumed by an electrochemical reaction in a cathode of the fuel cell. Therefore, an oxygen concentration of the oxidizing gas discharged from an oxidizing gas exit of the fuel cell is lower than the oxygen concentration of the oxidizing gas to be supplied to an oxidizing gas entrance of the fuel cell. Generally, a utilization ratio of the oxidizing gas supplied to the cathode is about 40 to 60% in light of a voltage drop due to a diffusion resistance and an electric power generation efficiency. As a result, in the case of using air as the oxidizing gas, the oxygen concentration of the oxidizing gas supplied to the fuel cell is about 21% whereas the oxygen concentration of the oxidizing gas discharged from the fuel cell is 9 to 13%. Therefore, when the oxidizing gas passage is closed after the system stops generating the electric power, the oxidizing gas having a low oxygen concentration remains in the oxidizing gas passage located on the oxidizing gas exit side, as compared to the oxidizing gas passage located on the oxidizing gas entrance side.

In the fuel cell system described in Patent Document 2, the position of a portion through which the air is supplied to the oxidizing gas filled space is not especially defined. However, by restricting the position of the portion to a position located downstream of the oxidizing gas exit of the fuel cell, the oxidizing gas (discharged oxidizing gas) having the low oxygen concentration and remaining in the oxidizing gas passage located on the oxidizing gas exit side of the fuel cell can be caused to return to the inside of the fuel cell. To be specific, in a case where the oxidizing gas passage is sealed, the oxidizing gas having the oxygen concentration lower than the oxygen concentration of the air can be sealed by supplying the gas through the portion located downstream of the oxidizing gas exit. By sealing the oxidizing gas having the low oxygen concentration, the amount of hydrogen consumed when the fuel cell system is not generating the electric power can be reduced. Moreover, as compared to a case of sealing the oxidizing gas having the high oxygen concentration, the deterioration of the cathode catalyst by, for example, agglomeration or oxidation when the system is not generating the electric power can be suppressed, so that the deterioration of the electrode performance can be prevented.

Configuration of Present Invention

A fuel cell system according to the present invention includes: a fuel cell including an electrolyte membrane, an anode and a cathode sandwiching the electrolyte membrane, an anode gas passage through which a fuel gas is supplied to and discharged from the anode, and a cathode gas passage through which an oxidizing gas is supplied to and discharged from the cathode; a fuel gas channel including the anode gas passage and through which the fuel gas is supplied to and discharged from the anode; and an oxidizing gas channel including the cathode gas passage and through which the oxidizing gas is supplied to and discharged from the cathode, wherein: the fuel gas channel and the oxidizing gas channel are closed when the fuel cell system stops generating electric power; and a gas is supplied from a downstream side of the cathode gas passage to an oxidizing gas filled space which is practically isolated from outside by closing the oxidizing gas channel and is constituted by the cathode gas passage and a space communicated with the cathode gas passage.

Then, the fuel gas channel includes a fuel gas supplying passage connected to an entrance of the anode gas passage, a fuel gas supplying valve disposed on the fuel gas supplying passage to open and close the fuel gas supplying passage, the anode gas passage, a fuel gas discharging passage connected to an exit of the anode gas passage, and a fuel gas discharging valve disposed on the fuel gas discharging passage to open and close the fuel gas discharging passage; the oxidizing gas channel includes an oxidizing gas supplying passage connected to an entrance of the cathode gas passage, an oxidizing gas supplying valve disposed on the oxidizing gas supplying passage to open and close the oxidizing gas supplying passage, the cathode gas passage, an oxidizing gas discharging passage connected to an exit of the cathode gas passage, and an oxidizing gas discharging valve disposed on the oxidizing gas discharging passage to open and close the oxidizing gas discharging passage; and the fuel gas channel and the oxidizing gas channel are closed by closing the fuel gas supplying valve, the fuel gas discharging valve, the oxidizing gas supplying valve, and the oxidizing gas discharging valve, and a gas is supplied to a portion of the oxidizing gas filled space which portion is located downstream of the exit of the cathode gas passage.

It is desirable that a volume of the portion of the oxidizing gas filled space which portion is located downstream of the exit of the cathode gas passage be equal to or larger than one time a spatial volume of the cathode gas passage.

Moreover, the fuel cell system according to the present invention further includes a condenser disposed between the exit of the cathode gas passage and the oxidizing gas discharging passage to condense and remove moisture in the oxidizing gas discharged from the cathode gas passage.

It is desirable that a volume of a portion of the oxidizing gas filled space which portion is located downstream of an exit of the condenser be equal to or larger than 0.35 time a spatial volume of the cathode gas passage.

It is desirable that the fuel cell system further include: a condenser disposed downstream of the oxidizing gas discharging passage to condense and remove moisture in the oxidizing gas discharged from the oxidizing gas discharging passage; an oxidizing gas discharging valve-condenser passage connecting the oxidizing gas discharging valve and the condenser; and a second oxidizing gas discharging passage disposed downstream of the condenser to discharge the oxidizing gas discharged from the condenser, wherein a volume of the second oxidizing gas discharging passage is larger than a sum of a volume of the oxidizing gas filled space and a volume of the oxidizing gas discharging valve-condenser passage.

Moreover, the fuel cell system according to the present invention further includes: a bypass passage connecting a portion of the oxidizing gas supplying passage which portion is located upstream of the oxidizing gas supplying valve and a portion of the oxidizing gas discharging passage which portion is located upstream of the oxidizing gas discharging valve; and a bypass valve disposed on the bypass passage to open the bypass passage when the fuel cell system stops generating electric power.

It is desirable that the fuel cell system further include a controller configured to control opening and closing of each of the fuel gas supplying valve, the fuel gas discharging valve, the oxidizing gas supplying valve, the oxidizing gas discharging valve, and the bypass valve, wherein the controller is configured to, when the fuel cell system stops generating electric power, close the fuel gas supplying valve, the fuel gas discharging valve, the oxidizing gas supplying valve, and the oxidizing gas discharging valve, and then open the oxidizing gas discharging valve.

Moreover, the fuel cell system according to the present invention further includes a controller configured to control opening and closing of each of the fuel gas supplying valve, the fuel gas discharging valve, the oxidizing gas supplying valve, and the oxidizing gas discharging valve, wherein the controller is configured to, when the fuel cell system stops generating electric power, close the fuel gas supplying valve, the fuel gas discharging valve, the oxidizing gas supplying valve, and the oxidizing gas discharging valve.

Moreover, the fuel cell system according to the present invention further includes the controller configured to control opening and closing of each of the fuel gas supplying valve, the fuel gas discharging valve, the oxidizing gas supplying valve, the oxidizing gas discharging valve, and the bypass valve, wherein the controller is configured to, when the fuel cell system stops generating the electric power, close the fuel gas supplying valve, the fuel gas discharging valve, the oxidizing gas supplying valve, and the oxidizing gas discharging valve, and then open the bypass valve.

Moreover, the fuel cell system according to the present invention further includes a fuel cell temperature detector configured to directly or indirectly detect a temperature of the fuel cell, wherein the controller is configured to open the bypass valve when the temperature of the fuel cell becomes equal to or lower than a predetermined valve open temperature.

Moreover, the fuel cell system according to the present invention further includes a pressure detector configured to detect pressure in the oxidizing gas filled space, wherein the controller is configured to open the bypass valve when the pressure in the oxidizing gas filled space becomes equal to or lower than a predetermined valve open pressure.

The controller may be configured to open the bypass valve and then close the bypass valve.

Moreover, the fuel cell system according to the present invention further includes a fuel cell temperature detector configured to directly or indirectly detect the temperature of the fuel cell, wherein the controller is configured to close the bypass valve when the temperature of the fuel cell becomes equal to or lower than a predetermined valve close temperature.

The controller may be configured to close the bypass valve when a predetermined valve open time has elapsed since the opening of the bypass valve.

Moreover, a fuel cell system according to the present invention includes: a fuel cell including an electrolyte membrane, an anode and a cathode sandwiching the electrolyte membrane, an anode gas passage through which a fuel gas is supplied to and discharged from the anode, and a cathode gas passage through which an oxidizing gas is supplied to and discharged from the cathode; a fuel gas supplying passage connected to an entrance of the anode gas passage; a fuel gas supplying valve disposed on the fuel gas supplying passage to open and close the fuel gas supplying passage; a fuel gas discharging passage connected to an exit of the anode gas passage; a fuel gas discharging valve disposed on the fuel gas discharging passage to open and close the fuel gas discharging passage; an oxidizing gas supplying passage connected to an entrance of the cathode gas passage; an oxidizing gas supplying valve disposed on the oxidizing gas supplying passage to open and close the oxidizing gas supplying passage; an oxidizing gas discharging passage connected to an exit of the cathode gas passage; an oxidizing gas discharging valve disposed on the oxidizing gas discharging passage to open and close the oxidizing gas discharging passage; an outside air supplying passage, one end of which is connected to a portion of the oxidizing gas discharging passage which portion extends between the exit of the cathode gas passage and the oxidizing gas discharging valve; a purifying portion disposed on the outside air supplying passage; and an outside air supplying valve disposed on a portion of the outside air supplying passage which portion is located between the one end of the outside air supplying passage which end is connected to the oxidizing gas discharging passage and the purifying portion to open and close the outside air supplying passage, wherein when the fuel cell system stops generating electric power, the fuel gas supplying valve, the fuel gas discharging valve, the oxidizing gas supplying valve, and the oxidizing gas discharging valve are closed, and the outside air supplying valve is open.

It is preferable that a volume of a portion of a space which is isolated from outside by closing the oxidizing gas supplying valve and the oxidizing gas discharging valve and is constituted by the cathode gas passage and a space communicated with the cathode gas passage which portion is located downstream of the exit of the cathode gas passage be equal to or larger than one time a spatial volume of the cathode gas passage.

Moreover, the fuel cell system according to the present invention further includes a condenser disposed between the exit of the cathode gas passage and the oxidizing gas discharging passage to condense and remove moisture in the oxidizing gas discharged from the cathode gas passage.

It is preferable that a volume of a portion of a space which is isolated from outside by closing the oxidizing gas supplying valve and the oxidizing gas discharging valve and is constituted by the cathode gas passage and a space communicated with the cathode gas passage which portion is located downstream of an exit of the condenser be equal to or larger than 0.35 time a spatial volume of the cathode gas passage.

Moreover, the fuel cell system according to the present invention further includes a controller configured to control opening and closing of each of the fuel gas supplying valve, the fuel gas discharging valve, the oxidizing gas supplying valve, the oxidizing gas discharging valve, and the outside air supplying valve, wherein the controller is configured to, when the fuel cell system stops generating the electric power, close the fuel gas supplying valve, the fuel gas discharging valve, the oxidizing gas supplying valve, and the oxidizing gas discharging valve, and then open the outside air supplying valve.

On this account, the fuel cell system may further include a fuel cell temperature detector configured to directly or indirectly detect a temperature of the fuel cell, wherein the controller may be configured to open the outside air supplying valve when the temperature of the fuel cell becomes equal to or lower than a predetermined valve open temperature.

Or, the fuel cell system may further include a pressure detector configured to detect pressure in an oxidizing gas filled space which is isolated from outside by closing the oxidizing gas supplying valve and the oxidizing gas discharging valve and is constituted by the cathode gas passage and a space communicated with the cathode gas passage, wherein the controller may be configured to open the outside air supplying valve when the pressure in the oxidizing gas filled space becomes equal to or lower than a predetermined valve open pressure.

Moreover, in the present invention, the controller is configured to open the outside air supplying valve and then close the outside air supplying valve.

On this account, the fuel cell system may further include a fuel cell temperature detector configured to directly or indirectly detect the temperature of the fuel cell, wherein the controller may be configured to close the outside air supplying valve when the temperature of the fuel cell becomes equal to or lower than a predetermined valve close temperature.

Or, the controller may be configured to close the outside air supplying valve when a predetermined valve open time has elapsed since the opening of the outside air supplying valve.

The above object, other objects, features and advantages of the present invention will be made clear by the following detailed explanation of preferred embodiments with reference to the attached drawings.

Effects of the Invention

The present invention has the following effects.

The present invention can reduce the amount of hydrogen consumed when the fuel cell system is not generating the electric power, and can therefore adequately improve the energy efficiency of the fuel cell system. In addition, the present invention can suppress the deterioration of the cathode catalyst due to agglomeration or oxidation caused when the fuel cell system is not generating the electric power, and can therefore adequately prevent the deterioration of the electrode performance.

BRIEF DESCRIPTION OF THE DRAWINGS

FIG. 6 is a diagram showing a calculation example of the amount of volume reduction of a gas in a cathode gas passage.

FIG. 17 is a diagram showing a calculation example of the amount of volume reduction of the gas in the cathode gas passage.

Figure 1:
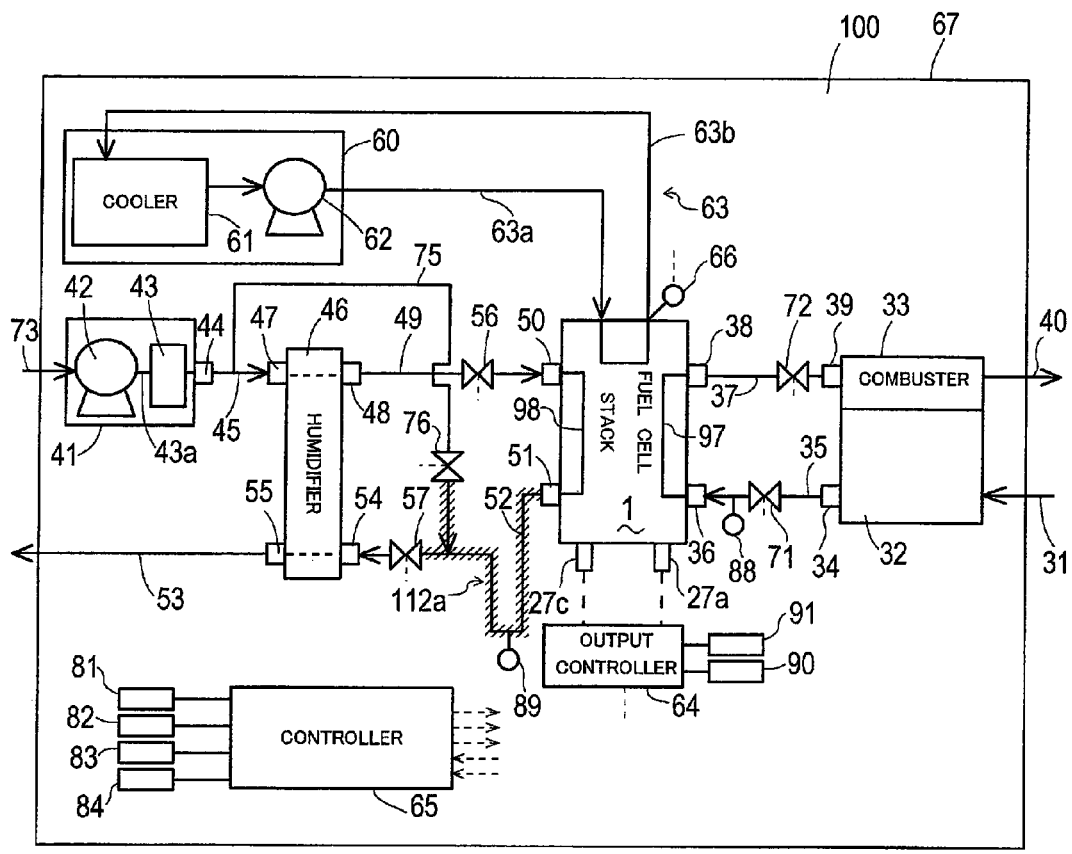
FIG. 1 is a functional block diagram schematically showing the configuration of a fuel cell system according to Embodiment 1.

EXPLANATION OF REFERENCE NUMBERS 1 fuel cell
2 polymer electrolyte membrane
3 anode
4 cathode
5 anode separator
6 cathode separator
7, 8 gasket
9 cell
10 in-cell fuel gas channel
11 in-cell oxidizing gas channel
12 cooling water channel
13 cooling water gasket
21 fuel gas supplying manifold
22 fuel gas discharging manifold
23 oxidizing gas supplying manifold
24 oxidizing gas discharging manifold
25 cooling water supplying manifold
26 cooling water discharging manifold
36 fuel gas entrance
38 fuel gas exit
40 flue gas discharging passage
41 oxidizing gas supplying portion
42 blower
43 filter
45 non-humidified oxidizing gas supplying passage
46 humidifier
49 oxidizing gas supplying passage
50 oxidizing gas entrance
51 oxidizing gas exit
52 oxidizing gas discharging passage
53 exhaust oxidizing gas discharging passage
56 oxidizing gas supplying valve
57 oxidizing gas discharging valve
58 oxidizing gas discharging valve-humidifier passage
64 output controller
65 controller
66 temperature detector
75 bypass passage
76 bypass valve
89 pressure detector
97 anode gas passage
98 cathode gas passage
100 fuel cell system
111 fuel gas filled space
112 oxidizing gas filled space
112a discharged oxidizing gas filled space

BEST MODE FOR CARRYING OUT THE INVENTION

Hereinafter, preferred embodiments of the present invention will be explained in reference to the drawings. In the drawings, the same reference numbers are used for the same or corresponding components, and a repetition of the same explanation is avoided.

Embodiment 1

Embodiment 1 of the present invention will be explained. Hereinafter, hardware and a control system of the fuel cell system according to Embodiment 1 will be separately explained.

Configuration of Hardware of Fuel Cell System 100

First, the configuration of the hardware of the fuel cell system will be explained. FIG. 1 is a functional block diagram schematically showing the configuration of the fuel cell system according to Embodiment 1.

As shown in FIG. 1, the fuel cell system 100 of the present embodiment includes, as major components, a fuel cell 1, a fuel gas system configured to supply and discharge the fuel gas to and from the fuel cell 1, an oxidizing gas system configured to supply and discharge the oxidizing gas to and from the fuel cell 1, a bypass system that is a feature of the present invention, a cooling system configured to cool down the fuel cell 1, a temperature detector 66 configured to detect a temperature of the fuel cell 1, a controller 65 configured to control the operations of the entire fuel cell system 100, and an output controller 64. Most of the components of the fuel cell system 100 are stored in a casing 67 or attached to an outer surface of the casing 67 so as to be exposed to outside. Hereinafter, the major components of the fuel cell system 100 will be explained in detail.

Fuel Cell 1

Figure 2:
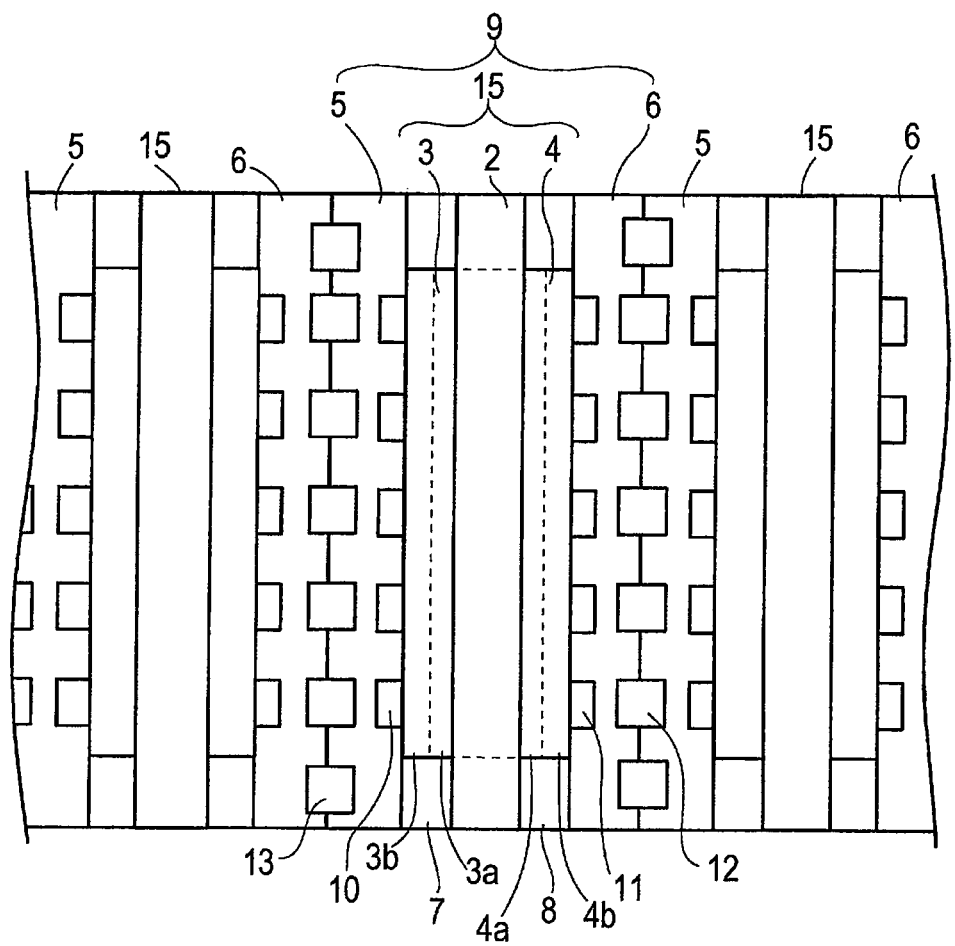
FIG. 2 is a cross-sectional view showing the configuration of a cell.
Figure 3:
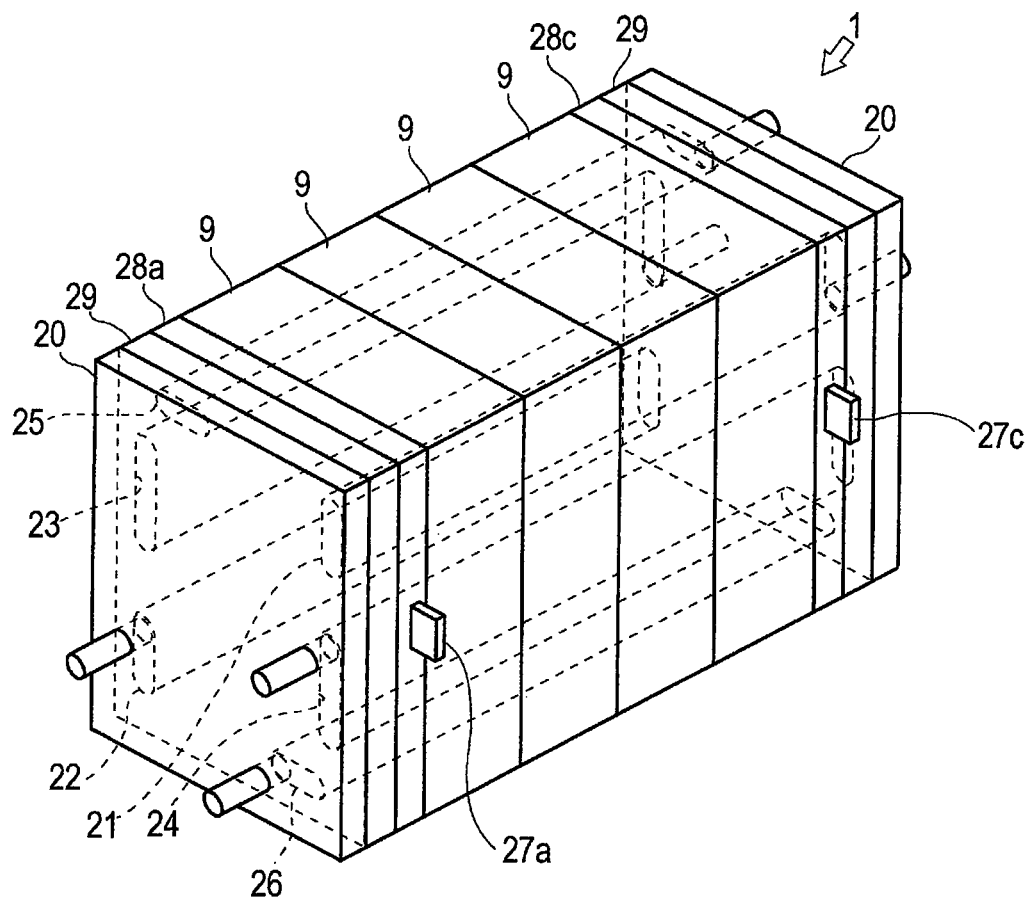
FIG. 3 is a perspective view showing the configuration of a fuel cell.

The configuration of the fuel cell 1 (cell stack) will be explained in reference to FIGS. 2 and 3. FIG. 2 is a cross-sectional view showing the configuration of a cell. FIG. 3 is a perspective view showing the configuration of the fuel cell.

The fuel cell 1 can be constituted by a polymer electrolyte fuel cell, and the configuration thereof is known. Therefore, the fuel cell 1 will be briefly explained as long as it is related to the present invention. Herein, the fuel cell 1 is the polymer electrolyte fuel cell.

As shown in FIG. 3, the fuel cell 1 includes a plurality of stacked cells 9, a pair of current collectors 28a and 28c sandwiching the stacked cells 9, a pair of insulating plates 29 electrically insulating the cells 9 from outside, and a pair of end plates 20 fastening the stacked cells 9 using fastening members (not shown). A voltage per cell is normally low, i.e., about 0.75 V. Therefore, a plurality of cells 9 are stacked in series in the fuel cell 1 to achieve a high voltage. The current collector 28a is provided with an electric output terminal 27a, and the current collector 28c is provided with an electric output terminal 27c. Current is supplied from the fuel cell 1 through the current collectors 28a and 28c to outside. The output controller 64 is connected to the electric output terminals 27a and 27c. The output controller 64 includes an inverter, and converts DC power output from the fuel cell 1 into AC power to output the AC power. Moreover, the output controller 64 can adjust its output. By adjusting the output of the output controller 64, electric power generated by the fuel cell 1 is adjusted.

As shown in FIG. 2, the cell 9 includes a polymer electrolyte membrane 2 as a polymer electrolyte layer, and an anode 3 and a cathode 4 are respectively disposed on both main surfaces of the polymer electrolyte membrane 2 except for a peripheral portion of each of both main surfaces of the polymer electrolyte membrane 2. The anode 3, the polymer electrolyte membrane 2, and the cathode 4 constitute an MEA (membrane-electrode assembly) 15. The anode 3 is constituted by an anode catalyst layer 3a and an anode gas diffusion layer 3b arranged to be tightly adhered to each other. The cathode 4 is constituted by a cathode catalyst layer 4a and a cathode gas diffusion layer 4b arranged to be tightly adhered to each other.

The polymer electrolyte membrane 2 is formed by, for example, a solid polymer electrolyte membrane made of perfluorosulfonic acid polymer and having hydrogen ion conductivity. Each of the catalyst layers 3a and 4a is formed by, for example, a mixture of a catalyst in which a porous carbon supports a platinum-ruthenium alloy or a precious metal, such as platinum, and polymer electrolyte having hydrogen ion conductivity. Each of the gas diffusion layers 3b and 4b is formed by, for example, carbon paper or carbon cloth subjected to water repellent finish.

A plate-shaped electrically-conductive anode separator 5 is disposed to contact the anode 3 of the MEA 15, and a plate-shaped electrically-conductive cathode separator 6 is disposed to contact the cathode 4 of the MEA 15. Then, a pair of annular gaskets 7 and 8 respectively disposed on peripheral portions of both main surfaces of the polymer electrolyte membrane 2 respectively seal a gap between the MEA 15 and the anode separator 5 and a gap between the MEA 15 and the cathode separator 6. A groove-like in-cell fuel gas channel 10 is formed on a portion of an inner surface of the anode separator 5 which portion contacts the anode 3. A groove-like in-cell oxidizing gas channel 11 is formed on a portion of an inner surface of the cathode separator 6 which portion contacts the cathode 4. Moreover, grooves are respectively formed on corresponding portions of outer surfaces of the anode separator 5 and the cathode separator 6 arranged adjacently, and these grooves are joined to each other to form a cooling water channel 12.

The fuel cell 1 is constituted by adjacently stacking a plurality of cells 9 configured as above. An annular cooling water gasket 13 seals a gap between adjacent cells 9. As shown in FIG. 3, the fuel cell 1 is provided with a fuel gas supplying manifold 21, a fuel gas discharging manifold 22, an oxidizing gas supplying manifold 23, an oxidizing gas discharging manifold 24, a cooling water supplying manifold 25, and a cooling water discharging manifold 26, each of which extends in a stack direction of the cells 9. An entrance of the oxidizing gas supplying manifold 23 is communicated with an oxidizing gas entrance 50 formed on an outer surface of one of the end plates 20, and an exit of the oxidizing gas discharging manifold 24 is communicated with an oxidizing gas exit 51 formed on an outer surface of the other end plate 20. An entrance of the fuel gas supplying manifold 21 is communicated with a fuel gas entrance 36 formed on the outer surface of one of the end plates 20, and an exit of the fuel gas discharging manifold 22 is communicated with a fuel gas exit 38 formed on the outer surface of the other end plate 20.

An upstream end of the in-cell fuel gas channel 10 of each cell 9 is connected to the fuel gas supplying manifold 21, and a downstream end thereof is connected to the fuel gas discharging manifold 22. With this configuration, the fuel gas supplied from the fuel gas entrance 36 to the fuel gas supplying manifold 21 flows through the in-cell fuel gas channel 10 of each cell 9 while contacting the anode 3, and is discharged through the fuel gas discharging manifold 22 and the fuel gas exit 38. Moreover, an upstream end of the in-cell oxidizing gas channel 11 of each cell 9 is connected to the oxidizing gas supplying manifold 23, and a downstream end thereof is connected to the oxidizing gas discharging manifold 24. With this configuration, the oxidizing gas supplied from the oxidizing gas entrance 50 to the oxidizing gas supplying manifold 23 flows through the in-cell oxidizing gas channel 11 of each cell 9 while contacting the cathode 4, and is discharged through the oxidizing gas discharging manifold 24 and the oxidizing gas exit 51. Further, an upstream end of the cooling water channel of each cell 9 is connected to the cooling water supplying manifold 25, and a downstream end thereof is connected to the cooling water discharging manifold 26. With this configuration, the cooling water supplied to an entrance of the cooling water supplying manifold 25 flows through the cooling water channel 12 formed between adjacent cells 9, and is discharged from an exit of the cooling water discharging manifold 26.

Fuel Gas System

Hereinafter, the configuration of the fuel gas system will be explained. Passages of the fuel gas system are constituted by passages of a fuel gas supplying system configured to supply the fuel gas to the fuel cell 1, an anode gas passage 97 in the fuel cell 1, and passages of a fuel gas discharging system configured to discharge the fuel gas from the fuel cell 1. Herein, the "anode gas passage 97" denotes a passage formed in the fuel cell 1 by the fuel gas supplying manifold 21, the in-cell fuel gas channel 10, and the fuel gas discharging manifold 22.

First, the configuration of the fuel gas supplying system configured to supply the fuel gas to the fuel cell 1 will be explained. The fuel gas supplying system includes a material gas supplying passage 31, a fuel gas supplying portion 32, a fuel gas supplying passage 35, and a fuel gas supplying valve 71. The fuel gas supplying valve 71 is an on-off valve configured to open and close the fuel gas supplying passage 35. The present embodiment shows a domestic fuel cell system, and uses as the fuel gas supplying portion 32 a reformer configured to generate a hydrogen-rich fuel gas using a city gas. In the fuel cell system for use in cars, a high-pressure hydrogen tank or the like can be used as the fuel gas supplying portion 32.

An upstream end of the material gas supplying passage 31 is connected to a pipe of a material gas (for example, a city gas made of a natural gas), and is provided with a material gas supplier (not shown), such as a plunger pump, configured to supply the material gas while adjusting its flow rate. A downstream end of the material gas supplying passage 31 is connected to the fuel gas supplying portion 32.

The fuel gas supplying portion 32 includes a reformer, a shift converter, and a purifier (not shown) arranged in this order in a flow direction of a processed gas. The reformer includes a reforming catalyst, and generates a hydrogen-rich reformed gas from the material gas using water and heat. The reformer is configured such that a below-described combustor 33 can supply combustion heat thereto. The shift converter includes a shift catalyst, and converts CO in the reformed gas into hydrogen and $CO_2$ to lower a CO concentration of the reformed gas. The purifier includes an oxidation catalyst, and oxidizes the reformed gas having the lowered CO concentration to further lower the CO concentration of the reformed gas to 10 ppm or lower. This reformed gas is supplied from the fuel gas supplying portion 32 to the fuel gas supplying passage 35 as the fuel gas. The fuel gas contains a large amount of moisture added when reforming.

A fuel gas exit 34 of the fuel gas supplying portion 32 is connected to an upstream end of the fuel gas supplying passage 35, and a downstream end of the fuel gas supplying passage 35 is connected to the fuel gas entrance 36 of the fuel cell 1. The fuel gas entrance 36 of the fuel cell 1 is communicated with the fuel gas supplying manifold 21. With this configuration, the fuel gas supplied to the fuel cell 1 flows through the fuel gas supplying manifold 21 and the in-cell fuel gas channel 10 to the anode 3, and reacts with the oxidizing gas herein to generate electricity and heat. Thus, the fuel gas is consumed.

Next, the fuel gas discharging system configured to discharge the fuel gas from the fuel cell 1 will be explained. The fuel gas discharging system includes a fuel gas discharging passage 37, a fuel gas discharging valve 72, a combustor 33, and a flue gas discharging passage 40. The fuel gas discharging valve 72 is an on-off valve configured to open and close the fuel gas discharging passage 37.

The fuel gas discharging manifold 22 of the fuel cell 1 is communicated with the fuel gas exit 38, and the fuel gas exit 38 is connected to a gas entrance 39 of the combustor 33 through the fuel gas discharging passage 37. The unreacted fuel gas unconsumed in the fuel cell 1 is discharged through the in-cell fuel gas channel 10 and the fuel gas discharging manifold 22 to the fuel gas discharging passage 37, and then flows into the combustor 33. Herein, the combustor 33 is constituted by a burner, and mixes the fuel gas discharged from the fuel cell 1 and combustion air to burn the mixture. A gas exit of the combustor 33 is connected to the flue gas discharging passage 40, so that an exhaust gas from the combustor 33 can be discharged to outside of the fuel cell system 100.

Figure 4:
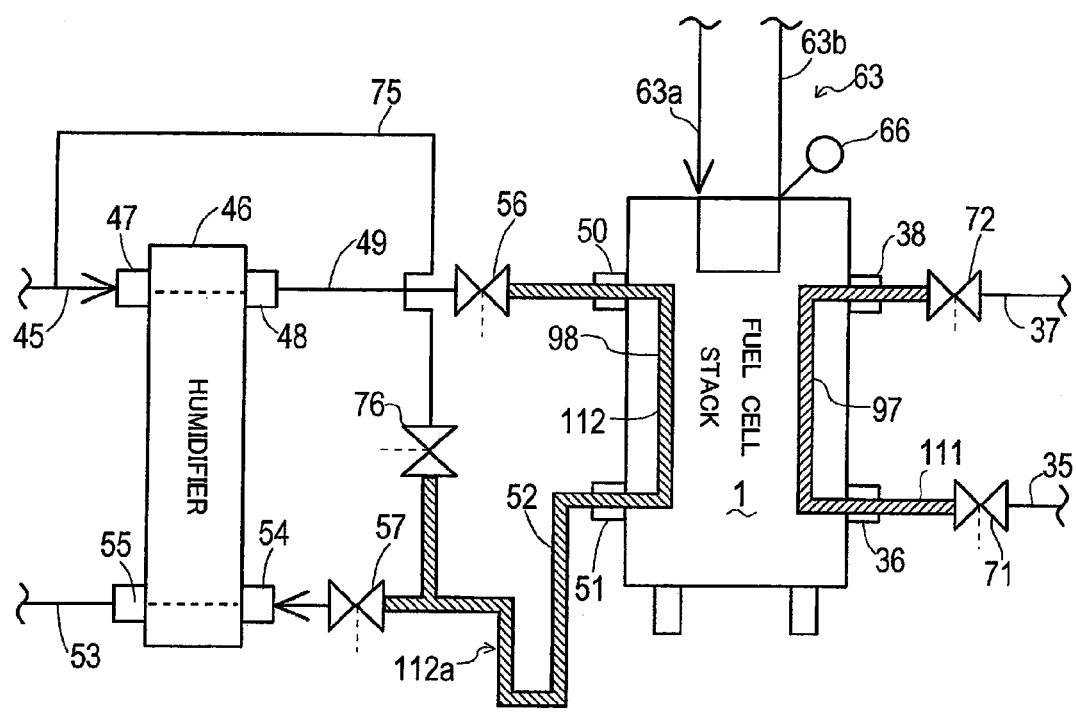
FIG. 4 is a partially enlarged view of the functional block diagram of the fuel cell system for explaining a fuel gas filled space and an oxidizing gas filled space.

As shown in FIG. 4, in the above-described fuel gas system, inner spaces of passages practically isolated (sealed) from outside by closing the fuel gas supplying valve 71 and the fuel gas discharging valve 72 are hereinafter referred to as "fuel gas filled space 111." To be specific, inner spaces (i.e., a portion shown by double lines in FIG. 4) of a portion of the fuel gas supplying passage 35 which portion extends from the fuel gas supplying valve 71 to the fuel gas entrance 36 of the fuel cell 1, the anode gas passage 97, and a portion of the fuel gas discharging passage 37 which portion extends from the fuel gas exit 38 of the fuel cell 1 to the fuel gas discharging valve 72 are hereinafter referred to as "fuel gas filled space 111."

Oxidizing Gas System

Next, the configuration of the oxidizing gas system will be explained. Passages of the oxidizing gas system are constituted by passages of an oxidizing gas supplying system configured to supply the oxidizing gas to the fuel cell 1, a cathode gas passage in the fuel cell 1, passages of an oxidizing gas discharging system configured to discharge the oxidizing gas from the fuel cell 1, and passages of the bypass system. Herein, a "cathode gas passage 98" denotes a passage formed in the fuel cell 1 by the oxidizing gas supplying manifold 23, the in-cell oxidizing gas channel 11, and the oxidizing gas discharging manifold 24.

First, the oxidizing gas supplying system configured to supply the oxidizing gas to the fuel cell 1 will be explained. The oxidizing gas supplying system includes an oxidizing gas supplying portion 41, a non-humidified oxidizing gas supplying passage 45, a humidifier 46, an oxidizing gas supplying passage 49, and an oxidizing gas supplying valve 56. The oxidizing gas supplying portion 41 is constituted by a blower 42 and a filter 43. Used herein as the oxidizing gas is air from outside.

An oxidizing gas intake passage 73 is connected to a gas entrance of the blower 42, so that the air can be obtained from outside by the blower 42. A gas exit of the blower 42 is connected to a gas entrance of the filter 43 through an unpurified oxidizing gas supplying passage 43a. The filter 43 removes, from the air supplied from outside, impurities (such as NOx and SOx) which become obstacles for an electric power generating performance of the fuel cell.

A gas exit 44 of the oxidizing gas supplying portion 41 is connected to a gas entrance 47 of the humidifier 46 through the non-humidified oxidizing gas supplying passage 45. An upstream end of a below-described bypass passage 75 is connected to the non-humidified oxidizing gas supplying passage 45. The humidifier 46 is a total enthalpy heat exchanger constituted by an ion-exchange membrane or a hollow fiber. The humidifier 46 humidifies the air supplied from the oxidizing gas supplying portion 41 by heat exchange with the oxidizing gas discharged from the fuel cell 1.

A gas exit 48 of the humidifier 46 is connected to the oxidizing gas entrance 50 of the fuel cell 1 through the oxidizing gas supplying passage 49. The oxidizing gas supplying valve 56 configured to open and close the oxidizing gas supplying passage 49 is disposed on the oxidizing gas supplying passage 49. The oxidizing gas entrance 50 is connected to the oxidizing gas supplying manifold 23. The oxidizing gas having flowed into the fuel cell 1 flows through the oxidizing gas supplying manifold 23 and the in-cell oxidizing gas channel 11 to the cathode 4, and reacts with the fuel gas herein to generate electricity and heat. Thus, the oxidizing gas is consumed.

Next, the oxidizing gas discharging system configured to discharge the oxidizing gas from the fuel cell 1 will be explained. The oxidizing gas discharging system includes an oxidizing gas discharging passage 52, an oxidizing gas discharging valve 57, the humidifier 46, and an exhaust oxidizing gas discharging passage 53.

The oxidizing gas exit 51 of the fuel cell 1 is connected to a gas entrance 54 of the humidifier 46 through the oxidizing gas discharging passage 52. The oxidizing gas discharging valve 57 configured to open and close the oxidizing gas discharging passage 52 is disposed on the oxidizing gas discharging passage 52. The exhaust oxidizing gas discharging passage 53 is connected to a gas exit 55 of the humidifier 46, so that an exhaust oxidizing gas discharged from the humidifier 46 can be discharged to outside of the system.

The oxidizing gas unreacted in the fuel cell 1 flows through the in-cell oxidizing gas channel 11 and the oxidizing gas discharging manifold 24 to be discharged from the oxidizing gas exit 51 to the oxidizing gas discharging passage 52. Hereinafter, the oxidizing gas having flowed out through the fuel cell 1 to the oxidizing gas discharging passage 52 is referred to as "discharged oxidizing gas."

In the oxidizing gas discharging system configured as above, the discharged oxidizing gas in the oxidizing gas discharging passage 52 flows into the humidifier 46 to be used for the heat exchange. The heat and moisture of the discharged oxidizing gas is utilized to humidify the oxidizing gas flowing through the oxidizing gas supplying system. The discharged oxidizing gas having been used for the heat exchange is discharged through the exhaust oxidizing gas discharging passage 53 to outside (atmosphere).

Hereinafter, the bypass system will be explained. The bypass system includes a bypass passage 75 and a bypass valve 76 configured to open and close the bypass passage 75. An upstream end of the bypass passage 75 is connected to the non-humidified oxidizing gas supplying passage 45 connecting the gas exit 44 of the oxidizing gas supplying portion 41 and the gas entrance 47 of the humidifier 46. Moreover, a downstream end of the bypass passage 75 is connected to the oxidizing gas discharging passage 52 connecting the oxidizing gas exit 51 of the fuel cell 1 and the gas entrance 54 of the humidifier 46. The bypass valve 76 is an on-off valve disposed at a position close to the downstream end of the bypass passage 75.

Hereinafter, features of the oxidizing gas system will be explained. As shown in FIG. 4, in the oxidizing gas system configured as above, inner spaces of passages practically isolated (sealed) from outside by closing the oxidizing gas supplying valve 56, the oxidizing gas discharging valve 57, and the bypass valve 76 are hereinafter referred to as "oxidizing gas filled space 112." To be specific, inner spaces (i.e., a portion shown by diagonal lines in FIG. 4) of a portion of the oxidizing gas supplying passage 49 which portion extends from the oxidizing gas supplying valve 56 to the oxidizing gas entrance 50 of the fuel cell 1, the cathode gas passage 98, a portion of the oxidizing gas discharging passage 52 which portion extends from the oxidizing gas exit 51 of the fuel cell 1 to the oxidizing gas discharging valve 57, and a portion of the bypass passage 75 which portion extends from a connection portion where the bypass passage 75 and the oxidizing gas discharging passage 52 are connected to each other to the bypass valve 76 are hereinafter referred to as "oxidizing gas filled space 112."

A portion of the oxidizing gas filled space 112 which portion is located downstream of the oxidizing gas exit 51 is referred to as "discharged oxidizing gas filled space 112a." To be specific, a space constituted by the portion of the oxidizing gas discharging passage 52 which portion extends from the oxidizing gas exit 51 to the oxidizing gas discharging valve 57 and the portion of the bypass passage 75 which portion extends from the connection portion where the bypass passage 75 and the oxidizing gas discharging passage 52 are connected to each other to the bypass valve 76 is the discharged oxidizing gas filled space 112a.

A volume of the discharged oxidizing gas filled space 112a is equal to or more than one time a spatial volume of the cathode gas passage 98. To be specific, a diameter of the oxidizing gas discharging passage 52 and positions of the oxidizing gas discharging valve 57 and the bypass valve 76 are determined such that the volume of the discharged oxidizing gas filled space 112a becomes equal to or more than one time the spatial volume of the cathode gas passage 98. It is desirable that an upper limit of the volume of the discharged oxidizing gas filled space 112a be set to be as large a value as possible in terms of design.

Cooling System

Hereinafter, the cooling system will be explained. The cooling system includes a cooling water supplying portion 60 and a cooling water circulation circuit 63. The cooling water supplying portion 60 is constituted by a cooler 61 and a cooling water pump 62.

The cooler 61 stores and cools down the cooling water. The cooling water pump 62 pump the cooling water to the cooling water circulation circuit 63. The cooling water circulation circuit 63 is a circulation circuit of the cooling water and is constituted by: the cooling water supplying portion 60; a supplying passage 63a connecting the cooling water supplying portion 60 and the entrance of the cooling water supplying manifold 25 of the fuel cell 1; the cooling water supplying manifold 25; the cooling water channel 12 formed between adjacent cells 9; the cooling water discharging manifold 26; and a return passage 63b connecting the exit of the cooling water discharging manifold 26 and the cooling water supplying portion 60.

In the cooling system configured as above, the cooling water in the cooler 61 of the cooling water supplying portion 60 is pumped by the cooling water pump 62 to the supplying passage 63a, flows through the cooling water supplying manifold 25, the cooling water channel 12, and the cooling water discharging manifold 26 of the fuel cell 1 to the return passage 63b, and returns to the cooling water supplying portion 60. As above, since the cooling water circulating in the cooling water circulation circuit 63 recovers exhaust heat from the fuel cell 1, the fuel cell 1 is cooled down and is maintained at a predetermined temperature.

Temperature Detector 66

The fuel cell 1 includes the temperature detector 66 configured to detect the temperature of the fuel cell 1 when the fuel cell 1 is operating and is not operating. In the present embodiment, a thermocouple or a thermistor configured to detect the temperature of the cooling water having flowed out from the fuel cell 1 (i.e., from the exit of the cooling water discharging manifold 26) is included as the temperature detector 66 in the cooling water circulation circuit 63. The thermocouple or the thermistor as the temperature detector 66 is configured to detect the temperature of the cooling water to indirectly detect the temperature of the fuel cell 1. However, the present embodiment is not limited to the temperature detector 66, and any detector can be used as long as it can directly or indirectly detect the temperature of the fuel cell 1. For example, a thermocouple or a thermistor configured to detect the temperature of the cooling water flowing into the fuel cell 1 (i.e., into the entrance of the cooling water supplying manifold 25) may be included as the temperature detector in the cooling water circulation circuit 63, and may detect the temperature of the cooling water to indirectly detect the temperature of the fuel cell 1. Moreover, for example, a groove may be formed on the anode separator 5 or the cathode separator 6 of the fuel cell 1, and a thermocouple may be placed in the groove to directly detect the temperature of the fuel cell 1.

Configuration of Control System of Fuel Cell System 100

Next, the configuration of the control system of the fuel cell system will be explained. The control system of the fuel cell system 100 includes the controller 65 having a control portion 81, a storage portion 82, a timer portion 83, and an input-output portion 84. The control portion 81 receives signals from the timer portion 83 and the input-output portion 84, and causes the storage portion 82 to store calculation results and the like according to need.

The control portion 81 receives detection signals from a temperature detector (not shown) of the fuel gas supplying portion 32, a fuel gas filled space pressure detector 88, an oxidizing gas filled space pressure detector 89, and a voltage measuring portion 90, and controls operations of the combustor 33, the fuel gas supplying valve 71, the fuel gas discharging valve 72, the oxidizing gas supplying valve 56, the oxidizing gas discharging valve 57, the bypass valve 76, the blower 42, the cooling water pump 62, and an electric power circuit portion 91 based on programs stored in the storage portion 82 and parameter values given from the input-output portion 84.

The controller 65 is constituted by a microcomputer, and a CPU is used as the control portion 81. For example, an internal memory is used as the storage portion 82. For example, a clock circuit with calendar is used as the timer portion 83. In the present embodiment, one controller 65 and one control portion 81 are provided and carry out centralized control. However, a plurality of controllers 65 and a plurality of control portions 81 may be provided and carry out distributed control.

Basic Operation of Fuel Cell System 100

Next, a basic operation of the fuel cell system 100 configured as above will be explained. The controller 65 controls the fuel cell system 100 to execute this operation. Operations of the fuel cell system 100 include a start-up operation, an electric power generation operation, an electric power generation stop operation, and a stand-by operation. At the time of start-up, the controller 65 carries out start-up control of starting up the fuel cell system 100 in accordance with a predetermined procedure to smoothly shift to an electric power generating state. At the time of the electric power generation, the controller 65 carries out electric power generating control to generate the electric power in the fuel cell system 100. At the time of stop of the electric power generation, the controller 65 carries out electric power generation stop control of smoothly stopping the fuel cell system 100 in accordance with a predetermined procedure from the electric power generating state. After the electric power generation stop control is terminated, the system shifts to a stand-by state. At the time of the stand-by, the controller 65 carries out stand-by control of standing by for a next start-up command.

In the fuel cell system 100 at the time of the electric power generation, the fuel gas supplying valve 71, the fuel gas discharging valve 72, the oxidizing gas supplying valve 56, and the oxidizing gas discharging valve 57 are open, and the bypass valve 76 is closed. When the fuel gas and the oxidizing gas are supplied to the fuel cell 1, and the output controller 64 starts obtaining the electric power, the electric power generation is carried out in the anode 3 and the cathode 4 by the electrochemical reaction. Moreover, in the cooling system, since the cooling water circulates in the cooling water circulation circuit 63, the heat generated by the fuel cell 1 is recovered to adjust the temperature of the fuel cell 1.

At the time of the electric power generation of the fuel cell system 100, the oxygen in the oxidizing gas is consumed in the cathode 4 by the electrochemical reaction. Therefore, an oxygen concentration of the oxidizing gas discharged from the oxidizing gas exit 51 is lower than the oxygen concentration of the oxidizing gas to be supplied from the oxidizing gas entrance 50. Generally, a utilization ratio of the oxidizing gas supplied to the cathode 4 is about 40 to 60% in light of a voltage drop due to a diffusion resistance and an electric power generation efficiency. As a result, the oxygen concentration of the oxidizing gas to be supplied is about 21% whereas the oxygen concentration of the oxidizing gas discharged is 9 to 13%. In the present embodiment, the utilization ratio of the oxidizing gas is set to 55%. The oxygen concentration of the oxidizing gas discharged becomes 10%.

Figure 5:
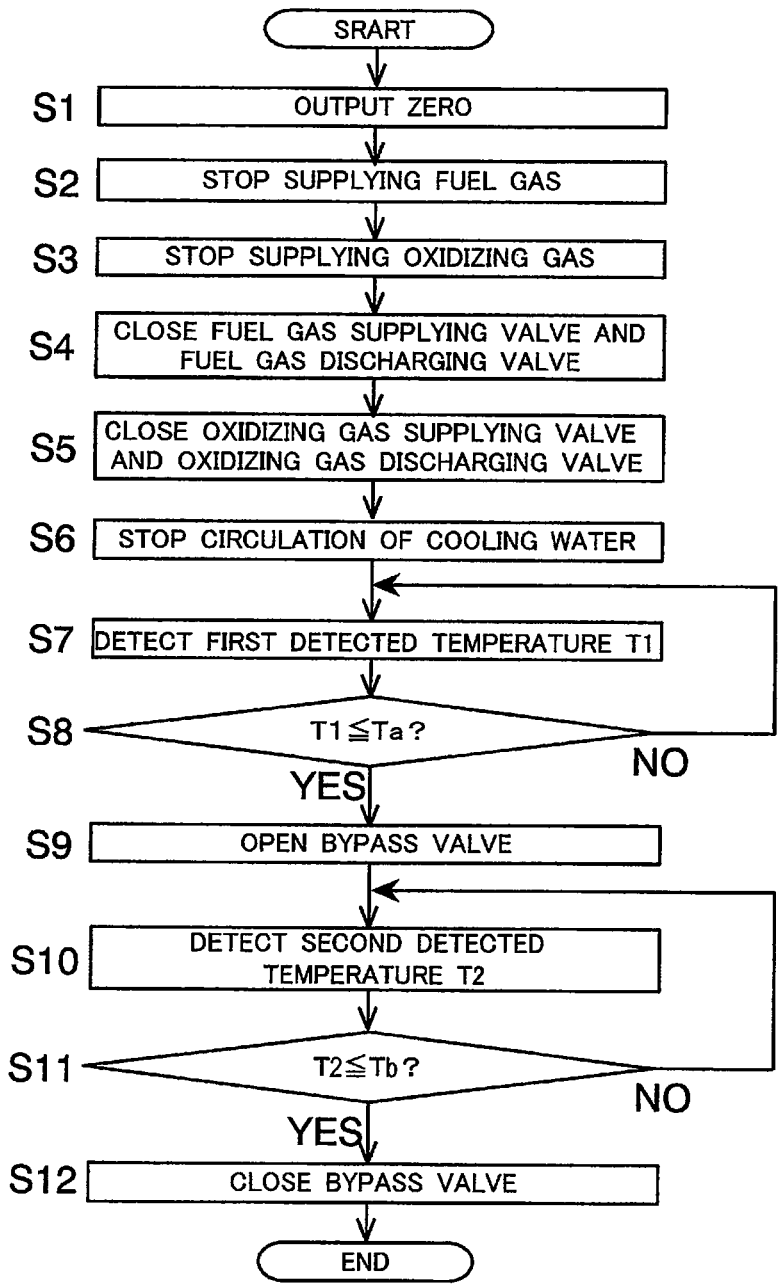
FIG. 5 is a flow chart showing a control operation performed when the fuel cell system according to Embodiment 1 stops generating the electric power.

Next, the electric power generation stop operation that is a characteristic operation of Embodiment 1 will be explained. FIG. 5 is a flow chart showing a control operation performed when the fuel cell system according to Embodiment 1 stops generating the electric power.

The controller 65 having received an electric power generation stop command starts the electric power generation stop control. First, the controller 65 outputs an output zero command to the output controller 64 (Step S1). The output controller 64 sets the electric power obtained from the fuel cell 1 to zero. With this, the fuel cell system 100 stops generating the electric power.

Next, the controller 65 outputs a control signal to the fuel gas supplying portion 32 to stop supplying the fuel gas from the fuel gas supplying portion 32 to the fuel cell 1 (Step S2), and also outputs the control signal to the oxidizing gas supplying portion 41 to stop supplying the oxidizing gas from the oxidizing gas supplying portion 41 to the fuel cell 1 (Step S3).

Next, the controller 65 transmits the control signal to each of the fuel gas supplying valve 71 and the fuel gas discharging valve 72 to close these valves 71 and 72 (Step S4). By closing the fuel gas supplying valve 71 and the fuel gas discharging valve 72, the fuel gas filled space 111 constituted by the in-cell fuel gas channel 10 and the space communicated with the in-cell fuel gas channel 10 is practically isolated from outside. Further, the controller 65 transmits the control signal to each of the oxidizing gas supplying valve 56 and the oxidizing gas discharging valve 57 to close these valves 56 and 57 (Step S5). By closing the oxidizing gas supplying valve 56 and the oxidizing gas discharging valve 57, the oxidizing gas filled space 112 constituted by the in-cell oxidizing gas channel 11 and the space communicated with the in-cell oxidizing gas channel 11 is practically isolated from outside. Then, the controller 65 transmits the control signal to the cooling water supplying portion 60 to stop cooling-down and circulation of the cooling water (Step S6).

In a state where supplying and discharging the fuel gas and the oxidizing gas to and from the fuel cell 1 are stopped in accordance with the above flow, both the fuel gas filled space 111 and the oxidizing gas filled space 112 are isolated from outside. Later, negative pressure is generated in the oxidizing gas filled space 112 in the fuel cell 1 due to the reaction between the hydrogen in the fuel gas and the oxygen in the oxidizing gas and water condensation caused by the decrease in temperature of the fuel cell 1.

Here, the controller 65 obtains a first detected temperature T1 detected by the temperature detector 66 (Step S7), and compares a bypass valve open temperature Ta and the first detected temperature T1 (Step S8).

The temperature of the fuel cell 1 in a case where the pressure in the oxidizing gas filled space 112 is decreased to such a negative pressure that this pressure cannot secure the gas seal performances of the gaskets 7 and 8 is calculated experimentally or theoretically. Then, the calculated temperature is preset in the controller 65 as the bypass valve open temperature Ta. For example, in a case where the temperature of the fuel cell when the fuel cell is operating is 70° C., and the bypass valve open temperature Ta is 60° C., the pressure drop due to the water condensation caused by the temperature decrease from 70 to 60° C. is about 10 kPa according to a saturated steam curve. In the case of this degree of pressure change, the gas seal performances of the gaskets 7 and 8 can be secured. It is preferable that the value of the bypass valve open temperature Ta be suitably adjusted depending on a pressure resistance of the gasket.

The controller 65 compares the bypass valve open temperature Ta and the first detected temperature T1. As a result, when the first detected temperature T1 is higher than the bypass valve open temperature Ta (T1>Ta, NO in Step S8), the process returns to Step S7.

In contrast, when the first detected temperature T1 is equal to or lower than the bypass valve open temperature Ta (T1≤Ta, YES in Step S8), a negative pressure releasing operation becomes necessary. This is because the pressure in the oxidizing gas filled space 112 is decreased to such a negative pressure that this pressure cannot secure the gas seal performances of the gaskets 7 and 8. Therefore, the controller 65 outputs the control signal to the bypass valve 76 to open the bypass valve 76 (Step S9). By opening the bypass valve 76, the outside air purified by the filter 43 is sucked through the bypass passage 75 to the oxidizing gas filled space 112. The outside air flows into the oxidizing gas filled space 112 from the oxidizing gas discharging passage 52 located downstream of the cathode gas passage 98. Then, the discharged oxidizing gas in the oxidizing gas discharging passage 52 is pushed back by the outside air, and therefore flows into the cathode gas passage 98 in the fuel cell 1 only by the volume reduced by the negative pressure.

Next, the controller 65 obtains a second detected temperature T2 detected by the temperature detector 66 (Step S10), and compares a bypass valve closed temperature Tb and the second detected temperature T2 (Step S11).

The bypass valve closed temperature Tb is calculated experimentally or theoretically such that: when the temperature of the fuel cell 1 has become the bypass valve closed temperature Tb, the oxidizing gas filled space 112 is sealed again; and even if the temperature of the fuel cell 1 changes to a normal temperature, the pressure in the oxidizing gas filled space 112 can adequately secure the gas seal performances of the gaskets 7 and 8. Then, the calculated temperature is preset in the controller 65. For example, in a case where the bypass valve closed temperature Tb is 40° C., the pressure change caused by the temperature change from 40° C. to the normal temperature (25° C.) is 5 kPa or less. In the case of this degree of pressure change, the gas seal performances of the gaskets 7 and 8 can be adequately secured.

The controller 65 compares the bypass valve closed temperature Tb and the second detected temperature T2. As a result, when the second detected temperature T2 is higher than the bypass valve closed temperature Tb (T2>Tb, NO in Step S11), the process returns to Step S10. In contrast, when the second detected temperature T2 is equal to or lower than the bypass valve closed temperature Tb (T2≤Tb, YES in Step S11), the controller 65 outputs the control signal to the bypass valve 76 to close the bypass valve 76 (Step S12), and then terminates the electric power generation stop control.

As described above, in the fuel cell system 100 according to Embodiment 1, at the time of the stop of the electric power generation, the passages of the fuel gas system and the passages of the oxidizing gas system are sealed, and the negative pressure generated in the cathode gas passage 98 of the fuel cell 1 by this sealing is released by sucking the outside air into the oxidizing gas discharging passage 52 located downstream of the oxidizing gas exit 51 of the fuel cell 1 and pushing back the discharged oxidizing gas, having the low oxygen concentration in the oxidizing gas discharging passage 52, to the cathode gas passage 98 in the fuel cell 1. As above, since the negative pressure in the cathode gas passage 98 of the fuel cell 1 is released, it is possible to suppress the deterioration of the catalyst of the cathode 4 when the system is not generating the electric power (when the system starts up, stops the electric power generation, or stands by).

Normally, in the cathode 4, the catalyst located at an upstream portion of the in-cell oxidizing gas channel 11 deteriorates more than the catalyst located at a downstream portion of the in-cell oxidizing gas channel 11. In contrast, in the present embodiment, since the discharged oxidizing gas is supplied from a downstream side of the cathode gas passage 98, the discharged oxidizing gas reacts with the downstream-side catalyst of the cathode 4. Thus, it is possible to suppress the deterioration of the upstream-side catalyst of the cathode 4 when the system is not generating the electric power. With this, the deterioration of the entire cathode 4 can be prevented.

Moreover, the discharged oxidizing gas is supplied to the cathode gas passage 98 only once when the fuel cell system 100 is not generating the electric power. Therefore, a potential cycle applied to the catalyst is once. On this account, it is possible to prevent the deterioration of the catalyst of the cathode 4 due to a repetition of application of the potential cycle when the system is not generating the electric power. It is desirable that the supply of the discharged oxidizing gas to the cathode gas passage 98 be carried out during the electric power generation stop operation of the fuel cell system 100 at the time of the stop of the electric power generation. However, the supply of the discharged oxidizing gas to the cathode gas passage 98 may be carried out while the system is standing by.

Since the volume of the discharged oxidizing gas filled space 112a is equal to or more than one time the spatial volume of the cathode gas passage 98, most of the gas pushed back from the discharged oxidizing gas filled space 112a to the cathode gas passage 98 at the time of the stop of the electric power generation is the discharged oxidizing gas having the lower oxygen concentration than the outside air. Therefore, a cross leak amount of hydrogen used to consume the oxygen having flowed into the cathode gas passage 98 is reduced, and wasteful consumption of the fuel gas not contributing to the electric power generation or the heat recovery is reduced. Thus, the energy efficiency can be improved. In addition, the discharged oxidizing gas supplied to the cathode gas passage 98 and having the low oxygen concentration is generated when the system is operating (generating the electric power), so that the fuel cell system 100 does not require any special oxygen reducing mechanism.

Here, the reason why the volume of the discharged oxidizing gas filled space 112a is set to be equal to or more than one time the spatial volume of the cathode gas passage 98 will be explained in reference to FIG. 6. FIG. 6 is a diagram showing a calculation example of the amount of volume reduction of the gas in the cathode gas passage.

A spatial volume of a portion of the fuel gas filled space 111 which portion is located upstream of the oxidizing gas exit 51 is set as a stack volume A. To be specific, the spatial volumes of the cathode gas passage 98 and a portion of the oxidizing gas supplying passage 49 which portion is located upstream of the oxidizing gas supplying valve 56 are set as a stack volume A. The temperature of the fuel cell 1 at the time of the stop of the electric power generation is set to 70° C., and the pressure is set to 1 Pa (=760 mmHg). In this state, the discharged oxidizing gas is assumed to be pushed back to the cathode gas passage 98 in the fuel cell 1. FIG. 6 shows the process of the calculation of the amount of volume reduction in a case where the discharged oxidizing gas has flowed into the stack volume A as an additional gas, and the temperature of the fuel cell 1 is decreased to the normal temperature (25° C.). In accordance with this calculation result, when the fuel cell 1 is cooled down to 25° C., the additional gas occupies 0.35 time the stack volume A. The discharged oxidizing gas contains a large amount of moisture. Therefore, in consideration of the condensation of this moisture, the volume of the gas (additional gas) flowing into the stack volume A at the time of the stop of the electric power generation is about one time the stack volume A at most. Normally, the oxidizing gas supplying valve 56 is disposed on the oxidizing gas supplying passage 49 and in the vicinity of the oxidizing gas entrance 50 of the fuel cell 1. Therefore, the stack volume A may be substantially equal to the spatial volume of the cathode gas passage 98. To be specific, the volume of the discharged oxidizing gas filled space 112a is set to be equal to or more than one time the spatial volume of the cathode gas passage 98. With this, most of the gas pushed back to the cathode gas passage 98 becomes the discharged oxidizing gas having the low oxygen concentration.

Embodiment 2

Figure 7:
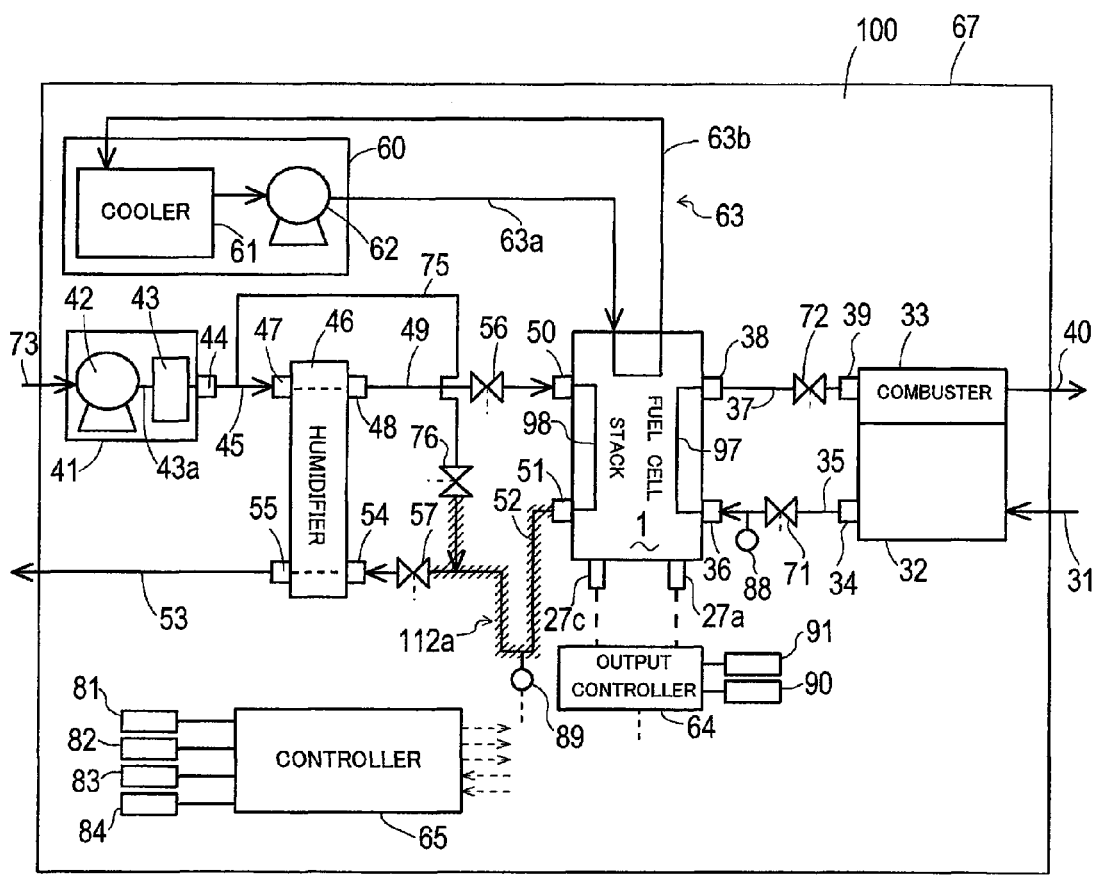
FIG. 7 is a functional block diagram schematically showing the configuration of the fuel cell system according to Embodiment 2.

Embodiment 2 of the present invention will be explained. The fuel cell system 100 according to Embodiment 2 is substantially the same in configuration as the fuel cell system 100 according to Embodiment 1 except for the configuration of the control system. Therefore, hereinafter, the configuration of the control system of the fuel cell system 100 will be explained in reference to FIG. 7. FIG. 7 is a functional block diagram schematically showing the configuration of the fuel cell system according to Embodiment 2.

Configuration of Control System of Fuel Cell System 100

As shown in FIG. 7, the fuel cell system 100 according to Embodiment 2 includes a pressure detector 89 configured to detect the pressure in the oxidizing gas filled space 112. To be specific, the fuel cell system 100 includes the pressure detector 89 configured to detect the pressure in a series of internal spaces of a portion of the oxidizing gas supplying passage 49 which portion extends between the oxidizing gas supplying valve 56 and the oxidizing gas entrance 50, the cathode gas passage 98, a portion of the oxidizing gas discharging passage 52 which portion extends between the oxidizing gas exit 51 and the oxidizing gas discharging valve 57, and a portion of the bypass passage 75 which portion extends between the bypass valve 76 and the connection portion where the bypass passage 75 and the oxidizing gas discharging passage 52 are connected to each other. In the present embodiment, used as the pressure detector is an oxidizing gas filled space pressure detector included for operation control of the fuel cell system 100. Therefore, it is unnecessary to include an additional detector, which is economical. However, the pressure detector 89 may be provided separately from the oxidizing gas filled space pressure detector.

Operations of Fuel Cell System 100

Figure 8:
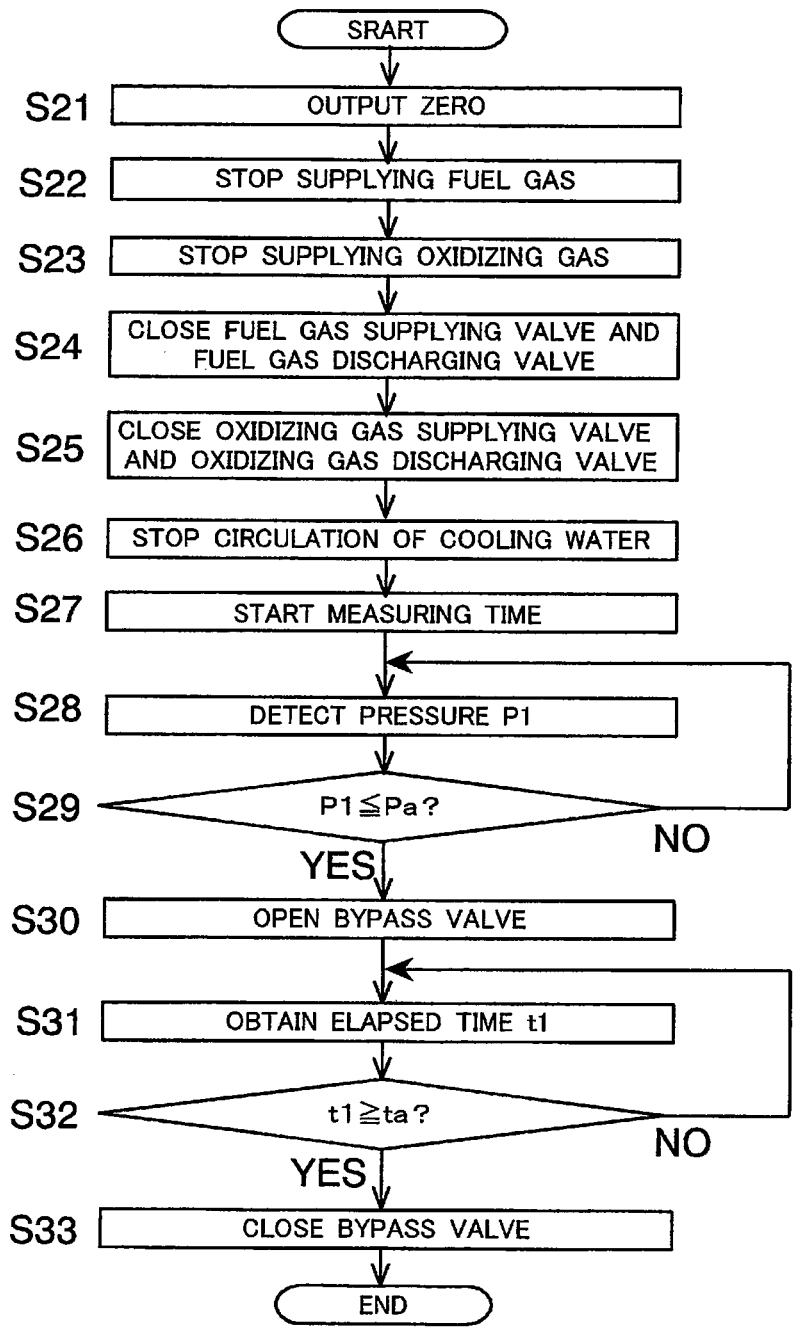
FIG. 8 is a flow chart showing the control operation performed when the fuel cell system according to Embodiment 2 stops generating the electric power.

Hereinafter, the operations of the fuel cell system 100 will be explained. The basic operations of the fuel cell system 100 at the time of the start-up and the electric power generation are substantially the same as the basic operations of the fuel cell system 100 according to Embodiment 1, so that explanations thereof are omitted. Hereinafter, the electric power generation stop operation that is a characteristic operation of the fuel cell system 100 according to Embodiment 2 will be explained in reference to FIG. 8. FIG. 8 is a flow chart showing a control operation performed when the fuel cell system according to Embodiment 2 stops generating the electric power.

First, the controller 65 having received the electric power generation stop command outputs the output zero command to the output controller 64 (Step S21). The output controller 64 sets the electric power obtained from the fuel cell 1 to zero. With this, the fuel cell system 100 stops generating the electric power.

Next, the controller 65 outputs the control signal to the fuel gas supplying portion 32 to stop supplying the fuel gas from the fuel gas supplying portion 32 to the fuel cell 1 (Step S22), and also outputs the control signal to the oxidizing gas supplying portion 41 to stop supplying the oxidizing gas from the oxidizing gas supplying portion 41 to the fuel cell 1 (Step S23).

Next, the controller 65 transmits the control signal to each of the fuel gas supplying valve 71 and the fuel gas discharging valve 72 to close these valves 71 and 72 (Step S24). By closing the fuel gas supplying valve 71 and the fuel gas discharging valve 72, the fuel gas filled space 111 constituted by the in-cell fuel gas channel 10 and the space communicated with the in-cell fuel gas channel 10 is practically isolated from outside.

Further, the controller 65 transmits the control signal to each of the oxidizing gas supplying valve 56 and the oxidizing gas discharging valve 57 to close these valves 56 and 57 (Step S25). By closing the oxidizing gas supplying valve 56 and the oxidizing gas discharging valve 57, the oxidizing gas filled space 112 constituted by the in-cell oxidizing gas channel 11 and the space communicated with the in-cell oxidizing gas channel 11 is practically isolated from outside. Next, the controller 65 transmits the control signal to the cooling water supplying portion 60 to stop cooling-down and circulation of the cooling water (Step S26).

As described above, supplying and discharging the fuel gas and the oxidizing gas to and from the fuel cell 1 are stopped, and the fuel gas filled space 111 and the oxidizing gas filled space 112 are sealed. In this state, the controller 65 causes the timer portion 83 to start measuring time (Step S27).

Supplying and discharging the fuel gas and the oxidizing gas to and from the fuel cell 1 are stopped, and the fuel gas filled space 111 and the oxidizing gas filled space 112 are sealed. Therefore, later, the negative pressure is generated in the oxidizing gas filled space 112 in the fuel cell 1 due to the reaction between the hydrogen in the fuel gas and the oxygen in the oxidizing gas and the water condensation caused by the decrease in temperature of the fuel cell 1.

Here, the controller 65 obtains a detected pressure P1 detected by the pressure detector 89 (Step S28), and compares a bypass valve open pressure Pa and the detected pressure P1 (Step S29).

In the present embodiment, the detected pressure P1 detected by the pressure detector 89 is a difference between the pressure in the oxidizing gas filled space 112 and an atmospheric pressure. This pressure difference between the pressure in the oxidizing gas filled space 112 and the atmospheric pressure in a case where the pressure difference is decreased to such a negative pressure that the pressure difference cannot secure the gas seal performances of the gaskets 7 and 8 is calculated experimentally or theoretically. Then, the calculated pressure difference is preset as the bypass valve open pressure Pa in the controller 65. For example, the bypass valve open pressure Pa can be set to −10 kPa, and it is desirable that the bypass valve open pressure Pa be suitably set in accordance with the pressure resistances of the gaskets 7 and 8. The configuration of the pressure detector 89 is not limited to the above. Any detector may be used as long as it can compare the pressure in the oxidizing gas filled space 112 and an outside pressure. For example, by respectively disposing pressure gauges on the non-humidified oxidizing gas supplying passage 45 and a portion of the oxidizing gas supplying passage 49 which portion is located downstream of the oxidizing gas supplying valve 56, a pressure difference between the pressures detected by these pressure gauges may be used as the detected pressure P1.

The controller 65 compares the bypass valve open pressure Pa and the detected pressure P1. As a result, when the detected pressure P1 is higher than the bypass valve open pressure Pa (P1>Pa, NO in Step S29), the process returns to Step S28.

In contrast, when the detected pressure P1 is equal to or lower than the bypass valve open pressure Pa (P1≤Pa, YES in Step S29), the negative pressure releasing operation becomes necessary. This is because the pressure in the oxidizing gas filled space 112 is decreased to such a negative pressure that this pressure cannot secure the gas seal performances of the gaskets 7 and 8. Therefore, the controller 65 outputs the control signal to the bypass valve 76 to open the bypass valve 76 (Step S30). By opening the bypass valve 76, the outside air purified by the filter 43 is sucked through the bypass passage 75 to the oxidizing gas filled space 112. The outside air flows into the oxidizing gas filled space 112 from the oxidizing gas discharging passage 52 located downstream of the cathode gas passage 98. Then, the discharged oxidizing gas in the oxidizing gas discharging passage 52 is pushed back by the outside air, and therefore flows into the cathode gas passage 98 in the fuel cell 1 only by the volume reduced by the negative pressure.

Next, the controller 65 obtains an elapsed time t1 since the start of the time measurement in Step 27 (Step S31), and compares the elapsed time t1 and a bypass valve closed time ta (Step S32). Herein, a time elapsed since the start of the time measurement is measured as the elapsed time t1. However, a time difference between a time measurement start time and an elapsed time obtaining time may be calculated to obtain the elapsed time t1.

When the bypass valve 76 is open, the pressure in the oxidizing gas filled space 112 is substantially the same as the atmospheric pressure and is constant. Therefore, the operation of closing the bypass valve 76 is carried out based on the elapsed time since the start of the time measurement. The bypass valve closed time ta is experimentally or theoretically calculated such that: when the bypass valve closed time ta has elapsed since the start of the time measurement by the timer portion 83, the oxidizing gas filled space 112 is sealed again; and even if the temperature of the fuel cell 1 changes to the normal temperature, the pressure in the oxidizing gas filled space 112 can adequately secure the gas seal performances of the gaskets 7 and 8. Then, the calculated time ta is preset in the controller 65. For example, in a case where the bypass valve closed time ta is set to two hours, the temperature of the fuel cell 1 decreases to about 40° C. in two hours after the start of the time measurement. Therefore, the gas seal performances of the gaskets 7 and 8 can be adequately secured with respect to the pressure change in the oxidizing gas filled space 112 caused due to the temperature change from 40° C. to the normal temperature.

The controller 65 compares the elapsed time t1 and the bypass valve closed time ta. As a result, when the elapsed time t1 is shorter than the bypass valve closed time ta, i.e., when the bypass valve closed time ta has not yet elapsed since the start of the time measurement (t1<ta, NO in Step S32), the process returns to Step S31.

In contrast, when the elapsed time t1 is equal to or longer than the bypass valve closed time ta, i.e., when the bypass valve closed time ta has elapsed since the start of the time measurement (t1≤ta, YES in Step S32), the controller 65 outputs the control signal to the bypass valve 76 to close the bypass valve 76 (Step S33), and then terminates the stop operation.

As described above, in the fuel cell system 100 according to Embodiment 2, the negative pressure generated in the cathode gas passage 98 of the fuel cell 1 at the time of the stop of the electric power generation is released by sucking the outside air into the oxidizing gas discharging passage 52 located downstream of the oxidizing gas exit 51 of the fuel cell 1 and pushing back the discharged oxidizing gas, having the low oxygen concentration in the oxidizing gas discharging passage 52, to the cathode gas passage 98 in the fuel cell 1. As above, the fuel cell system 100 according to Embodiment 2 can obtain the same operations and effects as the fuel cell system 100 according to Embodiment 1.

In addition, in the fuel cell system 100 according to Embodiment 2, whether or not the oxidizing gas filled space 112 is in a predetermined negative pressure state is determined based on the pressure of the oxidizing gas filled space 112 directly detected by the pressure detector 89. Therefore, more secure control can be carried out.

Whether or not the oxidizing gas filled space 112 is in the predetermined negative pressure state is determined based on the temperature of the fuel cell 1 in Embodiment 1 and is determined based on the pressure in the oxidizing gas filled space 112 in Embodiment 2. However, it may be determined based on both the temperature of the fuel cell 1 and the pressure in the oxidizing gas filled space 112.

Embodiment 3

Figure 9:
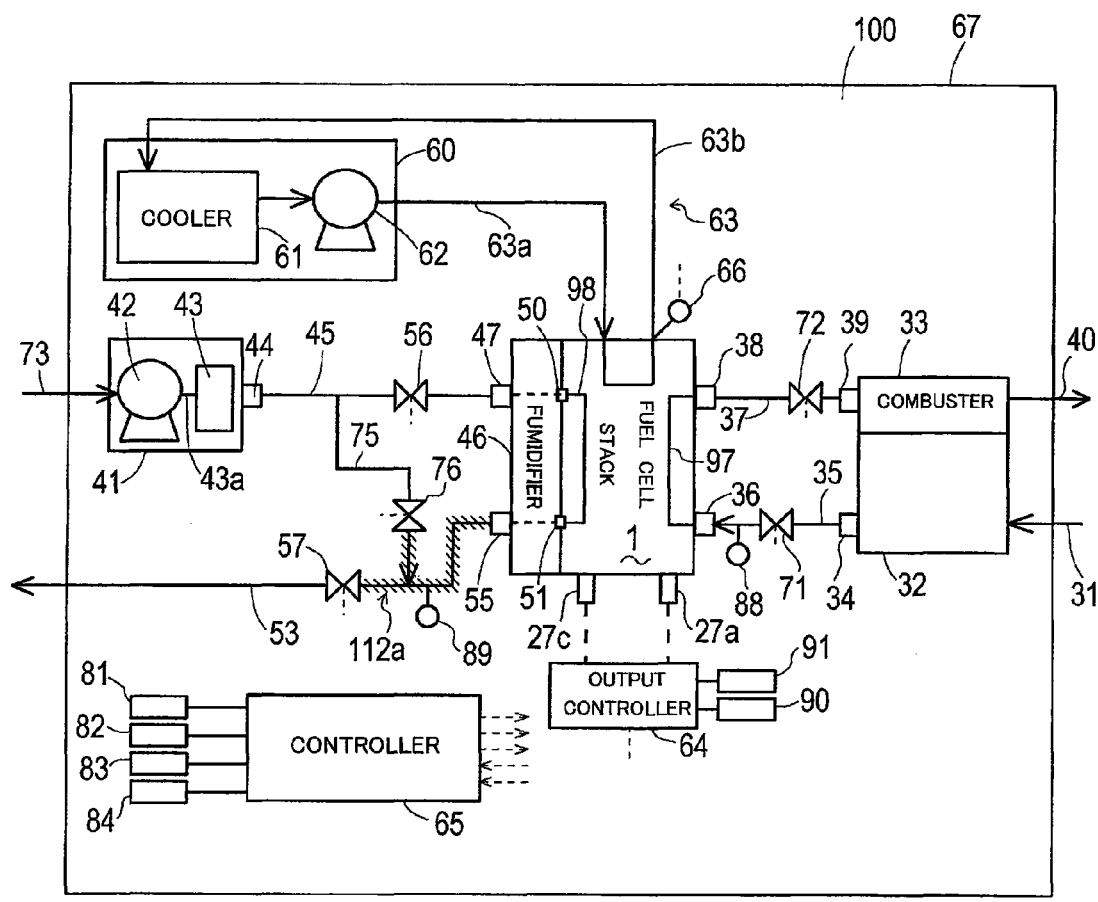
FIG. 9 is a functional block diagram schematically showing the configuration of the fuel cell system according to Embodiment 3.

Embodiment 3 of the present invention will be explained. The fuel cell system 100 according to Embodiment 3 is substantially the same in configuration as the fuel cell system 100 according to Embodiment 1 except for the oxidizing gas system. Therefore, hereinafter, the configuration of the oxidizing gas system of the fuel cell system 100 will be explained in reference to FIG. 9, and explanations of other components are omitted. FIG. 9 is a functional block diagram schematically showing the configuration of the fuel cell system according to Embodiment 3.

Configuration of Oxidizing Gas System

Hereinafter, the configuration of the oxidizing gas system will be explained. Passages of the oxidizing gas system are constituted by the passages of the oxidizing gas supplying system configured to supply the oxidizing gas to the fuel cell 1, the cathode gas passage in the fuel cell 1, the passages of the oxidizing gas discharging system configured to discharge the oxidizing gas from the fuel cell 1, and the passages of the bypass system. Herein, the "cathode gas passage 98" denotes a passage formed in the fuel cell 1 by the oxidizing gas supplying manifold 23, the in-cell oxidizing gas channel 11, and the oxidizing gas discharging manifold 24.

First, the oxidizing gas supplying system configured to supply the oxidizing gas to the fuel cell 1 will be explained. The oxidizing gas supplying system includes the oxidizing gas supplying portion 41, the non-humidified oxidizing gas supplying passage 45, the humidifier 46, and the oxidizing gas supplying valve 56. The oxidizing gas supplying portion 41 is constituted by the blower 42 and the filter 43.

The oxidizing gas intake passage 73 is connected to the gas entrance of the blower 42, so that the air can be obtained from outside by the blower 42. The gas exit of the blower 42 is connected to the gas entrance of the filter 43 through the unpurified oxidizing gas supplying passage 43a. The filter 43 removes, from the air supplied from outside, impurities (such as NOx and SOx) which become obstacles for the electric power generating performance of the fuel cell.

The gas exit 44 of the oxidizing gas supplying portion 41 is connected to the gas entrance 47 of the humidifier 46 through the non-humidified oxidizing gas supplying passage 45. A starting end of the below-described bypass passage 75 is connected to the non-humidified oxidizing gas supplying passage 45. Further, the oxidizing gas supplying valve 56 configured to open and close the non-humidified oxidizing gas supplying passage 45 is disposed on the non-humidified oxidizing gas supplying passage 45.

The humidifier 46 is a total enthalpy heat exchanger constituted by an ion-exchange membrane or a hollow fiber. The humidifier 46 humidifies the air supplied from the oxidizing gas supplying portion 41 by heat exchange with the oxidizing gas discharged from the fuel cell 1. To be specific, the humidifier 46 also serves as a condenser configured to condense and remove the moisture in the oxidizing gas discharged from the fuel cell 1. In the present embodiment, the humidifier 46 is formed integrally with the fuel cell 1. Therefore, a gas exit of the humidifier 46 is coupled to the oxidizing gas entrance 50 of the fuel cell 1. The oxidizing gas entrance 50 is connected to the oxidizing gas supplying manifold 23. The oxidizing gas having flowed into the fuel cell 1 flows through the oxidizing gas supplying manifold 23 and the in-cell oxidizing gas channel 11 to the cathode 4, and reacts with the fuel gas herein to generate electricity and heat. Thus, the oxidizing gas is consumed.

Next, the oxidizing gas discharging system configured to discharge the oxidizing gas from the fuel cell 1 will be explained. The oxidizing gas discharging system includes the humidifier 46, the oxidizing gas discharging valve 57, and the exhaust oxidizing gas discharging passage 53.

The oxidizing gas exit 51 of the fuel cell 1 is coupled to a gas entrance of the humidifier 46. The exhaust oxidizing gas discharging passage 53 is connected to the gas exit 55 of the humidifier 46, so that the exhaust oxidizing gas discharged from the humidifier 46 can be discharged to outside of the system. The oxidizing gas discharging valve 57 configured to open and close the exhaust oxidizing gas discharging passage 53 is disposed on the exhaust oxidizing gas discharging passage 53.

The oxidizing gas unreacted in the fuel cell 1 flows through the in-cell oxidizing gas channel 11, the oxidizing gas discharging manifold 24, and the oxidizing gas exit 51 to the humidifier 46 to be used for the heat exchange. The heat and moisture of the oxidizing gas unreacted in the fuel cell 1 is utilized to humidify the oxidizing gas flowing through the oxidizing gas supplying system. The oxidizing gas having been used for the heat exchange is discharged through the exhaust oxidizing gas discharging passage 53 to outside (atmosphere).

Hereinafter, the bypass system will be explained. The bypass system includes the bypass passage 75 and the bypass valve 76 configured to open and close the bypass passage 75. The upstream end of the bypass passage 75 is connected to a portion of the non-humidified oxidizing gas supplying passage 45 which portion is located upstream of the oxidizing gas supplying valve 56. The downstream end of the bypass passage 75 is connected to a portion of the exhaust oxidizing gas discharging passage 53 which portion is located upstream of the oxidizing gas discharging valve 57. The bypass valve 76 is an on-off valve disposed at a position close to the downstream end of the bypass passage 75.

Hereinafter, features of the oxidizing gas system configured as above will be explained. In the oxidizing gas system, inner spaces of passages practically isolated (sealed) from outside by closing the oxidizing gas supplying valve 56, the oxidizing gas discharging valve 57, and the bypass valve 76 are referred to as the "oxidizing gas filled space 112." To be specific, inner spaces of a portion of the non-humidified oxidizing gas supplying passage 45 which portion extends from the oxidizing gas supplying valve 56 to the gas entrance 47 of the humidifier 46, a humidification passage in the humidifier 46, the cathode gas passage 98, a condensation passage in the humidifier 46, a portion of the exhaust oxidizing gas discharging passage 53 which portion extends from the gas exit 55 of the humidifier 46 to the oxidizing gas discharging valve 57, and a portion of the bypass passage 75 which portion extends from a connection portion where the bypass passage 75 and the exhaust oxidizing gas discharging passage 53 are connected to each other to the bypass valve 76 are referred to as the "oxidizing gas filled space 112."

A portion (portion shown by diagonal lines in FIG. 9) of the oxidizing gas filled space 112 which portion is located downstream of the gas exit 55 of the humidifier 46 is hereinafter referred to as the "discharged oxidizing gas filled space 112a." To be specific, a space constituted by a portion of the exhaust oxidizing gas discharging passage 53 which portion extends from the gas exit 55 of the humidifier 46 to the oxidizing gas discharging valve 57 and a portion of the bypass passage 75 which portion extends from the connection portion where the bypass passage 75 and the exhaust oxidizing gas discharging passage 53 are connected to each other to the bypass valve 76 is the discharged oxidizing gas filled space 112a.

The volume of the discharged oxidizing gas filled space 112a is equal to or more than 0.35 time the spatial volume of the cathode gas passage 98. To be specific, the diameter of the exhaust oxidizing gas discharging passage 53 and the positions of the oxidizing gas discharging valve 57 and the bypass valve 76 are determined such that the volume of the discharged oxidizing gas filled space 112a becomes equal to or more than 0.35 time the spatial volume of the cathode gas passage 98. It is desirable that the upper limit of the volume of the discharged oxidizing gas filled space 112a be set to be as large a value as possible in terms of design.

Here, the reason why the volume of the discharged oxidizing gas filled space 112a is set to be equal to or more than 0.35 time the spatial volume of the cathode gas passage 98 will be explained in reference to FIG. 6. The spatial volume of a portion of the fuel gas filled space 111 which portion is located upstream of the gas exit 55 of the humidifier 46 is set as the stack volume A. To be specific, the spatial volumes of a portion of the non-humidified oxidizing gas supplying passage 45 which portion is located downstream of the oxidizing gas supplying valve 56, the humidification passage of the humidifier 46, the cathode gas passage 98, and the condensation passage of the humidifier 46 are set as the stack volume A. The temperature of the fuel cell 1 at the time of the stop of the electric power generation is set to 70° C., and the pressure is set to 1 Pa (=760 mmHg). The amount of volume reduction in a case where in the above state, the discharged oxidizing gas pushed back to the cathode gas passage 98 in the fuel cell 1 flows into the stack volume A as the additional gas, and the temperature of the fuel cell 1 is decreased to the normal temperature (25° C.) is calculated. In accordance with this calculation result, when the fuel cell 1 is cooled down to 25° C., the additional gas occupies 0.35 time the stack volume A. Since the moisture in the discharged oxidizing gas in the discharged oxidizing gas filled space 112*a* has been removed by the humidifier 46 (condenser), it is unnecessary to consider the condensation of the moisture. Therefore, the volume of the discharged oxidizing gas filled space 112*a* being 0.35 time the stack volume A is enough. Normally, the oxidizing gas supplying valve 56 is disposed on the non-humidified oxidizing gas supplying passage 45 and in the vicinity of the gas entrance 47 of the humidifier 46, and the spatial volume of the passage in the humidifier 46 is adequately smaller than the spatial volume of the cathode gas passage 98. Therefore, the stack volume A may be substantially equal to the spatial volume of the cathode gas passage 98. To be specific, the volume of the discharged oxidizing gas filled space 112*a* is set to be equal to or more than 0.35 time the spatial volume of the cathode gas passage 98. With this, most of the gas pushed back from the discharged oxidizing gas filled space 112*a* to the cathode gas passage 98 becomes the discharged oxidizing gas having the low oxygen concentration.

Embodiment 4

Figure 10:
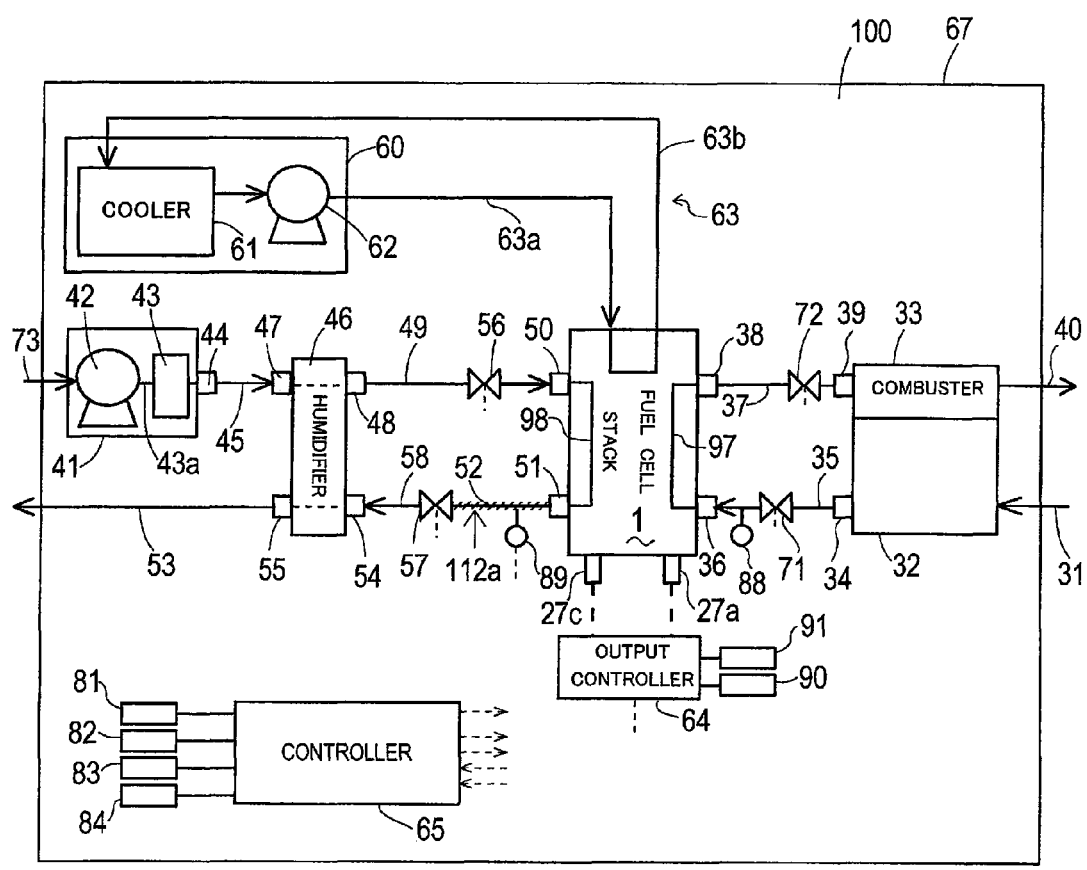
FIG. 10 is a functional block diagram schematically showing the configuration of the fuel cell system according to Embodiment 4.

Embodiment 4 of the present invention will be explained. FIG. 10 is a functional block diagram schematically showing the configuration of the fuel cell system according to Embodiment 4. As shown in FIG. 10, the fuel cell system 100 according to Embodiment 4 is substantially the same in configuration as the fuel cell system 100 according to Embodiment 2 except for the oxidizing gas system. The fuel cell system 100 according to Embodiment 4 is different from the fuel cell system 100 according to Embodiment 2 in that the oxidizing gas system does not include the bypass passage 75 or the bypass valve 76. Specifically, the discharged oxidizing gas filled space 112*a* is constituted by the oxidizing gas discharging passage 52 that is a portion extending from the oxidizing gas exit 51 to the oxidizing gas discharging valve 57, and the pressure detector 89 configured to detect the pressure in the oxidizing gas filled space 112 is disposed on a portion of the oxidizing gas discharging passage 52. The pressure detector 89 detects the pressure in internal spaces of a portion of the oxidizing gas supplying passage 49 which portion is located between the oxidizing gas supplying valve 56 and the oxidizing gas entrance 50, the cathode gas passage 98, and the oxidizing gas discharging passage 52. Moreover, an oxidizing gas discharging valve-humidifier passage 58 is formed so as to connect the oxidizing gas discharging valve 57 and the gas entrance 54 of the humidifier 46.

It is desirable that the volume of the exhaust oxidizing gas discharging passage 53 be set to be larger than the sum of the volume of the oxidizing gas filled space 112*a* and the volume of the oxidizing gas discharging valve-humidifier passage 58. With this configuration, at the time of the stop of the electric power generation, the exhaust oxidizing gas discharging passage 53 is filled with the exhaust oxidizing gas. Therefore, the negative pressure generated in the cathode gas passage 98 of the fuel cell 1 at the time of the stop of the electric power generation can be released by sucking the outside air into the exhaust oxidizing gas discharging passage 53 located downstream of the oxidizing gas filled space 112*a* and pushing back the discharged oxidizing gas, having the low oxygen concentration in the exhaust oxidizing gas discharging passage 53, to the cathode gas passage 98 of the fuel cell 1. On this account, the air located downstream of the exhaust oxidizing gas discharging passage 53 is less likely to flow into the oxidizing gas filled space 112*a*.

Operations of Fuel Cell System 100

Figure 11:
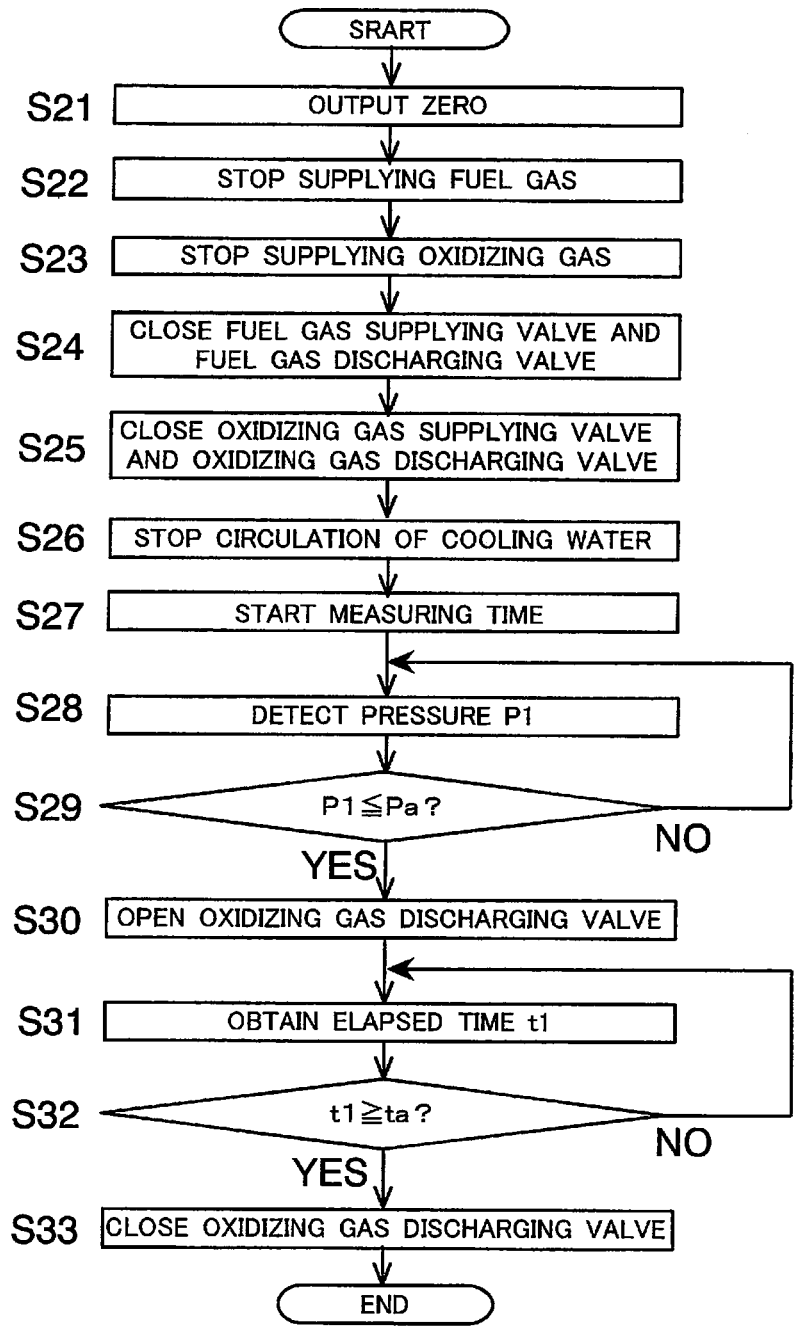
FIG. 11 is a flow chart showing the control operation performed when the fuel cell system according to Embodiment 4 stops generating the electric power.

Hereinafter, the operations of the fuel cell system 100 will be explained. The basic operations of the fuel cell system 100 at the time of the start-up and the electric power generation are substantially the same as the basic operations of the fuel cell system 100 according to Embodiment 2, so that explanations thereof are omitted. Hereinafter, the electric power generation stop operation that is a characteristic operation of the fuel cell system 100 according to Embodiment 4 will be explained in reference to FIG. 11. FIG. 11 is a flow chart showing a control operation performed when the fuel cell system according to Embodiment 4 stops generating the electric power.

The controller 65 carries out Steps S21 to S28 in the same manner as in Embodiment 2 (see FIG. 7). Then, the controller 65 compares an oxidizing gas discharging valve Pa that is the same pressure threshold as the bypass valve open pressure Pa and the detected pressure P1. As a result, when the detected pressure P1 is higher than the oxidizing gas discharging valve open pressure Pa (P1>Pa, NO in Step S29), the process returns to Step S28.

In contrast, when the detected pressure P1 is equal to or lower than the oxidizing gas discharging valve open pressure Pa (P1≤Pa, YES in Step S29), the negative pressure releasing operation becomes necessary. This is because the pressure in the oxidizing gas filled space 112 is decreased to such a negative pressure that this pressure cannot secure the gas seal performances of the gaskets 7 and 8. Therefore, the controller 65 outputs the control signal to the oxidizing gas discharging valve 57 to open the oxidizing gas discharging valve 57 (Step S30). By opening the oxidizing gas discharging valve 57, the discharged oxidizing gas is sucked from a downstream side of the oxidizing gas discharging valve 57 to the oxidizing gas filled space 112. As a result, the discharged oxidizing gas flows into the cathode gas passage 98 in the fuel cell 1 only by the volume reduced by the negative pressure.

Then, the controller 65 compares the elapsed time t1 and an oxidizing gas discharging valve open time ta that is the same time threshold as the bypass valve closed time ta. As a result, when the elapsed time t1 is shorter than the oxidizing gas discharging valve closed time ta, i.e., when the oxidizing gas discharging valve closed time ta has not yet elapsed since the start of the time measurement (t1<ta, NO in Step S32), the process returns to Step S31.

In contrast, when the elapsed time t1 is equal to or longer than the oxidizing gas discharging valve closed time ta, i.e., when the oxidizing gas discharging valve closed time ta has elapsed since the start of the time measurement (t1≥ta, YES in Step S32), the controller 65 outputs the control signal to the oxidizing gas discharging valve 57 to close the oxidizing gas discharging valve 57 (Step S33), and then terminates the stop operation.

As described above, in the fuel cell system 100 according to Embodiment 4, the negative pressure generated in the cathode gas passage 98 of the fuel cell 1 at the time of the stop of the electric power generation is released by opening the oxidizing gas discharging valve 57 to introduce the discharged oxidizing gas, having the low oxygen concentration in the exhaust oxidizing gas discharging passage 53, through the oxidizing gas discharging valve-humidifier passage 58 to the oxidizing gas filled space 112. As above, the fuel cell system 100 according to Embodiment 4 can obtain the same operations and effects as the fuel cell systems 100 according to Embodiments 1 and 2.

Embodiment 5

Embodiment 5 of the present invention will be explained. Hereinafter, the hardware and control system of the fuel cell system according to Embodiment 5 will be separately explained.

Configuration of Hardware of Fuel Cell System 100

Figure 12:
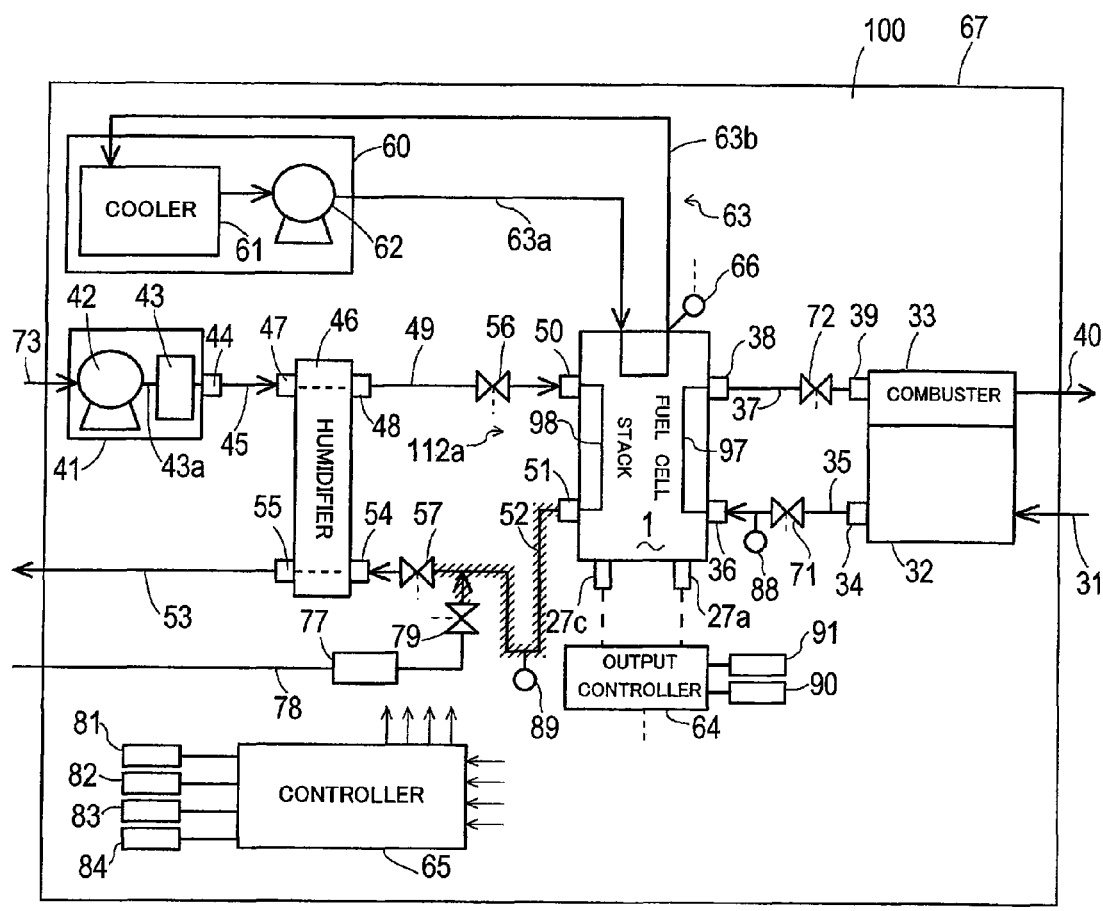
FIG. 12 is a functional block diagram schematically showing the configuration of the fuel cell system according to Embodiment 5.
Figure 13:
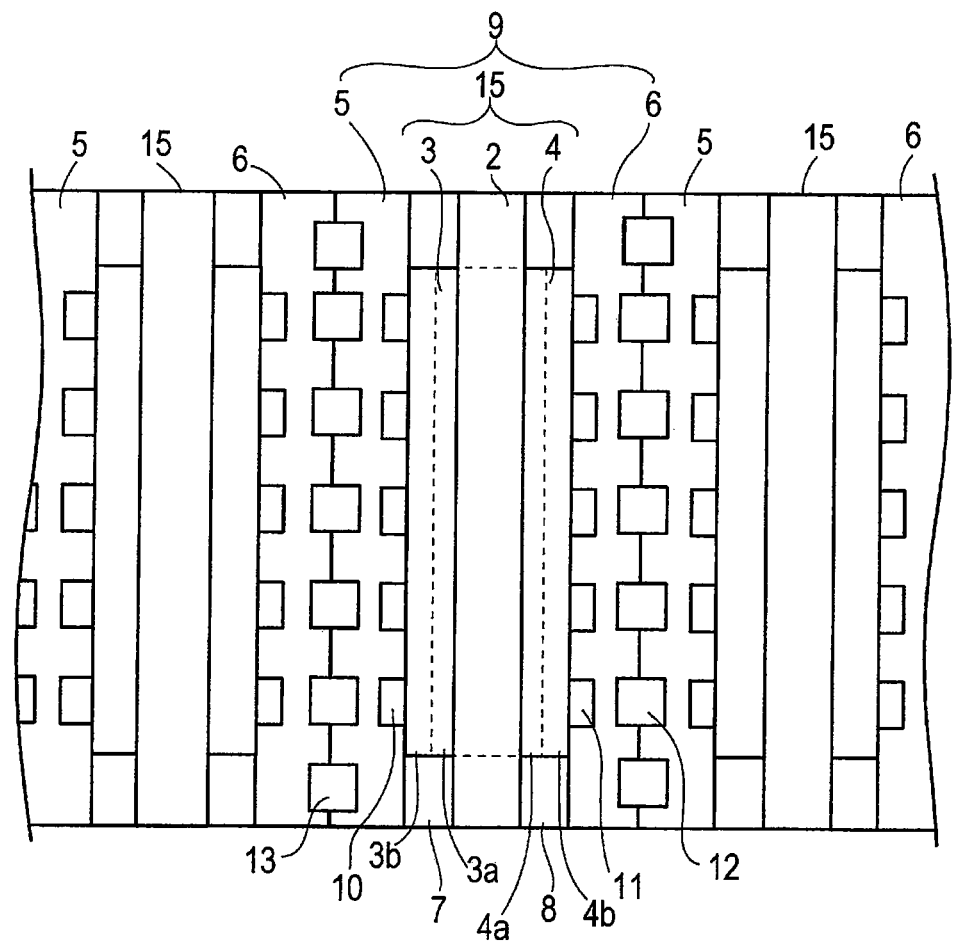
FIG. 13 is a cross-sectional view showing the configuration of the cell.
Figure 14:
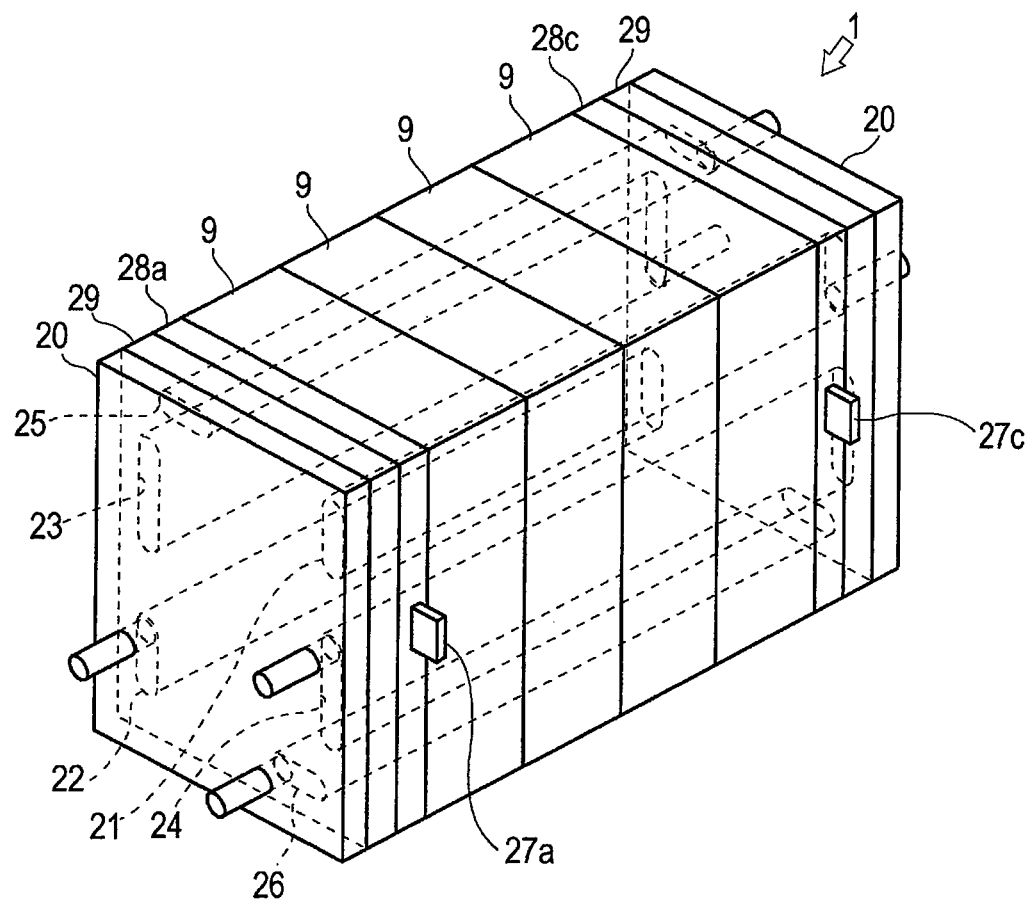
FIG. 14 is a perspective view showing the configuration of the fuel cell.
Figure 15:
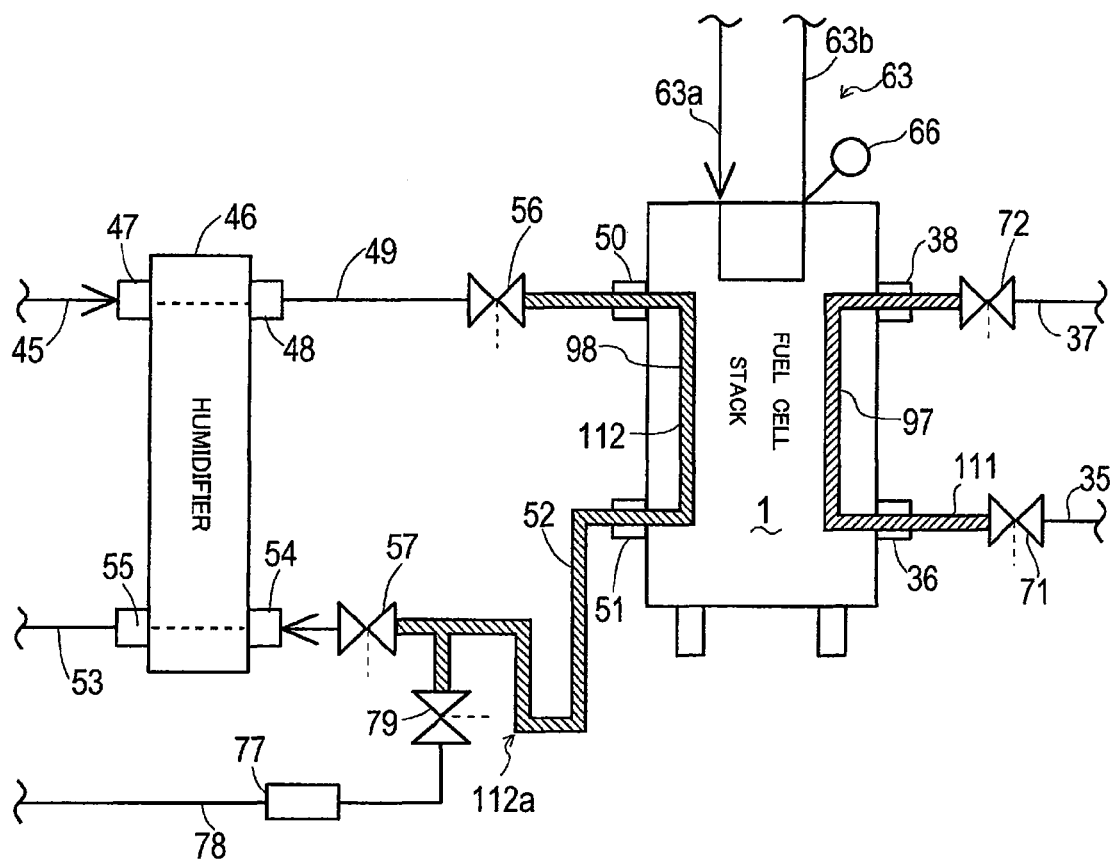
FIG. 15 is a partially enlarged view of the functional block diagram of the fuel cell system for explaining the fuel gas filled space and the oxidizing gas filled space.

First, the configuration of the hardware of the fuel cell system will be explained. FIG. 12 is a functional block diagram schematically showing the configuration of the fuel cell system according to Embodiment 5. FIG. 13 is a cross-sectional view showing the configuration of the cell. FIG. 14 is a perspective view showing the configuration of the fuel cell. FIG. 15 is a partially enlarged view of the functional block diagram of the fuel cell system for explaining the fuel gas filled space and the oxidizing gas filled space.

As shown in FIG. 12, the fuel cell system 100 of the present embodiment includes, as major components, the fuel cell 1, the fuel gas system configured to supply and discharge the fuel gas to and from the fuel cell 1, the oxidizing gas system configured to supply and discharge the oxidizing gas to and from the fuel cell 1, an outside air supplying system that is a feature of the present invention, the cooling system configured to cool down the fuel cell 1, the temperature detector 66 configured to detect the temperature of the fuel cell 1, the controller 65 configured to control the operations of the entire fuel cell system 100, and the output controller 64. Most of the components of the fuel cell system 100 are stored in the casing 67 or attached to the outer surface of the casing 67 so as to be exposed to outside. Hereinafter, the major components of the fuel cell system 100 will be explained in detail.

Fuel Cell 1

Hereinafter, the configuration of the fuel cell 1 (cell stack) will be explained. The fuel cell 1 can be constituted by a polymer electrolyte fuel cell, and the configuration thereof is known. Therefore, the fuel cell 1 will be briefly explained as long as it is related to the present invention. Herein, the fuel cell 1 is the polymer electrolyte fuel cell.

As shown in FIG. 14, the fuel cell 1 includes a plurality of stacked cells 9, a pair of current collectors 28a and 28c sandwiching the stacked cells 9, a pair of insulating plates 29 electrically insulating the cells 9 from outside, and a pair of end plates 20 fastening the stacked cells 9 using fastening members (not shown). A voltage per cell is normally low, i.e., about 0.75 V. Therefore, a plurality of cells 9 are stacked in series in the fuel cell 1 to achieve a high voltage. The current collector 28a is provided with the electric output terminal 27a, and the current collector 28c is provided with the electric output terminal 27c. Current is supplied from the fuel cell 1 through the current collectors 28a and 28c to outside. The output controller 64 is connected to the electric output terminals 27a and 27c. The output controller 64 includes an inverter, and converts DC power output from the fuel cell 1 into AC power to output the AC power. Moreover, the output controller 64 can adjust its output. By adjusting the output of the output controller 64, the electric power generated by the fuel cell 1 is adjusted.

As shown in FIG. 13, the cell 9 includes the polymer electrolyte membrane 2 as a polymer electrolyte layer, and the anode 3 and the cathode 4 are respectively disposed on both main surfaces of the polymer electrolyte membrane 2 except for the peripheral portion of each of both main surfaces of the polymer electrolyte membrane 2. The anode 3, the polymer electrolyte membrane 2, and the cathode 4 constitute the MEA (membrane-electrode assembly) 15. The anode 3 is constituted by the anode catalyst layer 3a and the anode gas diffusion layer 3b arranged to be tightly adhered to each other. The cathode 4 is constituted by the cathode catalyst layer 4a and the cathode gas diffusion layer 4b arranged to be tightly adhered to each other.

The polymer electrolyte membrane 2 is formed by, for example, a solid polymer electrolyte membrane made of perfluorosulfonic acid polymer and having hydrogen ion conductivity. Each of the catalyst layers 3a and 4a is formed by, for example, a mixture of a catalyst in which a porous carbon supports a platinum-ruthenium alloy or a precious metal, such as platinum, and polymer electrolyte having hydrogen ion conductivity. Each of the gas diffusion layers 3b and 4b is formed by, for example, carbon paper or carbon cloth subjected to water repellent finish.

The plate-shaped electrically-conductive anode separator 5 is disposed to contact the anode 3 of the MEA 15, and the plate-shaped electrically-conductive cathode separator 6 is disposed to contact the cathode 4 of the MEA 15. Then, a pair of annular gaskets 7 and 8 respectively disposed on peripheral portions of both main surfaces of the polymer electrolyte membrane 2 respectively seal a gap between the MEA 15 and the anode separator 5 and a gap between the MEA 15 and the cathode separator 6. The groove-like in-cell fuel gas channel 10 is formed on a portion of an inner surface of the anode separator 5 which portion contacts the anode 3. The groove-like in-cell oxidizing gas channel 11 is formed on a portion of an inner surface of the cathode separator 6 which portion contacts the cathode 4. Moreover, grooves are respectively formed on corresponding portions of outer surfaces of the anode separator 5 and the cathode separator 6 arranged adjacently, and these grooves are joined to each other to form the cooling water channel 12.

The fuel cell 1 is constituted by adjacently stacking a plurality of cells 9 configured as above. The annular cooling water gasket 13 seals a gap between adjacent cells 9. As shown in FIG. 14, the fuel cell 1 is provided with the fuel gas supplying manifold 21, the fuel gas discharging manifold 22, the oxidizing gas supplying manifold 23, the oxidizing gas discharging manifold 24, the cooling water supplying manifold 25, and the cooling water discharging manifold 26, each of which extends in the stack direction of the cells 9. The entrance of the oxidizing gas supplying manifold 23 is communicated with the oxidizing gas entrance 50 (see FIG. 12) formed on the outer surface of one of the end plates 20, and the exit of the oxidizing gas discharging manifold 24 is communicated with the oxidizing gas exit 51 formed on the outer surface of the other end plate 20. The entrance of the fuel gas supplying manifold 21 is communicated with the fuel gas entrance 36 formed on the outer surface of one of the end plates 20, and the exit of the fuel gas discharging manifold 22 is communicated with the fuel gas exit 38 formed on the outer surface of the other end plate 20.

The upstream end of the in-cell fuel gas channel 10 of each cell 9 is connected to the fuel gas supplying manifold 21, and the downstream end thereof is connected to the fuel gas discharging manifold 22. With this configuration, the fuel gas supplied from the fuel gas entrance 36 to the fuel gas supplying manifold 21 flows through the in-cell fuel gas channel 10 of each cell 9 while contacting the anode 3, and is discharged through the fuel gas discharging manifold 22 and the fuel gas exit 38. Moreover, the upstream end of the in-cell oxidizing gas channel 11 of each cell 9 is connected to the oxidizing gas supplying manifold 23, and the downstream end thereof is connected to the oxidizing gas discharging manifold 24. With this configuration, the oxidizing gas supplied from the oxidizing gas entrance 50 to the oxidizing gas supplying manifold 23 flows through the in-cell oxidizing gas channel 11 of each cell 9 while contacting the cathode 4, and is discharged through the oxidizing gas discharging manifold 24 and the oxidizing gas exit 51. Further, the upstream end of the cooling water channel of each cell 9 is connected to the cooling water supplying manifold 25, and the downstream end thereof is connected to the cooling water discharging manifold 26. With this configuration, the cooling water supplied to the entrance of the cooling water supplying manifold 25 flows through the cooling water channel 12 formed between adjacent cells 9, and is discharged from the exit of the cooling water discharging manifold 26.

Fuel Gas System

Hereinafter, the configuration of the fuel gas system will be explained. Passages of the fuel gas system are constituted by passages of the fuel gas supplying system configured to supply the fuel gas to the fuel cell 1, the anode gas passage 97 in the fuel cell 1, and passages of the fuel gas discharging system configured to discharge the fuel gas from the fuel cell 1. Herein, the "anode gas passage 97" denotes a passage formed in the fuel cell 1 by the fuel gas supplying manifold 21, the in-cell fuel gas channel 10, and the fuel gas discharging manifold 22.

First, the configuration of the fuel gas supplying system configured to supply the fuel gas to the fuel cell 1 will be explained. As shown in FIG. 12, the fuel gas supplying system includes the material gas supplying passage 31, the fuel gas supplying portion 32, the fuel gas supplying passage 35, and the fuel gas supplying valve 71. The fuel gas supplying valve 71 is an on-off valve configured to open and close the fuel gas supplying passage 35. The present embodiment shows a domestic fuel cell system, and uses as the fuel gas supplying portion 32 a reformer configured to generate a hydrogen-rich fuel gas using a city gas. In the fuel cell system for use in cars, a high-pressure hydrogen tank or the like can be used as the fuel gas supplying portion 32.

The upstream end of the material gas supplying passage 31 is connected to a pipe of a material gas (for example, a city gas made of a natural gas), and is provided with a material gas supplier (not shown), such as a plunger pump, configured to supply the material gas while adjusting its flow rate. The downstream end of the material gas supplying passage 31 is connected to the fuel gas supplying portion 32.

The fuel gas supplying portion 32 includes the reformer, the shift converter, and the purifier (not shown) arranged in this order in the flow direction of a processed gas. The reformer includes the reforming catalyst, and generates the hydrogen-rich reformed gas from the material gas using water and heat. The reformer is configured such that the below-described combustor 33 can supply combustion heat thereto. The shift converter includes the shift catalyst, and converts CO in the reformed gas into hydrogen and $CO_2$ to lower the CO concentration of the reformed gas. The purifier includes the oxidation catalyst, and oxidizes the reformed gas having the lowered CO concentration to further lower the CO concentration of the reformed gas to 10 ppm or lower. This reformed gas is supplied from the fuel gas supplying portion 32 to the fuel gas supplying passage 35 as the fuel gas. The fuel gas contains a large amount of moisture added when reforming.

The fuel gas exit 34 of the fuel gas supplying portion 32 is connected to the upstream end of the fuel gas supplying passage 35, and the downstream end of the fuel gas supplying passage 35 is connected to the fuel gas entrance 36 of the fuel cell 1. The fuel gas entrance 36 of the fuel cell 1 is communicated with the fuel gas supplying manifold 21. With this configuration, the fuel gas supplied to the fuel cell 1 flows through the fuel gas supplying manifold 21 and the in-cell fuel gas channel 10 to the anode 3, and reacts with the oxidizing gas herein to generate electricity and heat. Thus, the fuel gas is consumed.

Next, the fuel gas discharging system configured to discharge the fuel gas from the fuel cell 1 will be explained. The fuel gas discharging system includes the fuel gas discharging passage 37, the fuel gas discharging valve 72, the combustor 33, and the flue gas discharging passage 40. The fuel gas discharging valve 72 is an on-off valve configured to open and close the fuel gas discharging passage 37.

The fuel gas discharging manifold 22 of the fuel cell 1 is communicated with the fuel gas exit 38, and the fuel gas exit 38 is connected to the gas entrance 39 of the combustor 33 through the fuel gas discharging passage 37. The unreacted fuel gas unconsumed in the fuel cell 1 is discharged through the in-cell fuel gas channel 10 and the fuel gas discharging manifold 22 to the fuel gas discharging passage 37, and then flows into the combustor 33. Herein, the combustor 33 is constituted by a burner, and mixes the fuel gas discharged from the fuel cell 1 and combustion air to burn the mixture. The gas exit of the combustor 33 is connected to the flue gas discharging passage 40, so that the exhaust gas from the combustor 33 can be discharged to outside of the fuel cell system 100.

As shown in FIG. 15, in the above-described fuel gas system, inner spaces of passages practically isolated (sealed) from outside by closing the fuel gas supplying valve 71 and the fuel gas discharging valve 72 are hereinafter referred to as the "fuel gas filled space 111." To be specific, inner spaces (i.e., a portion shown by double lines in FIG. 15) of a portion of the fuel gas supplying passage 35 which portion extends from the fuel gas supplying valve 71 to the fuel gas entrance 36 of the fuel cell 1, the anode gas passage 97, and a portion of the fuel gas discharging passage 37 which portion extends from the fuel gas exit 38 of the fuel cell 1 to the fuel gas discharging valve 72 are hereinafter referred to as the "fuel gas filled space 111."

Oxidizing Gas System

Next, the configuration of the oxidizing gas system will be explained. Passages of the oxidizing gas system are constituted by the passages of the oxidizing gas supplying system configured to supply the oxidizing gas to the fuel cell 1, the cathode gas passage in the fuel cell 1, the passages of the oxidizing gas discharging system configured to discharge the oxidizing gas from the fuel cell 1, and the passages of the outside air supplying system. Herein, the "cathode gas passage 98" denotes a passage formed in the fuel cell 1 by the oxidizing gas supplying manifold 23, the in-cell oxidizing gas channel 11, and the oxidizing gas discharging manifold 24.

First, the oxidizing gas supplying system configured to supply the oxidizing gas to the fuel cell 1 will be explained. The oxidizing gas supplying system includes the oxidizing gas supplying portion 41, the non-humidified oxidizing gas supplying passage 45, the humidifier 46, the oxidizing gas supplying passage 49, and the oxidizing gas supplying valve 56. The oxidizing gas supplying portion 41 is constituted by the blower 42 and the filter 43. Used herein as the oxidizing gas is air from outside.

The oxidizing gas intake passage 73 is connected to the gas entrance of the blower 42, so that the air can be obtained from outside by the blower 42. The gas exit of the blower 42 is connected to the gas entrance of the filter 43 through the unpurified oxidizing gas supplying passage 43a. The filter 43 removes, from the air supplied from outside, impurities (such as NOx and SOx) which become obstacles for the electric power generating performance of the fuel cell.

The gas exit 44 of the oxidizing gas supplying portion 41 is connected to the gas entrance 47 of the humidifier 46 through the non-humidified oxidizing gas supplying passage 45. The humidifier 46 is a total enthalpy heat exchanger constituted by an ion-exchange membrane or a hollow fiber. The humidifier 46 humidifies the air supplied from the oxidizing gas supplying portion 41 by heat exchange with the oxidizing gas discharged from the fuel cell 1.

The gas exit 48 of the humidifier 46 is connected to the oxidizing gas entrance 50 of the fuel cell 1 through the oxidizing gas supplying passage 49. The oxidizing gas supplying valve 56 configured to open and close the oxidizing gas supplying passage 49 is disposed on the oxidizing gas supplying passage 49. The oxidizing gas entrance 50 is connected to the oxidizing gas supplying manifold 23. The oxidizing gas having flowed into the fuel cell 1 flows through the oxidizing gas supplying manifold 23 and the in-cell oxidizing gas channel 11 to the cathode 4, and reacts with the fuel gas herein to generate electricity and heat. Thus, the oxidizing gas is consumed.

Next, the oxidizing gas discharging system configured to discharge the oxidizing gas from the fuel cell 1 will be explained. The oxidizing gas discharging system includes the oxidizing gas discharging passage 52, the oxidizing gas discharging valve 57, the humidifier 46, and the exhaust oxidizing gas discharging passage 53.

The oxidizing gas exit 51 of the fuel cell 1 is connected to the gas entrance 54 of the humidifier 46 through the oxidizing gas discharging passage 52. The oxidizing gas discharging valve 57 configured to open and close the oxidizing gas discharging passage 52 is disposed on the oxidizing gas discharging passage 52. The exhaust oxidizing gas discharging passage 53 is connected to the gas exit 55 of the humidifier 46, so that the exhaust oxidizing gas discharged from the humidifier 46 can be discharged to outside of the system.

The oxidizing gas unreacted in the fuel cell 1 flows through the in-cell oxidizing gas channel 11 and the oxidizing gas discharging manifold 24 to be discharged from the oxidizing gas exit 51 to the oxidizing gas discharging passage 52. Hereinafter, the oxidizing gas having flowed out through the fuel cell 1 to the oxidizing gas discharging passage 52 is referred to as the "discharged oxidizing gas."

In the oxidizing gas discharging system configured as above, the discharged oxidizing gas in the oxidizing gas discharging passage 52 flows into the humidifier 46 to be used for the heat exchange. The heat and moisture of the discharged oxidizing gas is utilized to humidify the oxidizing gas flowing through the oxidizing gas supplying system. The discharged oxidizing gas having been used for the heat exchange is discharged through the exhaust oxidizing gas discharging passage 53 to outside (atmosphere).

Hereinafter, the outside air supplying system will be explained. The outside air supplying system includes an outside air supplying passage 78, an outside air supplying valve 79, and a filter 77. One end of the outside air supplying passage 78 is connected to the oxidizing gas discharging passage 52 connecting between the oxidizing gas exit 51 of the fuel cell 1 and the gas entrance 54 of the humidifier 46, and the other end thereof is open to the outside of the casing 67. The other end of the outside air supplying passage 78 may be open to the inside of the casing 67. The outside air supplying passage 78 is provided with the filter 77 as a purifying portion. Then, the outside air supplying valve 79 configured to open and close the outside air supplying passage 78 by control of the controller 65 is disposed between the filter 77 and one end of the outside air supplying passage 78 which end is connected to the oxidizing gas discharging passage 52. The outside air supplying valve 79 is disposed on the outside air supplying passage 78 and at a position close to one end of the outside air supplying passage 78 which end is connected to the oxidizing gas discharging passage 52.

The filter 77 removes, from the outside air supplied through the outside air supplying passage 78 to the oxidizing gas discharging passage 52, impurities (such as NOx and SOx) which become obstacles for the electric power generating performance of the fuel cell. In the present embodiment, the filter 77 is a composite filter formed such that a coarse filter for removing comparatively large dusts and the like, an acid substance removing filter for removing acid substances, an alkaline substance removing filter for removing alkaline substances, and a dust removing filter for removing comparatively small dusts and the like are arranged in this order from the upstream side. The acid substance removing filter is formed by, for example, impregnating an activated carbon fiber sheet formed to have a honeycomb structure with hydroxide salt, such as potassium hydroxide. The alkaline substance removing filter is formed by, for example, impregnating an activated carbon fiber sheet formed to have a honeycomb structure with acid, such as phosphoric acid. The dust removing filter is, for example, a HEPA filter (High Efficiency Particulate Air Filter).

Hereinafter, features of the oxidizing gas system will be explained. As shown in FIG. 15, in the oxidizing gas system configured as above, inner spaces of passages practically isolated (sealed) from outside by closing the oxidizing gas supplying valve 56, the oxidizing gas discharging valve 57, and the supplying valve 76 are hereinafter referred to as the "oxidizing gas filled space 112." To be specific, inner spaces (i.e., a portion shown by diagonal lines in FIG. 15) of a portion of the oxidizing gas supplying passage 49 which portion extends from the oxidizing gas supplying valve 56 to the oxidizing gas entrance 50 of the fuel cell 1, the cathode gas passage 98, a portion of the oxidizing gas discharging passage 52 which portion extends from the oxidizing gas exit 51 of the fuel cell 1 to the oxidizing gas discharging valve 57, and a portion of the outside air supplying passage 78 which portion extends from a connection portion where the outside air supplying passage 78 and the oxidizing gas discharging passage 52 are connected to each other to the outside air supplying valve 79 are hereinafter referred to as the "oxidizing gas filled space 112." Further, a portion of the oxidizing gas filled space 112 which portion is located downstream of the oxidizing gas exit 51 is hereinafter referred to as the "discharged oxidizing gas filled space 112a." Therefore, a space constituted by the portion of the oxidizing gas discharging passage 52 which portion extends from the oxidizing gas exit 51 to the oxidizing gas discharging valve 57 and the portion of the outside air supplying passage 78 which portion extends from the connection portion where the outside air supplying passage 78 and the oxidizing gas discharging passage 52 are connected to each other to the outside air supplying valve 79 is the discharged oxidizing gas filled space 112a.

The volume of the discharged oxidizing gas filled space 112a is equal to or more than one time the spatial volume of the cathode gas passage 98. To be specific, the diameter of the oxidizing gas discharging passage 52 and the positions of the oxidizing gas discharging valve 57 and the outside air supplying valve 79 are determined such that the volume of the discharged oxidizing gas filled space 112a becomes equal to or more than one time the spatial volume of the cathode gas passage 98. It is desirable that the upper limit of the volume of the discharged oxidizing gas filled space 112a be set to be as large a value as possible in terms of design.

Cooling System

Hereinafter, the cooling system will be explained. The cooling system includes the cooling water supplying portion 60 and the cooling water circulation circuit 63. The cooling water supplying portion 60 is constituted by the cooler 61 and the cooling water pump 62. The cooler 61 stores and cools down the cooling water. The cooling water pump 62 pump the cooling water to the cooling water circulation circuit 63. The cooling water circulation circuit 63 is a circulation circuit of the cooling water and is constituted by: the cooling water supplying portion 60; the supplying passage 63a connecting the cooling water supplying portion 60 and the entrance of the cooling water supplying manifold 25 of the fuel cell 1; the cooling water supplying manifold 25; the cooling water channel 12 formed between adjacent cells 9; the cooling water discharging manifold 26; and the return passage 63b connecting the exit of the cooling water discharging manifold 26 and the cooling water supplying portion 60.

In the cooling system configured as above, the cooling water in the cooler 61 of the cooling water supplying portion 60 is pumped by the cooling water pump 62 to the supplying passage 63a, flows through the cooling water supplying manifold 25, the cooling water channel 12, and the cooling water discharging manifold 26 of the fuel cell 1 to the return passage 63b, and returns to the cooling water supplying portion 60. As above, since the cooling water circulating in the cooling water circulation circuit 63 recovers exhaust heat from the fuel cell 1, the fuel cell 1 is cooled down and is maintained at a predetermined temperature.

Temperature Detector 66

The fuel cell 1 includes the temperature detector 66 configured to detect the temperature of the fuel cell 1 when the fuel cell 1 is operating and is not operating. In the present embodiment, a thermocouple or a thermistor configured to detect the temperature of the cooling water having flowed out from the fuel cell 1 (i.e., from the exit of the cooling water discharging manifold 26) is included as the temperature detector 66 in the cooling water circulation circuit 63. The thermocouple or the thermistor as the temperature detector 66 is configured to detect the temperature of the cooling water to indirectly detect the temperature of the fuel cell 1. However, the present embodiment is not limited to the temperature detector 66, and any detector can be used as long as it can directly or indirectly detect the temperature of the fuel cell 1. For example, a thermocouple or a thermistor configured to detect the temperature of the cooling water flowing into the fuel cell 1 (i.e., into the entrance of the cooling water supplying manifold 25) may be included as the temperature detector in the cooling water circulation circuit 63, and may detect the temperature of the cooling water to indirectly detect the temperature of the fuel cell 1. Moreover, for example, a groove may be formed on the anode separator 5 or the cathode separator 6 of the fuel cell 1, and a thermocouple may be placed in the groove to directly detect the temperature of the fuel cell 1.

Configuration of Control System of Fuel Cell System 100

Next, the configuration of the control system of the fuel cell system will be explained. The control system of the fuel cell system 100 includes the controller 65 having the control portion 81, the storage portion 82, the timer portion 83, and the input-output portion 84. The control portion 81 receives signals from the timer portion 83 and the input-output portion 84, and causes the storage portion 82 to store calculation results and the like according to need.

The control portion 81 receives detection signals from the temperature detector (not shown) of the fuel gas supplying portion 32, the fuel gas filled space pressure detector 88, the oxidizing gas filled space pressure detector 89, and the voltage measuring portion 90, and controls operations of the combustor 33, the fuel gas supplying valve 71, the fuel gas discharging valve 72, the oxidizing gas supplying valve 56, the oxidizing gas discharging valve 57, the outside air supplying valve 79, the blower 42, the cooling water pump 62, and the electric power circuit portion 91 based on programs stored in the storage portion 82 and parameter values given from the input-output portion 84.

The controller 65 is constituted by a microcomputer, and a CPU is used as the control portion 81. For example, an internal memory is used as the storage portion 82. For example, a clock circuit with calendar is used as the timer portion 83. In the present embodiment, one controller 65 and one control portion 81 are provided and carry out centralized control. However, a plurality of controllers 65 and a plurality of control portions 81 may be provided and carry out distributed control.

Basic Operation of Fuel Cell System 100

Next, a basic operation of the fuel cell system 100 configured as above will be explained. The controller 65 controls the fuel cell system 100 to execute this operation. Operations of the fuel cell system 100 include operations at the time of the start-up, at the time of the electric power generation, and at the time of the stop of the electric power generation. At the time of start-up, the fuel cell system 100 is started up in accordance with a predetermined procedure so as to smoothly shift to the electric power generating state. At the time of the electric power generation, the electric power generation is carried out. At the time of stop of the electric power generation, the fuel cell system 100 is smoothly stopped from the electric power generating state in accordance with a predetermined procedure.

At the time of the electric power generation, the fuel gas supplying valve 71, the fuel gas discharging valve 72, the oxidizing gas supplying valve 56, and the oxidizing gas discharging valve 57 are open, and the outside air supplying valve 79 is closed. When the fuel gas and the oxidizing gas are supplied to the fuel cell 1, and the output controller 64 starts obtaining the electric power, the electric power generation is carried out in the anode 3 and the cathode 4 by the electrochemical reaction. Moreover, in the cooling system, since the cooling water circulates in the cooling water circulation circuit 63, the heat generated by the fuel cell 1 is recovered to adjust the temperature of the fuel cell 1.

At the time of the electric power generation of the fuel cell system 100, the oxygen in the oxidizing gas is consumed in the cathode 4 by the electrochemical reaction. Therefore, the oxygen concentration of the oxidizing gas discharged from the oxidizing gas exit 51 is lower than the oxygen concentration of the oxidizing gas to be supplied from the oxidizing gas entrance 50. Generally, the utilization ratio of the oxidizing gas supplied to the cathode 4 is about 40 to 60% in light of the voltage drop due to a diffusion resistance and an electric power generation efficiency. As a result, the oxygen concentration of the oxidizing gas to be supplied is about 21% whereas the oxygen concentration of the oxidizing gas discharged is 9 to 13%. In the present embodiment, the utilization ratio of the oxidizing gas is set to 55%. The oxygen concentration of the oxidizing gas discharged becomes about 10%.

Figure 16:
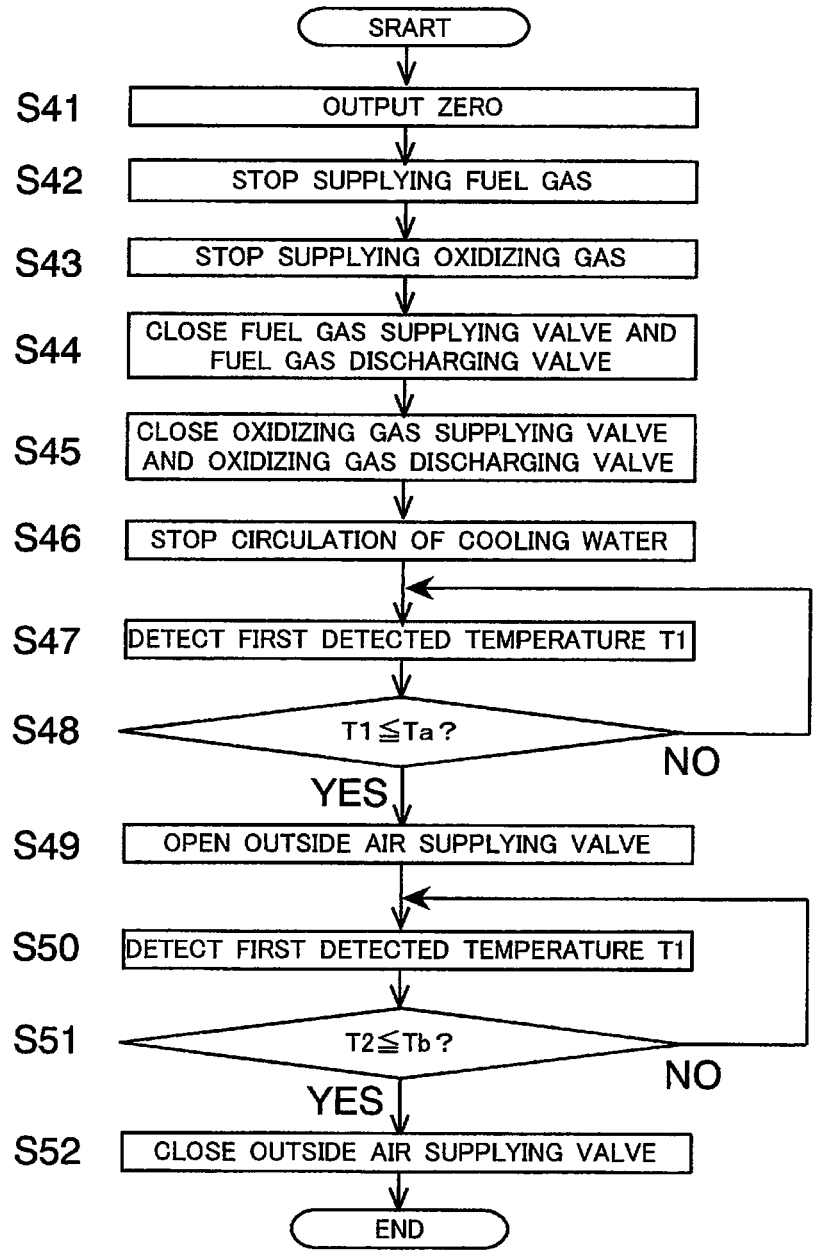
FIG. 16 is a flow chart showing the control operation performed when the fuel cell system according to Embodiment 5 stops generating the electric power.

Next, the stop operation that is a characteristic operation of Embodiment 5 will be explained. FIG. 16 is a flow chart showing a control operation performed when the fuel cell system according to Embodiment 5 stops generating the electric power.

First, the controller 65 having received the electric power generation stop command outputs the output zero command to the output controller 64 (Step S41). The output controller 64 sets the electric power obtained from the fuel cell 1 to zero. With this, the fuel cell system 100 stops generating the electric power.

Next, the controller 65 outputs the control signal to the fuel gas supplying portion 32 to stop supplying the fuel gas from the fuel gas supplying portion 32 to the fuel cell 1 (Step S42), and also outputs the control signal to the oxidizing gas supplying portion 41 to stop supplying the oxidizing gas from the oxidizing gas supplying portion 41 to the fuel cell 1 (Step S43).

Next, the controller 65 transmits the control signal to each of the fuel gas supplying valve 71 and the fuel gas discharging valve 72 to close these valves 71 and 72 (Step S44). By closing the fuel gas supplying valve 71 and the fuel gas discharging valve 72, the fuel gas filled space 111 constituted by the in-cell fuel gas channel 10 and the space communicated with the in-cell fuel gas channel 10 is practically isolated from outside. Further, the controller 65 transmits the control signal to each of the oxidizing gas supplying valve 56 and the oxidizing gas discharging valve 57 to close these valves 56 and 57 (Step S45). By closing the oxidizing gas supplying valve 56 and the oxidizing gas discharging valve 57, the oxidizing gas filled space 112 constituted by the in-cell oxidizing gas channel 11 and the space communicated with the in-cell oxidizing gas channel 11 is practically isolated from outside. Then, the controller 65 transmits the control signal to the cooling water supplying portion 60 to stop cooling-down and circulation of the cooling water (Step S46).

In a state where supplying and discharging the fuel gas and the oxidizing gas to and from the fuel cell 1 are stopped in accordance with the above flow, both the fuel gas filled space 111 and the oxidizing gas filled space 112 are isolated from outside. Later, the negative pressure is generated in the oxidizing gas filled space 112 in the fuel cell 1 due to the reaction between the hydrogen in the fuel gas and the oxygen in the oxidizing gas and the water condensation caused by the decrease in temperature of the fuel cell 1.

Here, the controller 65 obtains a first detected temperature T1 detected by the temperature detector 66 (Step S47), and compares an outside air supplying valve open temperature Ta and the first detected temperature T1 (Step S48).

The temperature of the fuel cell 1 in a case where the pressure in the oxidizing gas filled space 112 is decreased to such a negative pressure that this pressure cannot secure the gas seal performances of the gaskets 7 and 8 is calculated experimentally or theoretically. Then, the calculated temperature is preset in the controller 65 as the "outside air supplying valve open temperature Ta." For example, in a case where the temperature of the fuel cell when the fuel cell is operating is 70° C., and the outside air supplying valve open temperature Ta is 60° C., the pressure drop due to the water condensation caused by the temperature decrease from 70 to 60° C. is about 10 kPa according to a saturated steam curve. In the case of this degree of pressure change, the gas seal performances of the gaskets 7 and 8 can be secured. It is preferable that the value of the outside air supplying valve open temperature Ta be suitably adjusted depending on the pressure resistance of the gasket.

The controller 65 compares the outside air supplying valve open temperature Ta and the first detected temperature T1. As a result, when the first detected temperature T1 is higher than the outside air supplying valve open temperature Ta (T1>Ta, NO in Step S48), the process returns to Step S47.

In contrast, when the first detected temperature T1 is equal to or lower than the outside air supplying valve open temperature Ta (T1≤Ta, YES in Step S48), the negative pressure releasing operation becomes necessary. This is because the pressure in the oxidizing gas filled space 112 is decreased to such a negative pressure that this pressure cannot secure the gas seal performances of the gaskets 7 and 8. Therefore, the controller 65 outputs the control signal to the outside air supplying valve 79 to open the outside air supplying valve 79 (Step S49). By opening the outside air supplying valve 79, the outside air purified by the filter 77 is sucked through the outside air supplying passage 78 to the oxidizing gas filled space 112. The outside air flows into the oxidizing gas filled space 112 from the oxidizing gas discharging passage 52 located downstream of the cathode gas passage 98. Then, the discharged oxidizing gas in the oxidizing gas discharging passage 52 is pushed back by the outside air, and therefore flows into the cathode gas passage 98 in the fuel cell 1 only by the volume reduced by the negative pressure.

Next, the controller 65 obtains a second detected temperature T2 detected by the temperature detector 66 (Step S50), and compares an outside air supplying valve closed temperature Tb and the second detected temperature T2 (Step S51).

The outside air supplying valve closed temperature Tb is calculated experimentally or theoretically such that: when the temperature of the fuel cell 1 has become the outside air supplying valve closed temperature Tb, the oxidizing gas filled space 112 is sealed again; and even if the temperature of the fuel cell 1 changes to the normal temperature, the pressure in the oxidizing gas filled space 112 can adequately secure the gas seal performances of the gaskets 7 and 8. Then, the calculated temperature is preset in the controller 65. For example, in a case where the outside air supplying valve closed temperature Tb is 40° C., the pressure change caused by the temperature change from 40° C. to the normal temperature (25° C.) is 5 kPa or less. In the case of this degree of pressure change, the gas seal performances of the gaskets 7 and 8 can be adequately secured.

The controller 65 compares the outside air supplying valve closed temperature Tb and the second detected temperature T2. As a result, when the second detected temperature T2 is higher than the outside air supplying valve closed temperature Tb (T2>Tb, NO in Step S51), the process returns to Step S50. In contrast, when the second detected temperature T2 is equal to or lower than the outside air supplying valve closed temperature Tb (T2 Tb, YES in Step S51), the controller 65 outputs the control signal to the outside air supplying valve 79 to close the outside air supplying valve 79 (Step S52), and then terminates the control performed at the time of the stop of the electric power generation.

As described above, in the fuel cell system 100 according to Embodiment 5, at the time of the stop of the electric power generation, the passages of the fuel gas system and the passages of the oxidizing gas system are sealed, and the negative pressure generated in the cathode gas passage 98 of the fuel cell 1 by this sealing is released by sucking the outside air into the oxidizing gas discharging passage 52 located downstream of the oxidizing gas exit 51 of the fuel cell 1 and pushing back the discharged oxidizing gas, having the low oxygen concentration in the oxidizing gas discharging passage 52, to the cathode gas passage 98 in the fuel cell 1. As above, since the negative pressure in the cathode gas passage 98 of the fuel cell 1 is released, it is possible to suppress the deterioration of the catalyst of the cathode 4 when the system is not generating the electric power.

Then, since the outside air supplying passage 78 through which the outside air is supplied to the oxidizing gas discharging passage 52 is formed separately from the non-humidified oxidizing gas supplying passage 45 and the oxidizing gas supplying passage 49 through each of which the oxidizing gas is supplied, it does not affect conditions, such as the temperature and dew point of the oxidizing gas used when starting (restarting) the electric power generation.

Normally, in the cathode 4, the catalyst located at the upstream portion of the in-cell oxidizing gas channel 11 deteriorates more than the catalyst located at the downstream portion of the in-cell oxidizing gas channel 11. In contrast, in the present embodiment, since the discharged oxidizing gas is supplied from a downstream side of the cathode gas passage 98, the discharged oxidizing gas reacts with the downstream-side catalyst of the cathode 4. Thus, it is possible to suppress the deterioration of the upstream-side catalyst of the cathode 4 when the system is not generating the electric power. With this, the deterioration of the entire cathode 4 can be prevented.

Moreover, the discharged oxidizing gas is supplied to the cathode gas passage 98 only once after the fuel cell system 100 stops generating the electric power. Therefore, the potential cycle applied to the catalyst is once. On this account, it is possible to prevent the deterioration of the catalyst of the cathode 4 due to a repetition of application of the potential cycle when the system is not generating the electric power.

Since the volume of the discharged oxidizing gas filled space 112a is equal to or more than one time the spatial volume of the cathode gas passage 98, most of the gas pushed back from the discharged oxidizing gas filled space 112a to the cathode gas passage 98 at the time of the stop of the electric power generation is the discharged oxidizing gas having the lower oxygen concentration than the outside air. Therefore, the cross leak amount of hydrogen used to consume the oxygen having flowed into the cathode gas passage 98 is reduced, and wasteful consumption of the fuel gas not contributing to the electric power generation or the heat recovery is reduced. Thus, the energy efficiency can be improved. In addition, the discharged oxidizing gas supplied to the cathode gas passage 98 and having the low oxygen concentration is generated when the system is operating (generating the electric power), so that the fuel cell system 100 does not require any special oxygen reducing mechanism.

Here, the reason why the volume of the discharged oxidizing gas filled space 112a is set to be equal to or more than one time the spatial volume of the cathode gas passage 98 will be explained in reference to FIG. 17. FIG. 17 is a diagram showing a calculation example of the amount of volume reduction of the gas in the cathode gas passage.

The spatial volume of a portion of the fuel gas filled space 111 which portion is located upstream of the oxidizing gas exit 51 is set as the stack volume A. To be specific, the spatial volumes of the cathode gas passage 98 and a portion of the oxidizing gas supplying passage 49 which portion is located upstream of the oxidizing gas supplying valve 56 are set as the stack volume A. The temperature of the fuel cell 1 at the time of the stop of the electric power generation is set to 70° C., and the pressure is set to 1 Pa (=760 mmHg). In this state, the discharged oxidizing gas is assumed to be pushed back to the cathode gas passage 98 in the fuel cell 1. FIG. 17 shows the process of the calculation of the amount of volume reduction in a case where the discharged oxidizing gas has flowed into the stack volume A as an additional gas, and the temperature of the fuel cell 1 is decreased to the normal temperature (25° C.). In accordance with this calculation result, when the fuel cell 1 is cooled down to 25° C., the additional gas occupies 0.35 time the stack volume A. The discharged oxidizing gas contains a large amount of moisture. Therefore, in consideration of the condensation of this moisture, the volume of the gas (additional gas) flowing into the stack volume A at the time of the stop of the electric power generation is about one time the stack volume A at most. Normally, the oxidizing gas supplying valve 56 is disposed on the oxidizing gas supplying passage 49 and in the vicinity of the oxidizing gas entrance 50 of the fuel cell 1. Therefore, the stack volume A may be substantially equal to the spatial volume of the cathode gas passage 98. To be specific, the volume of the discharged oxidizing gas filled space 112a is set to be equal to or more than one time the spatial volume of the cathode gas passage 98. With this, most of the gas pushed back to the cathode gas passage 98 becomes the discharged oxidizing gas having the low oxygen concentration.

Embodiment 6

Figure 18:
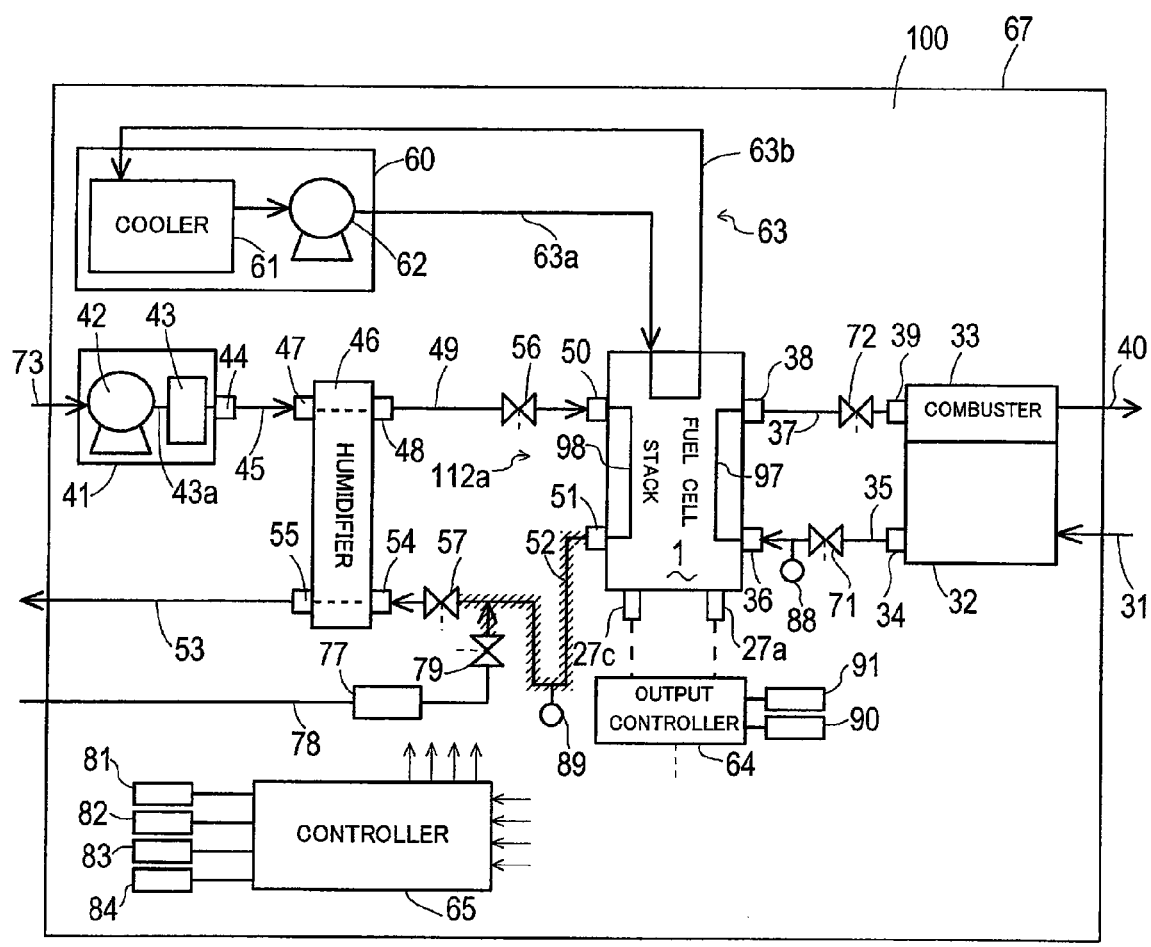
FIG. 18 is a functional block diagram schematically showing the configuration of the fuel cell system according to Embodiment 6.

Embodiment 6 of the present invention will be explained. The fuel cell system 100 according to Embodiment 6 is substantially the same in configuration as the fuel cell system 100 according to Embodiment 5 except for the configuration of the control system. Therefore, hereinafter, the configuration of the control system of the fuel cell system 100 will be explained in reference to FIG. 18. FIG. 18 is a functional block diagram schematically showing the configuration of the fuel cell system according to Embodiment 6.

Configuration of Control System of Fuel Cell System 100

As shown in FIG. 18, the fuel cell system 100 according to Embodiment 2 includes the pressure detector 89 configured to detect the pressure in the oxidizing gas filled space 112. To be specific, the fuel cell system 100 includes the pressure detector 89 configured to detect the pressure in a series of internal spaces of a portion of the oxidizing gas supplying passage 49 which portion extends between the oxidizing gas supplying valve 56 and the oxidizing gas entrance 50, the cathode gas passage 98, a portion of the oxidizing gas discharging passage 52 which portion extends between the oxidizing gas exit 51 and the oxidizing gas discharging valve 57, and a portion of the outside air supplying passage 78 which portion extends between the outside air supplying valve 79 and the connection portion where the outside air supplying passage 78 and the oxidizing gas discharging passage 52 are connected to each other. In the present embodiment, used as the pressure detector is the oxidizing gas filled space pressure detector included for the operation control of the fuel cell system 100. Therefore, it is unnecessary to include an additional detector, which is economical. However, the pressure detector 89 may be provided separately from the oxidizing gas filled space pressure detector.

Operations of Fuel Cell System 100

Figure 19:
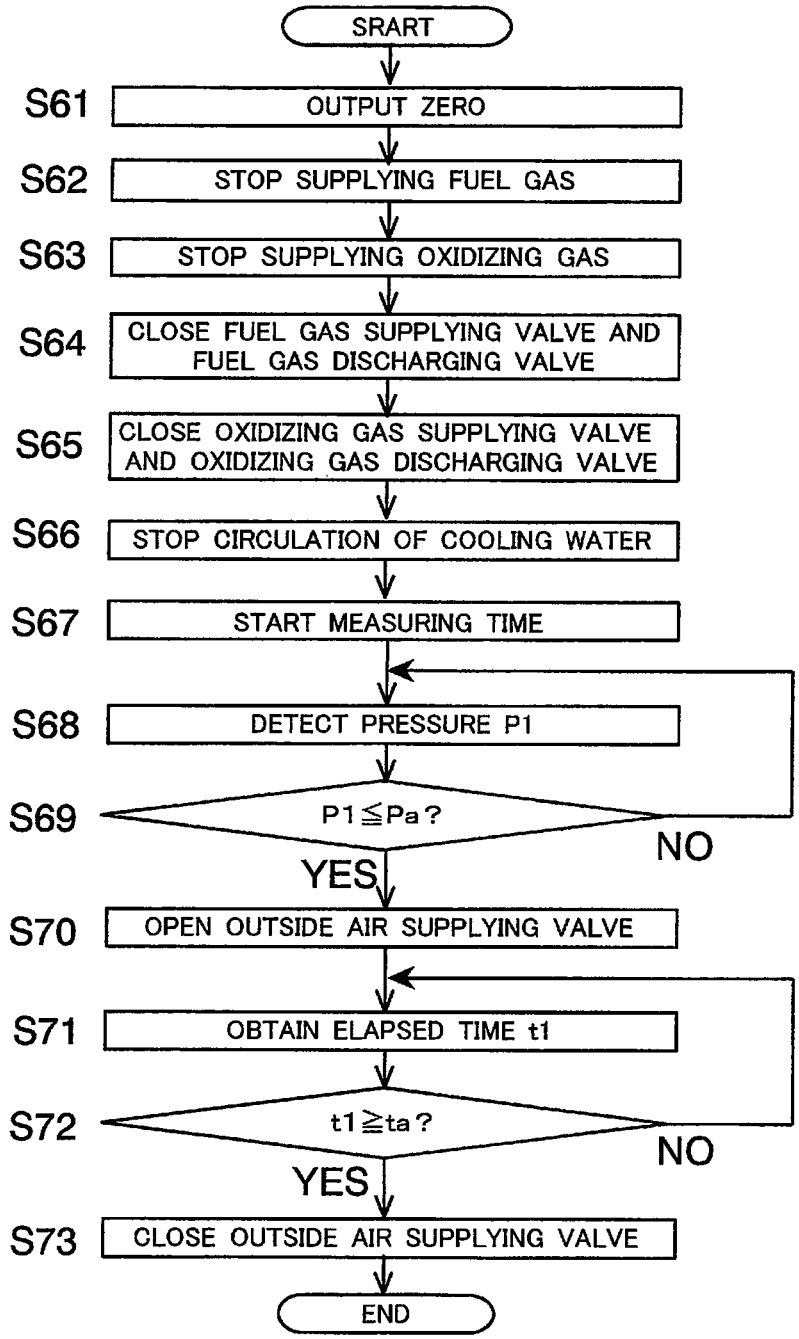
FIG. 19 is a flow chart showing a control operation performed when the fuel cell system according to Embodiment 6 stops generating the electric power.

Hereinafter, the operations of the fuel cell system 100 will be explained. The basic operations of the fuel cell system 100 at the time of the start-up and the electric power generation are substantially the same as the basic operations of the fuel cell system 100 according to Embodiment 5, so that explanations thereof are omitted. Hereinafter, the electric power generation stop operation that is a characteristic operation of the fuel cell system 100 according to Embodiment 6 will be explained in reference to FIG. 19. FIG. 19 is a flow chart showing a control operation performed when the fuel cell system according to Embodiment 6 stops generating the electric power.

First, the controller 65 having received the electric power generation stop command outputs the output zero command to the output controller 64 (Step S61). The output controller 64 sets the electric power obtained from the fuel cell 1 to zero. With this, the fuel cell system 100 stops generating the electric power.

Next, the controller 65 outputs the control signal to the fuel gas supplying portion 32 to stop supplying the fuel gas from the fuel gas supplying portion 32 to the fuel cell 1 (Step S62), and also outputs the control signal to the oxidizing gas supplying portion 41 to stop supplying the oxidizing gas from the oxidizing gas supplying portion 41 to the fuel cell 1 (Step S63).

Next, the controller 65 transmits the control signal to each of the fuel gas supplying valve 71 and the fuel gas discharging valve 72 to close these valves 71 and 72 (Step S64). By closing the fuel gas supplying valve 71 and the fuel gas discharging valve 72, the fuel gas filled space 111 constituted by the in-cell fuel gas channel 10 and the space communicated with the in-cell fuel gas channel 10 is practically isolated from outside.

Further, the controller 65 transmits the control signal to each of the oxidizing gas supplying valve 56 and the oxidizing gas discharging valve 57 to close these valves 56 and 57 (Step S65). By closing the oxidizing gas supplying valve 56 and the oxidizing gas discharging valve 57, the oxidizing gas filled space 112 constituted by the in-cell oxidizing gas channel 11 and the space communicated with the in-cell oxidizing gas channel 11 is practically isolated from outside. Next, the controller 65 transmits the control signal to the cooling water supplying portion 60 to stop cooling-down and circulation of the cooling water (Step S66).

As described above, supplying and discharging the fuel gas and the oxidizing gas to and from the fuel cell 1 are stopped, and the fuel gas filled space 111 and the oxidizing gas filled space 112 are sealed. In this state, the controller 65 causes the timer portion 83 to start measuring time (Step S67).

Supplying and discharging the fuel gas and the oxidizing gas to and from the fuel cell 1 are stopped, and the fuel gas filled space 111 and the oxidizing gas filled space 112 are sealed. Therefore, later, the negative pressure is generated in the oxidizing gas filled space 112 in the fuel cell 1 due to the reaction between the hydrogen in the fuel gas and the oxygen in the oxidizing gas and the water condensation caused by the decrease in temperature of the fuel cell 1.

Here, the controller 65 obtains a detected pressure P1 detected by the pressure detector 89 (Step S68), and compares an outside air supplying valve open pressure Pa and the detected pressure P1 (Step S69).

In the present embodiment, the detected pressure P1 detected by the pressure detector 89 is a difference between the pressure in the oxidizing gas filled space 112 and the atmospheric pressure. This pressure difference between the pressure in the oxidizing gas filled space 112 and the atmospheric pressure in a case where the pressure difference is decreased to such a negative pressure that the pressure difference cannot secure the gas seal performances of the gaskets 7 and 8 is calculated experimentally or theoretically. Then, the calculated pressure difference is preset as the outside air supplying valve open pressure Pa in the controller 65. For example, the outside air supplying valve open pressure Pa can be set to −10 kPa, and it is desirable that the outside air supplying valve open pressure Pa be suitably set in accordance with the pressure resistances of the gaskets 7 and 8. The configuration of the pressure detector 89 is not limited to the above. Any detector may be used as long as it can compare the pressure in the oxidizing gas filled space 112 and the outside pressure. For example, by respectively disposing pressure gauges on the non-humidified oxidizing gas supplying passage 45 and a portion of the oxidizing gas supplying passage 49 which portion is located downstream of the oxidizing gas supplying valve 56, a pressure difference between the pressures detected by these pressure gauges may be used as the detected pressure P1.

The controller 65 compares the outside air supplying valve open pressure Pa and the detected pressure P1. As a result, when the detected pressure P1 is higher than the outside air supplying valve open pressure Pa (P1>Pa, NO in Step S69), the process returns to Step S68.

In contrast, when the detected pressure P1 is equal to or lower than the outside air supplying valve open pressure Pa (P1≤Pa, YES in Step S69), the negative pressure releasing operation becomes necessary. This is because the pressure in the oxidizing gas filled space 112 is decreased to such a negative pressure that this pressure cannot secure the gas seal performances of the gaskets 7 and 8. Therefore, the controller 65 outputs the control signal to the outside air supplying valve 79 to open the outside air supplying valve 79 (Step S70). By opening the outside air supplying valve 79, the outside air purified by the filter 43 is sucked through the outside air supplying passage 78 to the oxidizing gas filled space 112. The outside air flows into the oxidizing gas filled space 112 from the oxidizing gas discharging passage 52 located downstream of the cathode gas passage 98. Then, the discharged oxidizing gas in the oxidizing gas discharging passage 52 is pushed back by the outside air, and therefore flows into the cathode gas passage 98 in the fuel cell 1 only by the volume reduced by the negative pressure.

Next, the controller 65 obtains an elapsed time t1 since the start of the time measurement in Step S27 (Step S71), and compares the elapsed time t1 and a outside air supplying valve closed time ta (Step S72). Herein, a time elapsed since the start of the time measurement is measured as the elapsed time t1. However, a time difference between a time measurement start time and an elapsed time obtaining time may be calculated to obtain the elapsed time t1.

When the outside air supplying valve 79 is open, the pressure in the oxidizing gas filled space 112 is substantially the same as the atmospheric pressure and is constant. Therefore, the operation of closing the outside air supplying valve 79 is carried out based on the elapsed time since the start of the time measurement. The outside air supplying valve closed time ta is experimentally or theoretically calculated such that: when the outside air supplying valve closed time ta has elapsed since the start of the time measurement by the timer portion 83, the oxidizing gas filled space 112 is sealed again; and even if the temperature of the fuel cell 1 changes to the normal temperature, the pressure in the oxidizing gas filled space 112 can adequately secure the gas seal performances of the gaskets 7 and 8. Then, the calculated time ta is preset in the controller 65. For example, in a case where the outside air supplying valve closed time ta is set to two hours, the temperature of the fuel cell 1 decreases to about 40° C. in two hours after the start of the time measurement. Therefore, the gas seal performances of the gaskets 7 and 8 can be adequately secured with respect to the pressure change in the oxidizing gas filled space 112 caused due to the temperature change from 40° C. to the normal temperature.

The controller 65 compares the elapsed time t1 and the outside air supplying valve closed time ta. As a result, when the elapsed time t1 is shorter than the outside air supplying valve closed time ta, i.e., when the outside air supplying valve closed time ta has not yet elapsed since the start of the time measurement (t1<ta, NO in Step S72), the process returns to Step S71.

In contrast, when the elapsed time t1 is equal to or longer than the outside air supplying valve closed time ta, i.e., when the outside air supplying valve closed time ta has elapsed since the start of the time measurement (t1≥ta, YES in Step S72), the controller 65 outputs the control signal to the outside air supplying valve 79 to close the outside air supplying valve 79 (Step S73), and then terminates the stop operation.

As described above, in the fuel cell system 100 according to Embodiment 6, the negative pressure generated in the cathode gas passage 98 of the fuel cell 1 at the time of the stop of the electric power generation is released by sucking the outside air into the oxidizing gas discharging passage 52 located downstream of the oxidizing gas exit 51 of the fuel cell 1 and pushing back the discharged oxidizing gas, having the low oxygen concentration in the oxidizing gas discharging passage 52, to the cathode gas passage 98 in the fuel cell 1. As above, the fuel cell system 100 according to Embodiment 6 can obtain the same operations and effects as the fuel cell system 100 according to Embodiment 5.

In addition, in the fuel cell system 100 according to Embodiment 6, whether or not the oxidizing gas filled space 112 is in a predetermined negative pressure state is determined based on the pressure of the oxidizing gas filled space 112 directly detected by the pressure detector 89. Therefore, more secure control can be carried out.

Whether or not the oxidizing gas filled space 112 is in the predetermined negative pressure state is determined based on the temperature of the fuel cell 1 in Embodiment 5 and is determined based on the pressure in the oxidizing gas filled space 112 in Embodiment 6. However, it may be determined based on both the temperature of the fuel cell 1 and the pressure in the oxidizing gas filled space 112.

Embodiment 7

Figure 20:
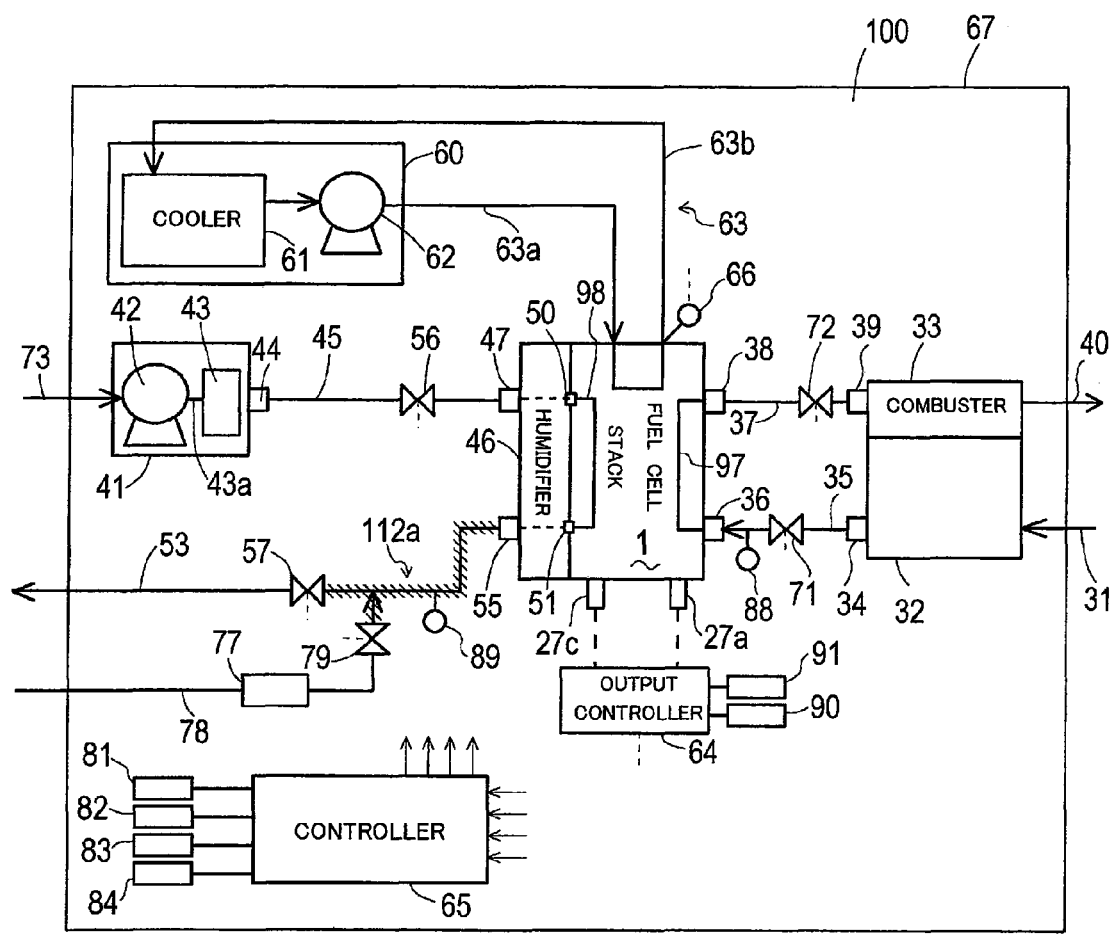
FIG. 20 is a functional block diagram schematically showing the configuration of the fuel cell system according to Embodiment 7.

Embodiment 7 of the present invention will be explained. The fuel cell system 100 according to Embodiment 7 is substantially the same in configuration as the fuel cell system 100 according to Embodiment 1 except for the oxidizing gas system. Therefore, hereinafter, the configuration of the oxidizing gas system of the fuel cell system 100 will be explained in reference to FIG. 20, and explanations of other components are omitted. FIG. 20 is a functional block diagram schematically showing the configuration of the fuel cell system according to Embodiment 7.

Configuration of Oxidizing Gas System

Hereinafter, the configuration of the oxidizing gas system will be explained. Passages of the oxidizing gas system are constituted by the passages of the oxidizing gas supplying system configured to supply the oxidizing gas to the fuel cell 1, the cathode gas passage in the fuel cell 1, the passages of the oxidizing gas discharging system configured to discharge the oxidizing gas from the fuel cell 1, and the passages of the outside air supplying system. Herein, the "cathode gas passage 98" denotes a passage formed in the fuel cell 1 by the oxidizing gas supplying manifold 23, the in-cell oxidizing gas channel 11, and the oxidizing gas discharging manifold 24.

First, the oxidizing gas supplying system configured to supply the oxidizing gas to the fuel cell 1 will be explained. The oxidizing gas supplying system includes the oxidizing gas supplying portion 41, the non-humidified oxidizing gas supplying passage 45, the humidifier 46, and the oxidizing gas supplying valve 56. The oxidizing gas supplying portion 41 is constituted by the blower 42 and the filter 43.

The oxidizing gas intake passage 73 is connected to the gas entrance of the blower 42, so that the air can be obtained from outside by the blower 42. The gas exit of the blower 42 is connected to the gas entrance of the filter 43 through the unpurified oxidizing gas supplying passage 43a. The filter 43 removes, from the air supplied from outside, impurities (such as NOx and SOx) which become obstacles for the electric power generating performance of the fuel cell.

The gas exit 44 of the oxidizing gas supplying portion 41 is connected to the gas entrance 47 of the humidifier 46 through the non-humidified oxidizing gas supplying passage 45. The oxidizing gas supplying valve 56 configured to open and close the non-humidified oxidizing gas supplying passage 45 is disposed on the non-humidified oxidizing gas supplying passage 45.

The humidifier 46 is a total enthalpy heat exchanger constituted by an ion-exchange membrane or a hollow fiber. The humidifier 46 humidifies the air supplied from the oxidizing gas supplying portion 41 by heat exchange with the oxidizing gas discharged from the fuel cell 1. To be specific, the humidifier 46 also serves as a condenser configured to condense and remove the moisture in the oxidizing gas discharged from the fuel cell 1. In the present embodiment, the humidifier 46 is formed integrally with the fuel cell 1. Therefore, the gas exit of the humidifier 46 is coupled to the oxidizing gas entrance 50 of the fuel cell 1. The oxidizing gas entrance 50 is connected to the oxidizing gas supplying manifold 23. The oxidizing gas having flowed into the fuel cell 1 flows through the oxidizing gas supplying manifold 23 and the in-cell oxidizing gas channel 11 to the cathode 4, and reacts with the fuel gas herein to generate electricity and heat. Thus, the oxidizing gas is consumed.

Next, the oxidizing gas discharging system configured to discharge the oxidizing gas from the fuel cell 1 will be explained. The oxidizing gas discharging system includes the humidifier 46, the oxidizing gas discharging valve 57, and the exhaust oxidizing gas discharging passage 53.

The oxidizing gas exit 51 of the fuel cell 1 is coupled to the gas entrance of the humidifier 46. The exhaust oxidizing gas discharging passage 53 is connected to the gas exit 55 of the humidifier 46, so that the exhaust oxidizing gas discharged from the humidifier 46 can be discharged to outside of the system. The oxidizing gas discharging valve 57 configured to open and close the exhaust oxidizing gas discharging passage 53 is disposed on the exhaust oxidizing gas discharging passage 53.

The oxidizing gas unreacted in the fuel cell 1 flows through the in-cell oxidizing gas channel 11, the oxidizing gas discharging manifold 24, and the oxidizing gas exit 51 to the humidifier 46 to be used for the heat exchange. The heat and moisture of the oxidizing gas unreacted in the fuel cell 1 is utilized to humidify the oxidizing gas flowing through the oxidizing gas supplying system. The oxidizing gas having been used for the heat exchange is discharged through the exhaust oxidizing gas discharging passage 53 to outside (atmosphere).

Hereinafter, the outside air supplying system will be explained. The outside air supplying system includes the outside air supplying passage 78, the outside air supplying valve 79 configured to open and close the outside air supplying passage 78, and the filter 77. One end of the outside air supplying passage 78 is connected to the oxidizing gas discharging passage 52 connecting between the oxidizing gas exit 51 of the fuel cell 1 and the gas entrance 54 of the humidifier 46, and the other end thereof is open to the outside of the casing 67. The other end of the outside air supplying passage 78 may be open to the inside of the casing 67. The outside air supplying passage 78 is provided with the filter 77 as a purifying portion. Then, the outside air supplying valve 79 configured to open and close the outside air supplying passage 78 by control of the controller 65 is disposed between the filter 77 and one end of the outside air supplying passage 78 which end is connected to the oxidizing gas discharging passage 52. The outside air supplying valve 79 is disposed on the outside air supplying passage 78 and at a position close to one end of the outside air supplying passage 78 which end is connected to the oxidizing gas discharging passage 52.

Hereinafter, features of the oxidizing gas system configured as above will be explained. In the oxidizing gas system, inner spaces of passages practically isolated (sealed) from outside by closing the oxidizing gas supplying valve 56, the oxidizing gas discharging valve 57, and the outside air supplying valve 79 are referred to as the "oxidizing gas filled space 112." To be specific, inner spaces of a portion of the non-humidified oxidizing gas supplying passage 45 which portion extends from the oxidizing gas supplying valve 56 to the gas entrance 47 of the humidifier 46, the humidification passage in the humidifier 46, the cathode gas passage 98, the condensation passage in the humidifier 46, a portion of the exhaust oxidizing gas discharging passage 53 which portion extends from the gas exit 55 of the humidifier 46 to the oxidizing gas discharging valve 57, and a portion of the outside air supplying passage 78 which portion extends from a connection portion where the outside air supplying passage 78 and the exhaust oxidizing gas discharging passage 53 are connected to each other to the outside air supplying valve 79 are referred to as the "oxidizing gas filled space 112."

A portion (portion shown by diagonal lines in FIG. 20) of the oxidizing gas filled space 112 which portion is located downstream of the gas exit 55 of the humidifier 46 is hereinafter referred to as the "discharged oxidizing gas filled space 112*a*." To be specific, a space constituted by a portion of the exhaust oxidizing gas discharging passage 53 which portion extends from the gas exit 55 of the humidifier 46 to the oxidizing gas discharging valve 57 and a portion of the outside air supplying passage 78 which portion extends from the connection portion where the outside air supplying passage 78 and the exhaust oxidizing gas discharging passage 53 are connected to each other to the outside air supplying valve 79 is the discharged oxidizing gas filled space 112*a*.

The volume of the discharged oxidizing gas filled space 112*a* is equal to or more than 0.35 time the spatial volume of the cathode gas passage 98. To be specific, the diameter of the exhaust oxidizing gas discharging passage 53 and the positions of the oxidizing gas discharging valve 57 and the outside air supplying valve 79 are determined such that the volume of the discharged oxidizing gas filled space 112*a* becomes equal to or more than 0.35 time the spatial volume of the cathode gas passage 98. It is desirable that the upper limit of the volume of the discharged oxidizing gas filled space 112*a* be set to be as large a value as possible in terms of design.

Here, the reason why the volume of the discharged oxidizing gas filled space 112*a* is set to be equal to or more than 0.35 time the spatial volume of the cathode gas passage 98 will be explained in reference to FIG. 17. The spatial volume of a portion of the fuel gas filled space 111 which portion is located upstream of the gas exit 55 of the humidifier 46 is set as the stack volume A. To be specific, the spatial volumes of a portion of the non-humidified oxidizing gas supplying passage 45 which portion is located downstream of the oxidizing gas supplying valve 56, the humidification passage of the humidifier 46, the cathode gas passage 98, and the condensation passage of the humidifier 46 are set as the stack volume A. The temperature of the fuel cell 1 at the time of the stop of the electric power generation is set to 70° C., and the pressure is set to 1 Pa (=760 mmHg). The amount of volume reduction in a case where in the above state, the discharged oxidizing gas pushed back to the cathode gas passage 98 in the fuel cell 1 flows into the stack volume A as the additional gas, and the temperature of the fuel cell 1 is decreased to the normal temperature (25° C.) is calculated. In accordance with this calculation result, when the fuel cell 1 is cooled down to 25° C., the additional gas occupies 0.35 time the stack volume A. Since the moisture in the discharged oxidizing gas in the discharged oxidizing gas filled space 112*a* has been removed by the humidifier 46 (condenser), it is unnecessary to consider the condensation of the moisture. Therefore, the volume of the discharged oxidizing gas filled space 112*a* being 0.35 time the stack volume A is enough. Normally, the oxidizing gas supplying valve 56 is disposed on the non-humidified oxidizing gas supplying passage 45 and in the vicinity of the gas entrance 47 of the humidifier 46, and the spatial volume of the passage in the humidifier 46 is adequately smaller than the spatial volume of the cathode gas passage 98. Therefore, the stack volume A may be substantially equal to the spatial volume of the cathode gas passage 98. To be specific, the volume of the discharged oxidizing gas filled space 112*a* is set to be equal to or more than 0.35 time the spatial volume of the cathode gas passage 98. With this, most of the gas pushed back from the discharged oxidizing gas filled space 112*a* to the cathode gas passage 98 becomes the discharged oxidizing gas having the low oxygen concentration.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention. Moreover, various inventions can be made by a suitable combination of a plurality of components disclosed in the embodiments.

Industrial Applicability

The fuel cell system of the present invention is useful as a fuel cell system having high energy efficiency and capable of, even if start-up and stop are repeated, preventing the deterioration of the electrode when the system is not generating the electric power.

The invention claimed is:

1. A fuel cell system comprising:
   a fuel cell including an electrolyte membrane, an anode and a cathode sandwiching the electrolyte membrane, an anode gas passage through which a fuel gas is supplied to and discharged from the anode, and a cathode gas passage through which an oxidizing gas is supplied to and discharged from the cathode;
   a fuel gas channel including the anode gas passage and through which the fuel gas is supplied to and discharged from the anode, the fuel gas channel comprising a fuel gas supplying passage connected to an entrance of the anode gas passage, a fuel gas supplying valve disposed on the fuel gas supplying passage to open and close the fuel gas supplying passage, the anode gas passage, a fuel gas discharging passage connected to an exit of the anode gas passage, and a fuel gas discharging valve disposed on the fuel gas discharging passage to open and close the fuel gas discharging passage;
   an oxidizing gas channel including the cathode gas passage and through which the oxidizing gas is supplied to and discharged from the cathode, the oxidizing gas channel comprising an oxidizing gas supplying passage connected to an entrance of the cathode gas passage, an oxidizing gas supplying valve disposed on the oxidizing gas supplying passage to open and close the oxidizing gas supplying passage, the cathode gas passage, an oxidizing gas discharging passage connected to an exit of the cathode gas passage, and an oxidizing gas discharging valve disposed on the oxidizing gas discharging passage to open and close the oxidizing gas discharging passage; and
   a controller including at least one of a microcomputer and a CPU and a storage unit storing a program, the program, when executed by the at least one of the microcomputer and the CPU, causing the controller to control opening and closing of each of the fuel gas supplying valve, the fuel gas discharging valve, the oxidizing gas supplying valve and the oxidizing gas discharging valve, wherein:

the program, when executed by the at least one of the microcomputer and the CPU, further causes the controller to control the fuel gas supplying valve, the fuel gas discharging valve, the oxidizing gas supplying valve and the oxidizing gas discharging valve, when the fuel cell system performs a stop process in a daily shut-down operation, such that:
- the fuel gas channel and the oxidizing gas channel are closed by closing the fuel gas supplying valve, the fuel gas discharging valve, the oxidizing gas supplying valve and the oxidizing gas discharging valve, and
- when negative pressure is generated in the cathode, with the oxidizing gas supplying valve closed, the oxidizing gas discharging valve is open to supply a discharged oxidizing gas in the oxidizing gas discharging passage from the exit of the cathode gas passage to the cathode.

2. The fuel cell system according to claim 1, wherein a volume of the portion of the oxidizing gas filled space which portion is located downstream of the exit of the cathode gas passage is equal to or larger than one time a spatial volume of the cathode gas passage.

3. The fuel cell system according to claim 1, further comprising a condenser disposed between the exit of the cathode gas passage and the oxidizing gas discharging passage to condense and remove moisture in the oxidizing gas discharged from the cathode gas passage.

4. The fuel cell system according to claim 3, wherein a volume of a portion of the oxidizing gas filled space which portion is located downstream of an exit of the condenser is equal to or larger than 0.35 time a spatial volume of the cathode gas passage.

5. The fuel cell system according to claim 1, further comprising:
- a condenser disposed downstream of the oxidizing gas discharging passage to condense and remove moisture in the oxidizing gas discharged from the oxidizing gas discharging passage;
- an oxidizing gas discharging valve-condenser passage connecting the oxidizing gas discharging valve and the condenser; and
- an exhaust oxidizing gas discharging passage disposed downstream of the condenser to discharge the oxidizing gas discharged from the condenser, wherein
- a volume of the exhaust oxidizing gas discharging passage is larger than a sum of a volume of the oxidizing gas filled space and a volume of the oxidizing gas discharging valve-condenser passage.

6. A fuel cell system comprising:
a fuel cell including an electrolyte membrane, an anode and a cathode sandwiching the electrolyte membrane, an anode gas passage through which a fuel gas is supplied to and discharged from the anode, and a cathode gas passage through which an oxidizing gas is supplied to and discharged from the cathode;
a fuel gas channel including the anode gas passage and through which the fuel gas is supplied to and discharged from the anode, the fuel gas channel comprising a fuel gas supplying passage connected to an entrance of the anode gas passage, a fuel gas supplying valve disposed on the fuel gas supplying passage to open and close the fuel gas supplying passage, the anode gas passage, a fuel gas discharging passage connected to an exit of the anode gas passage, and a fuel gas discharging valve disposed on the fuel gas discharging passage to open and close the fuel gas discharging passage;

an oxidizing gas channel including the cathode gas passage and through which the oxidizing gas is supplied to and discharged from the cathode, the oxidizing gas channel comprising an oxidizing gas supplying passage connected to an entrance of the cathode gas passage, an oxidizing gas supplying valve disposed on the oxidizing gas supplying passage to open and close the oxidizing gas supplying passage, the cathode gas passage, an oxidizing gas discharging passage connected to an exit of the cathode gas passage, and an oxidizing gas discharging valve disposed on the oxidizing gas discharging passage to open and close the oxidizing gas discharging passage; and a controller including at least one of a microcomputer and a CPU and a storage unit storing a program, the program, when executed by the at least one of the microcomputer and the CPU, causing the controller to control opening and closing of each of the fuel gas supplying valve, the fuel gas discharging valve, the oxidizing gas supplying valve and the oxidizing gas discharging valve, wherein:

the fuel cell system further comprises:
- a bypass passage connecting a portion of the oxidizing gas supplying passage which portion is located upstream of the oxidizing gas supplying valve and a portion of the oxidizing gas discharging passage which portion is located upstream of the oxidizing gas discharging valve; and
- a bypass valve disposed on the bypass passage, and the program, when executed by the at least one of the microcomputer and the CPU, further causes the controller to control the fuel gas supplying valve, the fuel gas discharging valve, the oxidizing gas supplying valve, the oxidizing gas discharge valve and the bypass valve, when the fuel cell system performs a stop process in a daily shut-down operation, such that, when negative pressure is generated in the cathode, with the oxidizing gas supplying valve and the oxidizing gas discharging valve closed, the bypass valve is open to supply a discharged oxidizing gas in the oxidizing gas discharging passage from the exit of the cathode gas passage to the cathode.

7. The fuel cell system according to claim 6, wherein the program, when executed by the at least one of the microcomputer and the CPU, further causes the controller to, when the fuel cell system stops generating the electric power, close the fuel gas supplying valve, the fuel gas discharging valve, the oxidizing gas supplying valve, and the oxidizing gas discharging valve, and then open the bypass valve.

8. The fuel cell system according to claim 7, further comprising a fuel cell temperature detector configured to directly or indirectly detect a temperature of the fuel cell, wherein the program, when executed by the at least one of the microcomputer and the CPU, further causes the controller to open the bypass valve when the temperature of the fuel cell becomes equal to or lower than a predetermined valve open temperature.

9. The fuel cell system according to claim 6, further comprising a pressure detector configured to detect pressure in the oxidizing gas filled space, wherein the program, when executed by the at least one of the microcomputer and the CPU, further causes the controller to open the bypass valve when the pressure in the oxidizing gas filled space becomes equal to or lower than a predetermined valve open pressure.

10. The fuel cell system according to claim 7, wherein the program, when executed by the at least one of the microcomputer and the CPU, further causes the controller to open the bypass valve and then close the bypass valve.

11. The fuel cell system according to claim 10, further comprising a fuel cell temperature detector configured to directly or indirectly detect the temperature of the fuel cell, wherein the program, when executed by the at least one of the microcomputer and the CPU, further causes the controller to close the bypass valve when the temperature of the fuel cell becomes equal to or lower than a predetermined valve close temperature.

12. The fuel cell system according to claim 10, wherein the program, when executed by the at least one of the microcomputer and the CPU, further causes the controller to close the bypass valve when a predetermined valve open time has elapsed since the opening of the bypass valve.

13. A fuel cell system comprising:
a fuel cell including an electrolyte membrane, an anode and a cathode sandwiching the electrolyte membrane, an anode gas passage through which a fuel gas is supplied to and discharged from the anode, and a cathode gas passage through which an oxidizing gas is supplied to and discharged from the cathode;
a fuel gas supplying passage connected to an entrance of the anode gas passage;
a fuel gas supplying valve disposed on the fuel gas supplying passage to open and close the fuel gas supplying passage;
a fuel gas discharging passage connected to an exit of the anode gas passage;
a fuel gas discharging valve disposed on the fuel gas discharging passage to open and close the fuel gas discharging passage;
an oxidizing gas supplying passage connected to an entrance of the cathode gas passage;
an oxidizing gas supplying valve disposed on the oxidizing gas supplying passage to open and close the oxidizing gas supplying passage;
an oxidizing gas discharging passage connected to an exit of the cathode gas passage;
an oxidizing gas discharging valve disposed on the oxidizing gas discharging passage to open and close the oxidizing gas discharging passage;
an outside air supplying passage, one end of which is connected to a portion of the oxidizing gas discharging passage which portion extends between the exit of the cathode gas passage and the oxidizing gas discharging valve;
a purifying portion disposed on the outside air supplying passage;
an outside air supplying valve disposed on a portion of the outside air supplying passage which portion is located between the one end of the outside air supplying passage which end is connected to the oxidizing gas discharging passage and the purifying portion to open and close the outside air supplying passage; and
a controller including at least one of a microcomputer and a CPU and a storage unit storing a program, the program, when executed by the at least one of the microcomputer and the CPU, causing the controller to control the fuel gas supplying valve, the fuel gas discharging valve, the oxidizing gas supplying valve, the oxidizing gas discharging valve, and the outside air supplying valve, when the fuel cell system performs a stop process in a daily shut-down operation, such that, when negative pressure is generated in the cathode, the outside air supplying valve is open to supply a discharged oxidizing gas in the oxidizing gas discharging passage to the cathode.

14. The fuel cell system according to claim 13, wherein a volume of a portion of a space which is isolated from outside by closing the oxidizing gas supplying valve and the oxidizing gas discharging valve and is constituted by the cathode gas passage and a space communicated with the cathode gas passage which portion is located downstream of the exit of the cathode gas passage is equal to or larger than one time a spatial volume of the cathode gas passage.

15. The fuel cell system according to claim 13, further comprising a condenser disposed between the exit of the cathode gas passage and the oxidizing gas discharging passage to condense and remove moisture in the oxidizing gas discharged from the cathode gas passage.

16. The fuel cell system according to claim 15, wherein a volume of a portion of a space which is isolated from outside by closing the oxidizing gas supplying valve and the oxidizing gas discharging valve and is constituted by the cathode gas passage and a space communicated with the cathode gas passage which portion is located downstream of an exit of the condenser is equal to or larger than 0.35 time a spatial volume of the cathode gas passage.

17. The fuel cell system according to claim 13, further comprising a fuel cell temperature detector configured to directly or indirectly detect a temperature of the fuel cell, wherein the program, when executed by the at least one of the microcomputer and the CPU, further causes the controller to open the outside air supplying valve when the temperature of the fuel cell becomes equal to or lower than a predetermined valve open temperature.

18. The fuel cell system according to claim 13, further comprising a pressure detector configured to detect pressure in an oxidizing gas filled space which is isolated from outside by closing the oxidizing gas supplying valve and the oxidizing gas discharging valve and is constituted by the cathode gas passage and a space communicated with the cathode gas passage, wherein the program, when executed by the at least one of the microcomputer and the CPU, further causes the controller to open the outside air supplying valve when the pressure in the oxidizing gas filled space becomes equal to or lower than a predetermined valve open pressure.

19. The fuel cell system according to claim 13, wherein the program, when executed by the at least one of the microcomputer and the CPU, further causes the controller to open the outside air supplying valve and then close the outside air supplying valve.

20. The fuel cell system according to claim 19, further comprising a fuel cell temperature detector configured to directly or indirectly detect the temperature of the fuel cell, wherein the program, when executed by the at least one of the microcomputer and the CPU, further causes the controller to close the outside air supplying valve when the temperature of the fuel cell becomes equal to or lower than a predetermined valve close temperature.

21. The fuel cell system according to claim 19, wherein the program, when executed by the at least one of the microcomputer and the CPU, further causes the controller to close the outside air supplying valve when a predetermined valve open time has elapsed since the opening of the outside air supplying valve.

22. The fuel cell system according to claim 1, wherein an oxygen concentration of the discharged oxidizing gas is 9 to 13 volume %.

23. The fuel cell system according to claim 13, wherein an oxygen concentration of the discharged oxidizing gas is 9 to 13 volume %.

* * * * *